United States Patent
Lee et al.

(10) Patent No.: US 11,658,306 B2
(45) Date of Patent: May 23, 2023

(54) CATHODE, LITHIUM-AIR BATTERY COMPRISING THE SAME, AND METHOD OF PREPARING THE CATHODE

(71) Applicant: Samsung Electronics Co., Ltd., Suwon-si (KR)

(72) Inventors: Hyunpyo Lee, Seoul (KR); Taeyoung Kim, Seoul (KR); Mokwon Kim, Suwon-si (KR); Wonsung Choi, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 254 days.

(21) Appl. No.: 17/128,305

(22) Filed: Dec. 21, 2020

(65) Prior Publication Data

US 2021/0242469 A1   Aug. 5, 2021

(30) Foreign Application Priority Data

Feb. 4, 2020   (KR) .................. 10-2020-0013301

(51) Int. Cl.
   *H01M 4/86*    (2006.01)
   *H01M 4/88*    (2006.01)
   *H01M 12/08*   (2006.01)

(52) U.S. Cl.
   CPC ....... *H01M 4/8621* (2013.01); *H01M 4/8828* (2013.01); *H01M 4/8882* (2013.01); *H01M 4/8896* (2013.01); *H01M 12/08* (2013.01); *H01M 2004/8689* (2013.01)

(58) Field of Classification Search
   CPC ................................................. H01M 12/08
   See application file for complete search history.

(56) References Cited

U.S. PATENT DOCUMENTS

| | | | |
|---|---|---|---|
| 8,669,015 B2 | 3/2014 | Kang et al. | |
| 2010/0310934 A1 | 12/2010 | Yang et al. | |
| 2011/0059355 A1 | 3/2011 | Zhang et al. | |
| 2013/0082229 A1 | 4/2013 | Chen | |
| 2014/0162131 A1* | 6/2014 | Friend ................. | H01M 4/1397 429/232 |
| 2016/0190550 A1 | 6/2016 | Choi et al. | |
| 2017/0194651 A1 | 7/2017 | Hellstrom et al. | |

(Continued)

FOREIGN PATENT DOCUMENTS

| | | |
|---|---|---|
| EP | 3447832 A1 | 2/2019 |
| EP | 3486983 A1 | 5/2019 |

(Continued)

OTHER PUBLICATIONS

European Search Report for European Patent Application No. 21152254.5 dated Jun. 30, 2021.

(Continued)

*Primary Examiner* — Haroon S. Sheikh
(74) *Attorney, Agent, or Firm* — Cantor Colburn LLP

(57) ABSTRACT

A cathode configured to use oxygen as a cathode active material, the cathode including: a porous film, wherein the porous film includes a metal oxide, and wherein a surface of the porous film has root mean square (RMS) roughness (Rq) of about 0.01 micrometer to about 1 micrometer, and a porosity of the porous film is about 50 volume percent to about 99 volume percent, based on a total volume of the porous film.

29 Claims, 7 Drawing Sheets

(56) References Cited

U.S. PATENT DOCUMENTS

| | | |
|---|---|---|
| 2018/0190993 A1 | 7/2018 | Nishiura |
| 2019/0036186 A1 | 1/2019 | Kim et al. |
| 2019/0103643 A1 | 4/2019 | Hart et al. |
| 2019/0148803 A1 | 5/2019 | Lee et al. |
| 2020/0203747 A1 | 6/2020 | Shimada et al. |
| 2021/0126240 A1 | 4/2021 | Lee et al. |
| 2021/0242469 A1 | 8/2021 | Lee et al. |
| 2021/0257628 A1 | 8/2021 | Kim et al. |

FOREIGN PATENT DOCUMENTS

| | | |
|---|---|---|
| JP | 2010244827 A | 10/2010 |
| KR | 1020070002254 A | 1/2007 |
| KR | 1020150045673 A | 4/2015 |
| KR | 1020160131217 A | 11/2016 |
| KR | 1020170109374 A | 9/2017 |
| WO | 9918620 A2 | 4/1999 |
| WO | 0036677 A1 | 6/2000 |
| WO | 2017147793 A1 | 9/2017 |
| WO | 2018212344 A1 | 11/2018 |
| WO | 20190129316 A1 | 7/2019 |
| WO | 2019170074 A1 | 9/2019 |

OTHER PUBLICATIONS

Extended European Search Report dated Nov. 4, 2021 of EP Patent Application No. 21152254.5.

Non-Final Office Action dated Sep. 13, 2022 in U.S. Appl. No. 17/153,271.

European Search Report for European Patent Application No. 21152257.8 dated Jun. 29, 2021.

Extended European Search Report issued in EP Patent Application No. 21152257.8, dated Nov. 5, 2021, 16 pp.

Non-Final Office Action dated Dec. 28, 2022 in U.S. Appl. No. 17/153,271.

* cited by examiner

Height Sensor

CATHODE, LITHIUM-AIR BATTERY COMPRISING THE SAME, AND METHOD OF PREPARING THE CATHODE

CROSS-REFERENCE TO RELATED APPLICATION

This application claims priority to and the benefit of Korean Patent Application No. 10-2020-0013301, filed on Feb. 4, 2020, in the Korean Intellectual Property Office, and all the benefits accruing therefrom under 35 U.S.C. § 119, the content of which is incorporated herein in its entirety by reference.

BACKGROUND

1. Field

The disclosure relates to a cathode, a lithium-air battery including the same, and a method of preparing the cathode.

2. Description of Related Art

Lithium-air batteries utilize lithium itself as an anode, and as there is no need to store air as a cathode active material in the batteries, it is possible to achieve high-capacity batteries.

The theoretical specific energy density of a lithium-air battery is very high, at 3500 Watt hours per kilogram (Wh/kg) or more. Such energy density corresponds to approximately ten times that of a lithium-ion battery.

The cathode of a commercially available lithium-air battery is prepared by mixing a carbon-based conductive material, a binder, and other components. Due to the generation of radicals involved in electrochemical reactions during the charge and discharge of the lithium-air battery, the carbon-based conductive material, the binder, and other components easily decompose.

A lithium-air battery employing a cathode including a carbon-based conductive material, a binder, and other components easily deteriorates.

Cathodes that are chemically stable against radicals generated during electrochemical reactions are needed.

SUMMARY

Provided is a chemically stable cathode.
Provided is a lithium-air battery including the cathode.
Provided is a method of preparing the cathode.
Additional aspects will be set forth in part in the description which follows and, in part, will be apparent from the description.

According to an aspect, there is provided a cathode configured to use oxygen as a cathode active material, the cathode includes: a porous film, wherein the porous film includes a metal oxide, and wherein a surface of the porous film has a root mean square (RMS) roughness (Rq) of about 0.01 micrometer to about 1 micrometer, and a porosity of the porous film is about 50 volume percent to about 99 volume percent, based on a total volume of the porous film.

According to an aspect, a lithium-air battery includes: the cathode; an anode including lithium; and an electrolyte disposed between the cathode and the anode.

According to an aspect, a method of preparing a cathode, includes: providing a composition including a metal oxide and a binder; disposing the composition onto a base; drying the composition on the base to prepare a coating layer; pressing the coating layer to prepare a sheet; and heat-treating the sheet under an oxidizing atmosphere at a temperature of about 450° C. to about 800° C. to prepare the cathode.

According to an aspect, disclosed is a cathode configured to use oxygen as a cathode active material, and the cathode incudes: a porous film, wherein the porous film includes a metal oxide, wherein the metal oxide is a lithium containing metal oxide represented by Formula 1,

$$Li_xA_yG_zO_{3-\delta} \qquad \text{Formula 1}$$

wherein, in Formula 1, A and G are each independently at least one of a Group 2 to a Group 16 element, and $0<x<1$, $0<y<1$, $0<x+y\leq 1$, $0<z\leq 1.5$, and $0\leq\delta\leq 1.5$, and wherein a surface of the porous film has a root mean square roughness of about 0.01 micrometer to about 1 μm micrometer.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
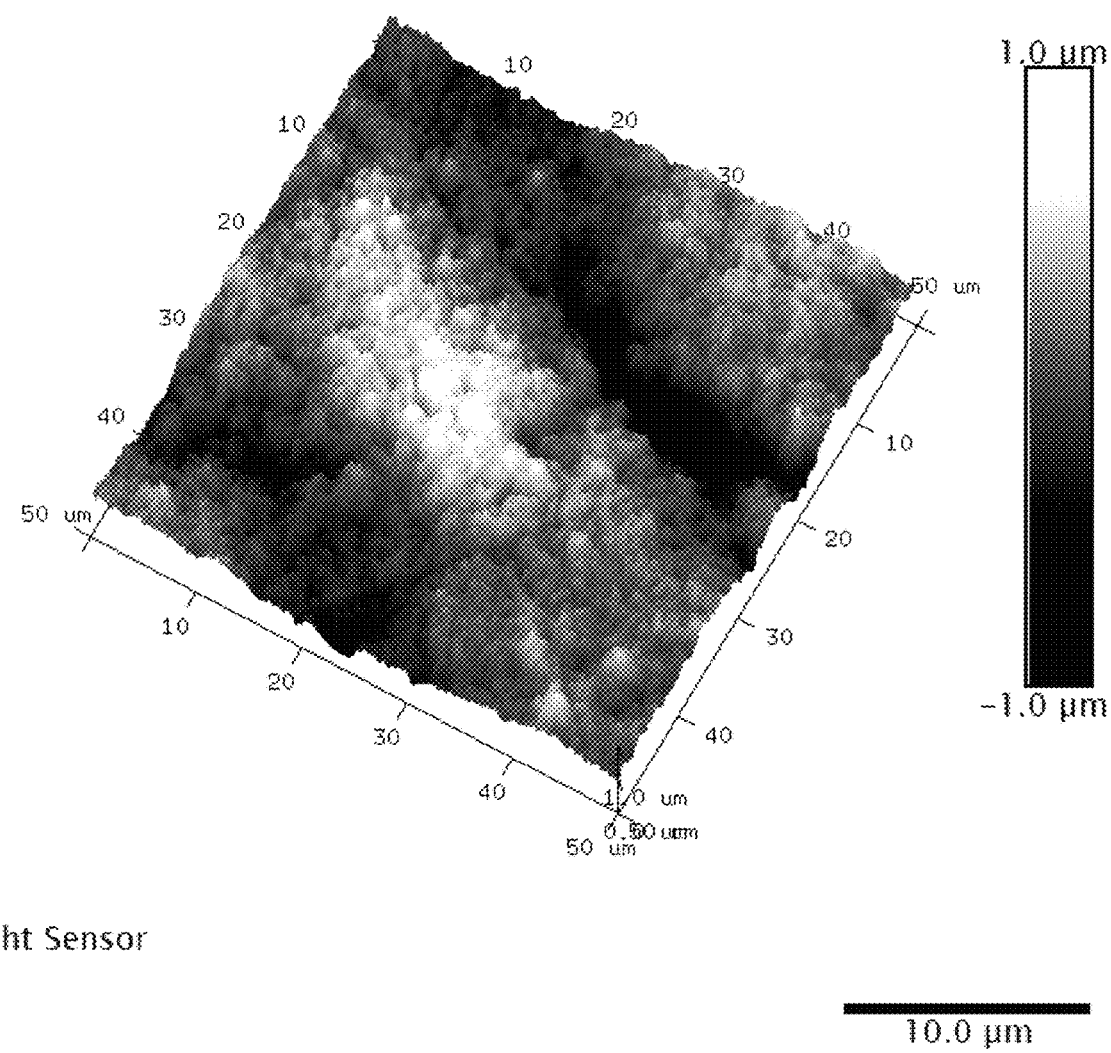
FIG. 1 is an atomic force microscope (AFM) image of a surface of a cathode prepared in Example 1.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

The present inventive concept described below may be modified in various forms and have many embodiments, and particular embodiments are illustrated in the drawings and described in detail in the detailed description. However, the present inventive concept should not be construed as limited to the particular embodiments, but should be understood to cover all modifications, equivalents or replacements included in the technical scope of the present inventive concept.

The terminology used herein is for the purpose of explaining particular embodiments only and is not intended to limit the present inventive concept. The singular forms include the plural forms as well, unless the context clearly indicates otherwise. It will be further understood that the terms "comprise" or "comprising" when used herein, specify the presence of stated features, numbers, steps, operations, elements, parts, components, materials, or combinations thereof, but do not preclude the presence or addition of one or more other features, numbers, steps, operations, elements, parts, components, materials, or combinations thereof. 1' used hereinafter may be interpreted as "and" or interpreted as "or" according to circumstances.

In the drawings, the thicknesses of layers and regions are enlarged or reduced for clear explanation. The same reference numerals are designated for similar elements throughout. When a layer, film, region, plate, or the like is referred to as being "on" another part, it can be directly on the other part, or intervening parts may be present. The terms "first," "second," and the like may be used for describing various elements throughout, but the elements are not limited by the terms. The terms are used to only distinguish one element from other elements.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within 30%, 20%, 10% or 5% of the stated value.

In the disclosure, the "size" of a pore represents the average diameter of pores in case of spherical pores, or represents the average length of the main axes of pores in case of non-spherical pores. In the disclosure, the "pore" is an open pore. The average diameter of pores may be measured by, for example, a nitrogen adsorption method. Alternatively, the average diameter of pores may be, for example, an arithmetic average on pore sizes, which are automatically or manually measured by software from a scanning electron microscope image.

In the disclosure, the "size" of a particle represents an average diameter of particles in case of spherical particles, or an average length of main axes in case of non-spherical particles. The average diameter of particles is the median diameter (D50) of particles and is defined by a particle diameter corresponding to accumulated diameter distribution at 50%, which represents the particle diameter of 50% in a sample. The median diameter (D50) of particles may be measured using a particle size analyzer (PSA), e.g., by light scattering.

In the disclosure, "surface roughness" may be measured using an atomic force microscope (AFM).

Ionic conductivity may be determined by a complex impedance method at 20° C., further details of which can be found in J.-M. Winand et al., "Measurement of Ionic Conductivity in Solid Electrolytes," Europhysics Letters, vol. 8, no. 5, p. 447-452, 1989. Further, the ionic conductivity may be determined by a DC polarization method as disclosed in Evaluation Example 2.

As used herein, the term "inorganic material" refers to a material that does not include a carbon-hydrogen bond (C—H bond) or a carbon-halogen bond (C—X bond, where X is F, Cl, Br, or I) or, in other words, to any material that is not an organic material. For example, carbon fiber is an inorganic material, and a polymer binder or polymer dispersant is an organic material.

A spinel compound is a compound that is isostructural with spinel, i.e., $MgAl_2O_4$.

A perovskite compound is a compound that is isostructural with perovskite, i.e., $CaTiO_3$.

A layered compound is a compound having a layered structure, such as a compound which is isostructural with α-$NaFeO_2$, such as $LiCoO_2$.

A garnet compound is a compound having a crystal structure which is isostructural with a garnet, a compound of the formula $X_3Y_2(SiO_4)_3$, wherein X is a divalent cation, such as $Ca^{2+}$, $Mg^{2+}$, $Fe^{2+}$, or $Mn^{2+}$, and Y is a trivalent cation, such as $Al^{3+}$, $Fe^{3+}$, or $Cr^{3+}$.

A NASICON compound, as used herein, refers to a compound having a crystal structure which is isostructural with NASICON, which has the chemical formula $Na_{1+x}Zr_2Si_xP_{3-x}O_{12}$, wherein $0<x<3$.

A LISICON compound, as used herein, refers to a compound having a crystal structure which is isostructural with LISICON, which has the formula $Li_{2+2x}Zn_{1-x}GeO_4$, wherein $0<x<1$.

A tavorite is a compound having a crystal structure which is isostructural with tavorite, which is a compound of the formula $LiFe(PO_4)(OH)$.

A triplite compound is a compound having a crystal structure which is isostructural with triplite, which has the formula $(Mn_xFe_{1-x})_2PO_4(F_yOH_{1-y})$ wherein $0<x<1$ and $0<y<1$.

An anti-perovskite compound is a compound that is isostructural with perovskite, i.e., $CaTiO_3$, except that the anion and cation positions are reversed, such as in $Li_3OBr$.

A silicate means a compound comprising a unit of the formula $[SiO^{(4-2x)-}_{(4-x)}]$, wherein $0 \leq x < 2$.

A borate compound means a compound comprising $BO_3$ or $BO_4$ units, such as $Ca_3(BO_3)_2$, or a compound that has a crystal structure isostructural with a borate compound.

"Group" means a group of the Periodic Table of the Elements according to the International Union of Pure and Applied Chemistry ("IUPAC") Group 1-18 group classification system.

Hereinafter, a cathode according to exemplary embodiments, a lithium-air battery including the same, and a method of preparing the cathode will be described in detail.

A cathode, according to an embodiment, is configured to use oxygen as a cathode active material and includes a porous film, wherein the porous film includes a metal oxide, and the surface of the porous film has a root mean square (RMS) roughness (Rq) of about 0.01 µm to about 1 µm or less, and a porosity of the porous film is about 50 volume percent to about 99 volume percent, based on a total volume of the porous film.

The metal oxide included in the cathode is structurally and chemically stable. While not wanting to be bound by theory, the decomposition of the cathode by radicals involved in an electrochemical reaction is suppressed when the cathode includes a porous film including the lithium-containing metal oxide, compared with a cathode that includes a carbon-based conductive material. Accordingly, the charge and discharge characteristics of a lithium-air battery including a cathode that includes a porous film including the lithium-containing metal oxide are improved.

When the porous film included in commercially available cathodes has high surface roughness, there is a region of the film that does not make contact with a current collector, and discharge products formed in such a region are electrically insulated from the current collector. Thus reversibility of electrode reaction is deteriorated. As a result, the performance of a lithium-air battery is deteriorated.

The inventors surprisingly found that when the surface of the porous film included in the cathode has RMS roughness (Rq) of about 1 micrometer (µm) or less, about 0.9 µm or less, about 0.8 µm or less, about 0.7 µm or less, about 0.6 µm or less, about 0.5 µm or less, about 0.4 µm or less, or about 0.3 µm or less, performance of a lithium-air battery is improved. The RMS roughness (Rq) of the surface of the porous film is, for example, about 0.01 µm to about 1 µm, about 0.02 µm to about 0.9 µm, about 0.03 µm to about 0.8 µm, about 0.04 µm to about 0.7 µm, about 0.05 µm to about 0.6 µm, about 0.06 µm to about 0.5 µm, about 0.07 µm to about 0.4 µm, or about 0.08 µm to about 0.3 µm. When the surface of the porous film has low surface roughness in such a range, the effective contact area of a current collector with a porous film increases. In addition, when uniform discharge products are formed on the surface of the porous film during charge and discharge of a lithium-air battery, the electrical insulation of the discharge products and the current collector is restrained, and reversibility of electrode reaction is improved. As a result, the cycle characteristics of the lithium-air battery are improved.

The porosity of the porous film is, for example, about 50% or more, about 55% or more, about 60% or more, about 65% or more, about 70% or more, about 75% or more, about 80% or more, about 85% or more, or about 90% or more. The porosity of the porous film is, for example, about 50% to about 99%, about 51% to about 99%, about 55% to about 99%, about 60% to about 99%, about 65% to about 95%, about 70% to about 95%, about 75% to about 95%, about 80% to about 95%, about 85% to about 95%, or about 90% to about 95%. The porosity is the volume occupied by pores among the total volume of the porous film. When the cathode includes a porous film that has porosity in these ranges, the energy density of a battery increases.

The local porosity of the porous film may be changed according to, for example, the position in the porous film. For example, the porous film may include one side and the other side opposite to the one side, and the porosity in a region around the one side may be higher or lower than the porosity in a region around the other side. For example, the porosity in a region around the one side of the porous film may be about 50% or more, and the porosity in a region around the other side opposite to the one side may be about 50% or less. For example, the porosity in a region around the one side of the porous film may be about 50% to about 99%, and the porosity in a region around the other side opposite to the one side may be about 1% to about 50%. For example, the porous film may have a porosity gradient from the one side to the other side opposite to the one side. For example, the porous film may have the greatest porosity at the one side and the least porosity at the other side opposite to the one side.

The mean roughness (Ra) of the surface of the porous film is, for example, about 1 µm or less, about 0.9 µm or less, about 0.8 µm or less, about 0.7 µm or less, about 0.6 µm or less, about 0.5 µm or less, about 0.4 µm or less, or about 0.3 µm or less. The mean roughness (Ra) of the surface of the porous film is, for example, about 0.01 µm to about 1 µm, about 0.02 µm to about 0.9 µm, about 0.03 µm to about 0.8 µm, about 0.04 µm to about 0.7 µm, about 0.05 µm to about 0.6 µm, about 0.06 µm to about 0.5 µm, about 0.07 µm to about 0.4 µm, or about 0.08 µm to about 0.3 µm. When the surface of the porous film has low mean roughness in these ranges, the effective contact area of a porous film with a current collector increases. In addition, when uniform discharge products are formed on the surface of the porous film during charge and discharge of the lithium-air battery, the electrical insulation of the discharge products and the current collector is restrained, and the reversibility of electrode reaction is improved. As a result, the cycle characteristics of the lithium-air battery are improved.

The maximum roughness depth ($R_{max}$) of the surface of the porous film is, for example, about 10 µm or less, about 9 µm or less, about 8 µm or less, about 7 µm or less, about 6 µm or less, about 5 µm or less, about 4 µm or less, or about 3 µm or less. The maximum roughness depth ($R_{max}$) of the surface of the porous film is, for example, about 0.1 µm to about 10 µm, about 0.2 µm to about 9 µm, about 0.3 µm to about 8 µm, about 0.4 µm to about 7 µm, about 0.5 µm to about 6 µm, about 0.6 µm to about 5 µm, about 0.7 µm to about 4 µm, or about 0.8 µm to about 3 µm. When the surface of the porous film has low maximum roughness depth in these ranges, the effective contact area of a porous film with a current collector increases. In addition, when the production of nonuniform discharge products on the surface of the porous film during charge and discharge of the lithium-air battery is suppressed, the electrical insulation of the discharge products and the current collector is restrained, and the reversibility of electrode reaction is improved. As a result, the cycle characteristics of the lithium-air battery are improved. The RMS roughness (Rq) of the surface of the porous film, the mean roughness (Ra) of the surface of the porous film, and the maximum roughness depth ($R_{max}$) of the surface of the porous film may be automatically or manually measured by software from an AFM image.

The porous film may include, for example, a lithium-containing metal oxide. The lithium-containing metal oxide included in the porous film has lithium ionic conductivity and is structurally and chemically stable. The decomposition by a radical generated during an electrochemical reaction of the cathode in the form of a porous film that includes the lithium-containing metal oxide is suppressed when compared with a cathode including a carbon-based conductive material. Accordingly, the charge and discharge characteristics of a lithium-air battery including such a cathode are improved. The lithium-containing metal oxide is an oxide including lithium and one or more metals other than the lithium.

The porous film may have, for example, suitable lithium ionic conductivity. The porous film includes a lithium ion-containing metal oxide and may have lithium ionic conductivity.

The porous film may be, for example, an inorganic film. The porous inorganic film may be composed of, for example, a lithium-containing metal oxide. The porous inorganic film may be, for example, a porous film not including a carbon-based material such as a porous carbon-based conductive material. The porous inorganic film may be, for example, a porous film not including an organic component such as an organic binder. The "porous inorganic film" does not include an added organic material and is a porous film formed using substantially an inorganic material. The porous inorganic film may unintentionally include an organic component, residues thereof or modifications thereof, used in a preparation process, but the amount of the organic component, the residues thereof or the modifications thereof may be about 1 weight percent (wt %) or less, about 0.5 wt % or less, about 0.1 wt % or less, about 0.05 wt % or less, about 0.01 wt % or less, or about 0.001 wt % or less based on the total weight of the porous inorganic film. Alternatively, the porous inorganic film may show the weight change by vaporization and/or decomposition of the organic component using thermal gravimetric analysis (TGA) at about 25° C. to about 900° C. of about 1 wt % or less, about 0.5 wt % or less, about 0.1 wt % or less, about 0.05 wt % or less, about 0.01 wt % or less, or about 0.001 wt % or less based on an initial weight.

The porous film may be, for example, a self-standing film. Accordingly, the porous film is easy to handle and transport and may be easily applied to various types of batteries. The self-standing film means a film maintaining a film shape without a supporting layer. The porous film may be a self-standing film composed of an inorganic metal oxide.

The porous film includes a large-diameter pore, and the size of the large-diameter pore is about 1 μm or more. The size of the large-diameter pores is about 1 μm to about 100 μm, about 2 μm to about 50 μm, about 3 μm to about 40 μm, about 4 μm to about 30 μm, about 5 μm to about 20 μm, about 5 μm to about 10 μm, or about 5 μm to about 8 μm. When the large-diameter pore has a size in these ranges, an excessive amount of discharge products obtained at high discharge capacity may not deteriorate a cathode that includes a porous film with a large diameter pore. Accordingly, a lithium-air battery having high energy density, improved charge and discharge efficiency, and improved cycle characteristics may result.

The amount of the large-diameter pores included in the porous film is about 30 volume percent (vol %) or more, about 35 vol % or more, about 40 vol % or more, about 45 vol % or more, or about 50 vol % or more, based on the total volume of the porous film. The amount of the large-diameter pores included in the porous film is about 30 vol % to about 95 vol %, about 35 vol % to about 90 vol %, about 40 vol % to about 85 vol %, about 45 vol % to about 80 vol %, about 50 vol % to about 75 vol %, about 55 vol % to about 70 vol %, about 55 vol % to about 65 vol %, or about 55 vol % to about 60 vol % based on the total volume of the porous film. When the porous film has the amount of the large-diameter pores in these ranges, the storage space of discharge products increases. Accordingly, while keeping the cathode thickness in a range of about 5 μm to about 100 μm, the cell energy density may be maintained in a range of about 550 watt hours per kilogram (Wh/kg) to about 650 Wh/kg, for example, about 600 Wh/kg. In addition, when the cathode includes the porous film, the volume change during the charge and discharge of a lithium-air battery may be minimized. In addition, when the cathode includes the porous film, the diffusion of air or oxygen into the cathode is improved.

The porous film may further include small-diameter pores, which can be distinguished from the large-diameter pores. The size of the small-diameter pores included in the porous film may be, for example, about less than 1 μm, about 900 nanometer (nm) or less, about 800 nm or less, about 700 nm or less, about 600 nm or less, about 500 nm or less, about 400 nm or less, about 300 nm or less, or about 200 nm or less. The size of the small-diameter pores included in the porous film may be, for example, about 1 nm to about less than 1000 nm, about 10 nm to about 900 nm, about 50 nm to about 800 nm, about 75 nm to about 700 nm, about 100 nm to about 600 nm, about 125 nm to about 500 nm, about 150 nm to about 400 nm, about 175 nm to about 300 nm, or about 200 nm to about 250 nm. When the porous film includes such small-diameter pores having a size in these ranges, high specific surface area may result. Accordingly, a reaction site area where electrode reaction may occur within an electrode including a porous film may increase, and as a result, the high-rate characteristics of a battery including the porous film may be improved. The small-diameter pores include, for example, all pores excluding the large-diameter pores.

The amount of the lithium-containing metal oxide included in the porous film is about 50 wt % or more, about 60 wt % or more, about 70 wt % or more, about 75 wt % or more, about 80 wt % or more, about 85 wt % or more, about 90 wt % or more, about 95 wt % or more, about 96 wt % or more, about 97 wt % or more, about 98 wt % or more, or about 99 wt % or more, based on the total weight of the porous film. The amount of the lithium-containing metal oxide included in the porous film is, for example, about 60 wt % to about 100 wt %, about 70 wt % to about 100 wt %, about 75 wt % to about 100 wt %, about 80 wt % to about 100 wt %, about 85 wt % to about 100 wt %, about 90 wt % to about 100 wt %, about 95 wt % to about 100 wt %, about 96 wt % to about 100 wt %, about 97 wt % to about 100 wt %, about 98 wt % to about 100 wt %, or about 99 wt % to about 100 wt % based on the total weight of the porous film. When the porous film has the lithium-containing metal oxide content in these ranges, a dense and chemically stable cathode may result.

The size of the lithium-containing metal oxide included in the porous film may be about 10 nm to about 500 nm, about 50 nm to about 450 nm, about 100 nm to about 400 nm, about 150 nm to about 350 nm, about 200 nm to about 350 nm, or about 250 nm to about 350 nm.

The thickness of the porous film may be, for example, about 1 μm to about 1000 μm, about 2 μm to about 500 μm, about 3 μm to about 400 μm, about 4 μm to about 300 μm, about 5 μm to about 200 μm, or about 6 μm to about 100 μm. When the thickness of the porous film is too thin, mechanical strength may be reduced, and when the thickness of the porous film is too thick, the energy density of a battery may be degraded.

The loading level of the porous film may be, for example, about 4 milligrams per square centimeter (mg/cm$^2$) or more, about 4.2 mg/cm$^2$ or more, about 4.4 mg/cm$^2$ or more, about 4.6 mg/cm$^2$ or more, about 4.8 mg/cm$^2$ or more, about 5 mg/cm$^2$ or more, about 5.2 mg/cm$^2$ or more, about 5.4 mg/cm$^2$ or more, about 5.6 mg/cm$^2$ or more, or about 5.8 mg/cm$^2$ or more. The loading level of the porous film may be, for example, about 4 mg/cm$^2$ to about 10 mg/cm$^2$, about 4.2 mg/cm$^2$ to about 9.5 mg/cm$^2$, about 4.4 mg/cm$^2$ to about 9 mg/cm², about 4.6 mg/cm² to about 8.5 mg/cm², about 4.8 mg/cm² to about 8 mg/cm², about 5 mg/cm² to about 8 mg/cm², about 5.2 mg/cm² to about 7.5 mg/cm², about 5.4 mg/cm² to about 7 mg/cm², about 5.6 mg/cm² to about 7 mg/cm², or about 5.8 mg/cm² to about 7 mg/cm². When the porous film has a loading level in these ranges, the energy density of a battery may be increased. The loading level is a weight of the lithium-containing metal oxide per unit area of the porous film.

The lithium-containing metal oxide included in the porous film is, for example, a crystalline lithium ion conductor. When the lithium-containing metal oxide includes lithium and has crystallinity, the migration path of lithium ions is facilitated. Accordingly, the lithium-containing metal oxide is a lithium ion conductor. When the lithium-containing metal oxide is the lithium ion conductor, the cathode may not additionally include a separate electrolyte.

The lithium-containing metal oxide included in the porous film may be, for example, a crystalline electronic conductor. When the lithium-containing metal oxide has crystallinity and electronic conductivity, the migration path of electrons is provided.

Accordingly, the lithium-containing metal oxide is an electron conductor. When the lithium-containing metal oxide is an electron conductor, the cathode may not additionally include a separate conductive material.

The lithium-containing metal oxide included in the porous film may be, for example, a mixed conductor, which has lithium ionic conductivity, and electronic conductivity, simultaneously. The mixed conductor, for example, has an electronic conductivity of about $1\times10^{-6}$ siemens per centimeter (S/cm) or more at 25° C. and an ionic conductivity of about $1\times10^{-7}$ S/cm or more at 25° C. The mixed conductor, for example, has an electronic conductivity of about $5\times10^{-6}$ S/cm or more at 25° C. and an ionic conductivity of about $5\times10^{-7}$ S/cm or more at 25° C. The mixed conductor, for example, has an electronic conductivity of about $1\times10^{-5}$ S/cm or more at 25° C. and an ionic conductivity of about $1\times10^{-6}$ S/cm or more at 25° C. The mixed conductor, for example, has an electronic conductivity of about $5\times10^{-5}$ S/cm or more at 25° C. and an ionic conductivity of about $5\times10^{-6}$ S/cm or more at 25° C. The mixed conductor, for example, has an electronic conductivity of about $1\times10^{-4}$ S/cm or more at 25° C. and an ionic conductivity of about $1\times10^{-5}$ S/cm or more at 25° C. The mixed conductor, for example, has an electronic conductivity of about $5\times10^{-4}$ S/cm or more at 25° C. and an ionic conductivity of $5.0\times10^{-5}$ S/cm or more at 25° C. The mixed conductor, for example, has an electronic conductivity of about $1\times10^{-3}$ S/cm or more at 25° C. and an ionic conductivity of about $1\times10^{-4}$ S/cm or more at 25° C. The mixed conductor, for example, has an electronic conductivity of about $5\times10^{-3}$ S/cm or more at 25° C. and an ionic conductivity of about $5\times10^{-4}$ S/cm or more at 25° C. The mixed conductor, for example, has an electronic conductivity of about $1\times10^{-2}$ S/cm or more at 25° C. and an ionic conductivity of about $1\times10^{-3}$ S/cm or more at 25° C. The mixed conductor, for example, has an electronic conductivity of about $1.0\times10^{-1}$ S/cm or more at 25° C. and an ionic conductivity of about $1\times10^{-2}$ S/cm or more at 25° C.

At a temperature of 25° C., the mixed conductor may have, for example, an electronic conductivity of about $1\times10^{-6}$ S/cm to about $1\times10^{1}$ S/cm, about $2\times10^{-6}$ S/cm to about $1\times10^{1}$ S/cm, about $2\times10^{-6}$ S/cm to about 5 S/cm, about $4\times10^{-6}$ S/cm to about 5 S/cm, about $4\times10^{-6}$ S/cm to about 1 S/cm, about $5\times10^{-6}$ S/cm to about 1 S/cm, about $1\times10^{-5}$ S/cm to about 1 S/cm, about $2\times10^{-5}$ S/cm to about 1 S/cm, about $4\times10^{-5}$ S/cm to about 1 S/cm, about $5\times10^{-5}$ S/cm to about 1 S/cm, about $1\times10^{-4}$ S/cm to about 1 S/cm, about $2\times10^{-4}$ S/cm to about $2\times10^{-4}$ S/cm to about $5\times10^{-1}$ S/cm, or about $2\times10^{-4}$ S/cm to about $1\times10^{-1}$ S/cm. At a temperature of 25° C., the mixed conductor may have, for example, an ionic conductivity of about $1\times10^{-7}$ S/cm to about $1\times10$ S/cm, about $2\times10^{-7}$ S/cm to about $1\times10^{1}$ S/cm, about $2\times10^{-6}$ S/cm to about 5 S/cm, about $4\times10^{-6}$ S/cm to about 5 S/cm, about $4\times10^{-6}$ S/cm to about 1 S/cm, about $5\times10^{-6}$ S/cm to about 1 S/cm, about $1\times10^{-5}$ S/cm to about 1 S/cm, about $2\times10^{-5}$ S/cm to about 1 S/cm, about $4\times10^{-5}$ S/cm to about 1 S/cm, about $5\times10^{-5}$ S/cm to about 1 S/cm, about $1\times10^{-4}$ S/cm to about 1 S/cm, about $2\times10^{-4}$ S/cm to about 1 S/cm, about $2\times10^{-4}$ S/cm to about $5\times10^{-1}$ S/cm, or about $2\times10^{-4}$ S/cm to about $1\times10^{-1}$ S/cm.

When the lithium-containing metal oxide provides ionic conductivity and electronic conductivity at the same time as a mixed conductor, a cathode may be prepared by using a porous film including the lithium-containing metal oxide without a separate conductive material and electrolyte.

The lithium-containing metal oxide may be, for example, at least one of a spinel compound or a perovskite compound. When the lithium-containing metal oxide includes a compound having such a crystal structure, the decomposition of a cathode due to radicals generated in an electrochemical reaction may be suppressed.

The lithium-containing metal oxide includes, for example, a perovskite compound represented by Formula 1:

$$Li_xA_yG_zO_{3-\delta} \quad \text{Formula 1}$$

In Formula 1, each A and G are independently at least one of a Group 2 to a Group 16 element, and 0<x<1, 0<y<1, 0<x+y≤1, 0<z≤1.5, and 0≤δ≤1.5. In an aspect, b represents an oxygen vacancy content.

The perovskite compound is a compound having a perovskite crystal structure or a perovskite-like crystal structure.

For example, in Formula 1, A may be at least one of H, Na, K, Rb, Cs, Ca, Sr, Ba, Y, La, Ce, Pr, Nd, Pm, Sm, Gd, Tb, Dy, Ho, or Er, G may be at least one of Ti, Pd, Pb, Fe, Ir, Co, Rh, Mn, Ni, Cr, Ru, Re, Sn, V, Ge, W, Zr, Mo, Hf, U, Nb, Th, Ta, Bi, Li, H, Na, K, Rb, Cs, Ca, Sr, Ba, Y, La, Ce, Pr, Nd, Pm, Sm, Gd, Tb, Dy, Ho, Er, Mg, Al, Si, Sc, Zn, Ga, Rb, Ag, Cd, In, Sb, Pt, Au, or Pb, and 0.2<x≤0.7, 0<y≤0.7, 0<x+y<1, 0<z≤1.2, and 0≤δ≤1.2.

For example, in Formula 1, A may be at least one of La, Ce, Pr, Gd, Ca, Sr, or Ba, M may be at least one of Ti, Mn, Ni, Ru, Cr, Co, Ir, Fe, Pd, Pb, Rh, Sn, V, Re, Ge, W, Zr, Mo, Nb, Ta, Hf, or Bi, and 0.2<x≤0.5, 0.4<y≤0.7, 0<x+y<1, 0.8<z 1.2, and 0≤δ≤1.0.

The perovskite compound may have, for example, an AB'O₃ phase. In some A-sites of the perovskite structure, a vacancy and lithium (Li) are arranged, and the perovskite compound has a crystalline phase having orthorhombic, cubic, monoclinic, or triclinic symmetry, in which the oxygen vacancy is present. In addition, when the lithium concentration in an A site is optimized, lithium ionic conductivity is excellent, and when a metal (G) having low oxygen vacancy producing energy is introduced into a B-site, electronic conductivity is increased.

The perovskite compound includes, for example, a MOs octahedron, six oxygen forms apexes in the MOs octahedron, a structure where M in Formula 1 is positioned at the center of the octahedron, and the octahedron has corner sharing. A perovskite compound may have a structure in which lanthanum (La), lithium (Li), and a vacancy are randomly distributed according to a composition ratio in a space formed through the connection among the apexes of the octahedron. In the perovskite compound, for example, through a vacant layer in lanthanum (La), lithium ions are conducted, and electrons are conducted through a metal (G) ion layer.

According to the results of X-ray diffraction analysis, the perovskite compound shows, for example, a primary peak at the angle of diffraction of $2\theta=32.5°\pm2.5°$ and minor peaks at the angle of diffraction ($2\theta$) of $46.5°\pm2.5°$ and/or at the angle of diffraction ($2\theta$) of $57.5°\pm2.5°$, when analyzed using Cu Kα radiation. The primary peak means a peak having the greatest intensity, and the minor peak has weaker intensity than the primary peak.

For example, the ratio ($I_b/I_a$) of the peak intensity at the angle of diffraction of $2\theta=32.5°\pm2.5°$ ($I(32.5°\pm2.5°)$: $I_a$) and the peak intensity at the angle of diffraction of $2\theta=46.5°\ 2.5°$ ($I(46.5°\ 2.5°)$: $I_b$) in the X-ray diffraction of the perovskite compound, is 0.1 or more, for example, about 0.1 to about 0.9, for example, about 0.2 to about 0.6. The ratio ($I_c/I_a$) of the peak intensity at the angle of diffraction of $2\theta=32.5°\pm2.5°$ ($I(32.5°\pm2.5°)$: $I_a$) and the peak intensity at the angle of diffraction of $2\theta=57.5°\pm2.5°$ ($I(57.5°\pm2.5°)$: $I_c$) in the X-ray diffraction of the perovskite compound is, 0.1 or more, for example, about 0.1 to about 0.9, for example, about 0.2 to about 0.8, for example, about 0.2 to about 0.4. The perovskite compound includes, for example, at least one of $Li_{0.34}La_{0.55}TiO_{3-\delta}$ ($0\leq\delta\leq1.0$), $Li_{0.34}La_{0.55}MnO_{3-\delta}$ ($0\leq\delta\leq1.0$), $Li_{0.34}La_{0.55}NiO_{3-\delta}$ ($0\leq\delta\leq1.0$), $Li_{0.34}La_{0.55}CrO_{3-\delta}$ ($0\leq\delta\leq1.0$), $Li_{0.34}La_{0.55}CoO_{3-\delta}$ ($0\leq\delta\leq1.0$), $Li_{0.34}La_{0.55}IrO_{3-\delta}$ ($0\leq\delta\leq1.0$), $Li_{0.34}La_{0.55}RuO_{3-\delta}$ ($0\leq\delta\leq1.0$), $Li_{0.34}La_{0.55}TiO_{3-\delta}$ ($0\leq\delta\leq1.0$), $Li_{0.34}La_{0.55}FeO_{3-\delta}$ ($0\leq\delta\leq1.0$), $Li_{0.34}La_{0.55}PdO_{3-\delta}$ ($0\leq\delta\leq1.0$), $Li_{0.34}La_{0.55}PbO_{3-\delta}$ ($0\leq\delta\leq1.0$), $Li_{0.34}La_{0.55}RhO_{3-\delta}$ ($0\leq\delta\leq1.0$), $Li_{0.34}La_{0.55}SnO_{3-\delta}$ ($0\leq\delta\leq1.0$), $Li_{0.34}La_{0.55}VO_{3-\delta}$ ($0\leq\delta\leq1.0$), $Li_{0.34}La_{0.55}ReO_{3-\delta}$ ($0\leq\delta\leq1.0$), $Li_{0.34}La_{0.55}GeO_{3-\delta}$ ($0\leq\delta\leq1.0$), $Li_{0.34}La_{0.55}WO_{3-\delta}$ ($0\leq\delta\leq1.0$), $Li_{0.34}La_{0.55}ZrO_{3-\delta}$ ($0\leq\delta\leq1.0$), $Li_{0.34}La_{0.55}MoO_{3-\delta}$ ($0\leq\delta\leq1.0$), $Li_{0.34}La_{0.55}NbO_{3-\delta}$ ($0\leq\delta\leq1.0$), $Li_{0.34}La_{0.55}TaO_{3-\delta}$ ($0\leq\delta\leq1.0$), $Li_{0.34}La_{0.55}HfO_{3-\delta}$ ($0\leq\delta\leq1.0$), $Li_{0.34}La_{0.55}BiO_{3-\delta}$ ($0\leq\delta\leq1.0$), $Li_{0.10}La_{0.63}TiO_{3-\delta}$ ($0\leq\delta\leq1.0$), $Li_{0.10}La_{0.63}MnO_{3-\delta}$ ($0\leq\delta\leq1.0$), $Li_{0.10}La_{0.63}NiO_{3-\delta}$ ($0\leq\delta\leq1.0$), $Li_{0.10}La_{0.63}CrO_{3-\delta}$ ($0\leq\delta\leq1.0$), $L_{0.10}La_{0.63}CoO_{3-\delta}$ ($0\leq\delta\leq1.0$), $Li_{0.10}La_{0.63}IrO_{3-\delta}$ ($0\leq\delta\leq1.0$), $Li_{0.10}La_{0.63}RuO_{3-\delta}$ ($0\leq\delta\leq1.0$), $Li_{0.10}La_{0.63}TiO_{3-\delta}$ ($0\leq\delta\leq1.0$), $Li_{0.10}La_{0.63}FeO_{3-\delta}$ ($0\leq\delta\leq1.0$), $L_{0.10}La_{0.63}PdO_{3-\delta}$ ($0\leq\delta\leq1.0$), $Li_{0.10}La_{0.63}PbO_{3-\delta}$ ($0\leq\delta\leq1.0$), $Li_{0.10}La_{0.63}RhO_{3-\delta}$ ($0\leq\delta\leq1.0$), $Li_{0.10}La_{0.63}SnO_{3-\delta}$ ($0\leq\delta\leq1.0$), $Li_{0.10}La_{0.63}VO_{3-\delta}$ ($0\leq\delta\leq1.0$), $L_{0.10}La_{0.63}ReO_{3-\delta}$ ($0\leq\delta\leq1.0$), $Li_{0.10}La_{0.3}GeO_{3-\delta}$ ($0\leq\delta\leq1.0$), $Li_{0.10}La_{0.63}WO_{3-\delta}$ ($0\leq\delta\leq1.0$), $Li_{0.10}La_{0.63}ZrO_{3-\delta}$ ($0\leq\delta\leq1.0$), $Li_{0.10}La_{0.63}MoO_{3-\delta}$ ($0\leq\delta\leq1.0$), $Li_{0.10}La_{0.63}NbO_{3-\delta}$ ($0\leq\delta\leq1.0$), $Li_{0.10}La_{0.63}TaO_{3-\delta}$ ($0\leq\delta\leq1.0$), $Li_{0.10}La_{0.63}HfO_{3-\delta}$ ($0\leq\delta\leq1.0$), $Li_{0.10}La_{0.63}BiO_{3-\delta}$ ($0\leq\delta\leq1.0$), $Li_{0.20}La_{0.60}TiO_{3-\delta}$ ($0\leq\delta\leq1.0$), $Li_{0.20}La_{0.60}MnO_{3-\delta}$ ($0\leq\delta\leq1.0$), $Li_{0.20}La_{0.60}NiO_{3-\delta}$ ($0\leq\delta\leq1.0$), $Li_{0.20}La_{0.60}CrO_{3-\delta}$ ($0\leq\delta\leq1.0$), $Li_{0.20}La_{0.60}CoO_{3-\delta}$ ($0\leq\delta\leq1.0$), $Li_{0.20}La_{0.60}IrO_{3-\delta}$ ($0\leq\delta\leq1.0$), $Li_{0.20}La_{0.60}RuO_{3-\delta}$ ($0\leq\delta\leq1.0$), $Li_{0.20}La_{0.60}TiO_{3-\delta}$ ($0\leq\delta\leq1.0$), $Li_{0.20}La_{0.60}FeO_{3-\delta}$ ($0\leq\delta\leq1.0$), $Li_{0.20}La_{0.60}PdO_{3-\delta}$ ($0\leq\delta\leq1.0$), $Li_{0.20}La_{0.60}PbO_{3-\delta}$ ($0\leq\delta\leq1.0$), $Li_{0.20}La_{0.60}RhO_{3-\delta}$ ($0\leq\delta\leq1.0$), $Li_{0.20}La_{0.60}SnO_{3-\delta}$ ($0\leq\delta\leq1.0$), $Li_{0.20}La_{0.60}VO_{3-\delta}$ ($0\leq\delta\leq1.0$), $Li_{0.20}La_{0.60}ReO_{3-\delta}$ ($0\leq\delta\leq1.0$), $Li_{0.20}La_{0.60}GeO_{3-\delta}$ ($0\leq\delta\leq1.0$), $Li_{0.20}La_{0.6}WO_{3-\delta}$ ($0\leq\delta\leq1.0$), $Li_{0.20}La_{0.60}ZrO_{3-\delta}$ ($0\leq\delta\leq1.0$), $Li_{0.20}La_{0.60}MoO_{3-\delta}$ ($0\leq\delta\leq1.0$), $Li_{0.20}La_{0.60}NbO_{3-\delta}$ ($0\leq\delta\leq1.0$), $Li_{0.20}La_{0.60}TaO_{3-\delta}$ ($0\leq\delta\leq1.0$), $Li_{0.20}La_{0.60}HfO_{3-\delta}$ ($0\leq\delta\leq1.0$), $Li_{0.20}La_{0.60}BiO_{3-\delta}$ ($0\leq\delta\leq1.0$), $Li_{0.30}La_{0.57}TiO_{3-\delta}$ ($0\leq\delta\leq1.0$), $Li_{0.30}La_{0.57}MnO_{3-\delta}$ ($0\leq\delta\leq1.0$), $L_{0.30}La_{0.57}NiO_{3-\delta}$ ($0\leq\delta\leq1.0$), $Li_{0.30}La_{0.57}CrO_{3-\delta}$ ($0\leq\delta\leq1.0$), $Li_{0.30}La_{0.57}CoO_{3-\delta}$ ($0\leq\delta\leq1.0$), $Li_{0.30}La_{0.57}IrO_{3-\delta}$ ($0\leq\delta\leq1.0$), $Li_{0.30}La_{0.57}RuO_{3-\delta}$ ($0\leq\delta\leq1.0$), $Li_{0.30}La_{0.57}TiO_{3-\delta}$ ($0\leq\delta\leq1.0$), $Li_{0.30}La_{0.57}FeO_{3-\delta}$ ($0\leq\delta\leq1.0$), $Li_{0.30}La_{0.57}PdO_{3-\delta}$ ($0\leq\delta\leq1.0$), $Li_{0.30}La_{0.57}PbO_{3-\delta}$ ($0\leq\delta\leq1.0$), $Li_{0.30}La_{0.57}RhO_{3-\delta}$ ($0\leq\delta\leq1.0$), $Li_{0.30}La_{0.57}SnO_{3-\delta}$ ($0\leq\delta\leq1.0$), $Li_{0.30}La_{0.57}VO_{3-\delta}$ ($0\leq\delta\leq1.0$), $Li_{0.30}La_{0.57}ReO_{3-\delta}$ ($0\leq\delta\leq1.0$), $Li_{0.30}La_{0.57}GeO_{3-\delta}$ ($0\leq\delta\leq1.0$), $Li_{0.30}La_{0.57}WO_{3-\delta}$ ($0\leq\delta\leq1.0$), $Li_{0.30}La_{0.57}ZrO_{3-\delta}$ ($0\leq\delta\leq1.0$), $Li_{0.30}La_{0.57}MoO_{3-\delta}$ ($0\leq\delta\leq1.0$), $Li_{0.30}La_{0.57}NbO_{3-\delta}$ ($0\leq\delta\leq1.0$), $Li_{0.30}La_{0.57}TaO_{3-\delta}$ ($0\leq\delta\leq1.0$), $Li_{0.30}La_{0.57}HfO_3$ ($0\leq\delta\leq1.0$), $L_{0.30}La_{0.57}BiO_{3-\delta}$ ($0\leq\delta\leq1.0$), $Li_{0.40}La_{0.53}TiO_{3-\delta}$ ($0\leq\delta\leq1.0$), $Li_{0.40}La_{0.53}MnO_{3-\delta}$ ($0\leq\delta\leq1.0$), $Li_{0.40}La_{0.53}NiO_{3-\delta}$ ($0\leq\delta\leq1.0$), $Li_{0.40}La_{0.53}CrO_{3-\delta}$ ($0\leq\delta\leq1.0$), $Li_{0.40}La_{0.53}CoO_{3-\delta}$ ($0\leq\delta\leq1.0$), $Li_{0.40}La_{0.53}IrO_{3-\delta}$ ($0\leq\delta\leq1.0$), $Li_{0.40}La_{0.53}RuO_{3-\delta}$ ($0\leq\delta\leq1.0$), $Li_{0.40}La_{0.53}TiO_{3-\delta}$ ($0\leq\delta\leq1.0$), $Li_{0.40}La_{0.53}FeO_{3-\delta}$ ($0\leq\delta\leq1.0$), $L_{0.40}La_{0.53}PdO_{3-\delta}$ ($0\leq\delta\leq1.0$), $Li_{0.40}La_{0.53}PbO_{3-\delta}$ ($0\leq\delta\leq1.0$), $Li_{0.40}La_{0.53}RhO_{3-\delta}$ ($0\leq\delta\leq1.0$), $Li_{0.40}La_{0.3}SnO_{3-\delta}$ ($0\leq\delta\leq1.0$), $Li_{0.40}La_{0.53}VO_{3-\delta}$ ($0\leq\delta\leq1.0$), $L_{0.40}La_{0.53}ReO_{3-\delta}$ ($0\leq\delta\leq1.0$), $Li_{0.40}La_{0.53}GeO_{3-\delta}$ ($0\leq\delta\leq1.0$), $Li_{0.40}La_{0.53}WO_{3-\delta}$ ($0\leq\delta\leq1.0$), $Li_{0.40}La_{0.53}ZrO_{3-\delta}$ ($0\leq\delta\leq1.0$), $Li_{0.40}La_{0.53}MoO_{3-\delta}$ ($0\leq\delta\leq1.0$), $Li_{0.40}La_{0.53}NbO_{3-\delta}$ ($0\leq\delta\leq1.0$), $Li_{0.40}La_{0.53}TaO_{3-\delta}$ ($0\leq\delta\leq1.0$), $Li_{0.40}La_{0.53}HfO_{3-\delta}$ ($0\leq\delta\leq1.0$), $Li_{0.40}La_{0.53}BiO_{3-\delta}$ ($0\leq\delta\leq1.0$), $Li_{0.45}La_{0.52}TiO_{3-\delta}$ ($0\leq\delta\leq1.0$), $Li_{0.45}La_{0.52}MnO_{3-\delta}$ ($0\leq\delta\leq1.0$), $Li_{0.45}La_{0.52}NiO_{3-\delta}$ ($0\leq\delta\leq1.0$), $Li_{0.45}La_{0.52}CrO_{3-\delta}$ ($0\leq\delta\leq1.0$), $Li_{0.45}La_{0.52}CoO_{3-\delta}$ ($0\leq\delta\leq1.0$), $Li_{0.45}La_{0.52}IrO_{3-\delta}$ ($0\leq\delta\leq1.0$), $Li_{0.45}La_{0.52}RuO_{3-\delta}$ ($0\leq\delta\leq1.0$), $Li_{0.45}La_{0.52}TiO_{3-\delta}$ ($0\leq\delta\leq1.0$), $Li_{0.45}La_{0.52}FeO_{3-\delta}$ ($0\leq\delta\leq1.0$), $Li_{0.45}La_{0.52}PdO_{3-\delta}$ ($0\leq\delta\leq1.0$), $Li_{0.45}La_{0.52}PbO_{3-\delta}$ ($0\leq\delta\leq1.0$), $Li_{0.45}La_{0.52}RhO_{3-\delta}$ ($0\leq\delta\leq1.0$), $Li_{0.45}La_{0.52}SnO_{3-\delta}$ ($0\leq\delta\leq1.0$), $Li_{0.45}La_{0.52}VO_{3-\delta}$ ($0\leq\delta\leq1.0$), $Li_{0.45}La_{0.52}ReO_{3-\delta}$ ($0\leq\delta\leq1.0$), $Li_{0.45}La_{0.52}GeO_{3-\delta}$ ($0\leq\delta\leq1.0$), $Li_{0.45}La_{0.52}WO_{3-\delta}$ ($0\leq\delta\leq1.0$), $Li_{0.45}La_{0.52}ZrO_{3-\delta}$ ($0\leq\delta\leq1.0$), $Li_{0.45}La_{0.52}MoO_{3-\delta}$ ($0\leq\delta\leq1.0$), $Li_{0.45}La_{0.52}NbO_{3-\delta}$ ($0\leq\delta\leq1.0$), $Li_{0.45}La_{0.52}TaO_{3-\delta}$ ($0\leq\delta\leq1.0$), $Li_{0.45}La_{0.52}BiO_{3-\delta}$ ($0\leq\delta\leq1.0$), $Li_{0.34}Ce_{0.55}TiO_{3-\delta}$ ($0\leq\delta\leq1.0$), $Li_{0.34}Ce_{0.55}MnO_{3-\delta}$ ($0\leq\delta\leq1.0$), $Li_{0.34}Ce_{0.55}NiO_{3-\delta}$ ($0\leq\delta\leq1.0$), $Li_{0.34}Ce_{0.55}CrO_{3-\delta}$ ($0\leq\delta\leq1.0$), $Li_{0.34}Ce_{0.55}CoO_{3-\delta}$ ($0\leq\delta\leq1.0$), $Li_{0.34}Ce_{0.55}IrO_{3-\delta}$ ($0\leq\delta\leq1.0$), $Li_{0.34}Ce_{0.55}RuO_{3-\delta}$ ($0\leq\delta\leq1.0$), $L_{0.34}Ce_{0.55}TiO_{3-\delta}$ ($0\leq\delta\leq1.0$), $Li_{0.34}Ce_{0.55}FeO_{3-\delta}$ ($0\leq\delta\leq1.0$), $Li_{0.34}Ce_{0.55}PdO_{3-\delta}$ ($0\leq\delta\leq1.0$), $Li_{0.34}Ce_{0.55}PbO_{3-\delta}$ ($0\leq\delta\leq1.0$), $Li_{0.34}Ce_{0.55}RhO_{3-\delta}$ ($0\leq\delta\leq1.0$), $Li_{0.34}Ce_{0.55}SnO_{3-\delta}$ ($0\leq\delta\leq1.0$), $Li_{0.34}Ce_{0.55}VO_{3-\delta}$ ($0\leq\delta\leq1.0$), $Li_{0.34}Ce_{0.55}ReO_{3-\delta}$ ($0\leq\delta\leq1.0$), $Li_{0.34}Ce_{0.55}GeO_{3-\delta}$ ($0\leq\delta\leq1.0$), $Li_{0.34}Ce_{0.55}WO_{3-\delta}$ ($0\leq\delta\leq1.0$), $Li_{0.34}Ce_{0.55}ZrO_{3-\delta}$ ($0\leq\delta\leq1.0$), $Li_{0.34}Ce_{0.55}MoO_{3-\delta}$ ($0\leq\delta\leq1.0$), $Li_{0.34}Ce_{0.55}NbO_{3-\delta}$ ($0\leq\delta\leq1.0$), $Li_{0.34}Ce_{0.55}TaO_{3-\delta}$ ($0\leq\delta\leq1.0$), $Li_{0.34}Ce_{0.55}HfO_{3-\delta}$ ($0\leq\delta\leq1.0$), $Li_{0.34}Ce_{0.55}BiO_{3-\delta}$ ($0\leq\delta\leq1.0$), $Li_{0.10}Ce_{0.63}TiO_{3-\delta}$ ($0\leq\delta\leq1.0$), $Li_{0.10}Ce_{0.63}MnO_{3-\delta}$ ($0\leq\delta\leq1.0$), $Li_{0.10}Ce_{0.63}NiO_{3-\delta}$ ($0\leq\delta\leq1.0$), $Li_{0.10}Ce_{0.63}CrO_{3-\delta}$ (0≤δ≤1.0), $Li_{0.10}Ce_{0.63}CoO_{3-\delta}$ (0≤δ≤1.0), $Li_{0.10}Ce_{0.63}IrO_{3-\delta}$ (0≤δ≤1.0), $Li_{0.10}Ce_{0.63}RuO_{3-\delta}$ (0≤δ≤1.0), $L_{0.10}Ce_{0.63}TiO_{3-\delta}$ (0≤δ≤1.0), $Li_{0.10}Ce_{0.63}FeO_{3-\delta}$ (0≤δ≤1.0), $Li_{0.10}Ce_{0.63}PdO_{3-\delta}$ (0≤δ≤1.0), $Li_{0.10}Ce_{0.63}PbO_{3-\delta}$ (0≤δ≤1.0), $Li_{0.10}Ce_{0.63}RhO_{3-\delta}$ (0≤δ≤1.0), $Li_{0.10}Ce_{0.63}SnO_{3-\delta}$ (0≤δ≤1.0), $Li_{0.10}Ce_{0.63}VO_{3-\delta}$ (0≤δ≤1.0), $Li_{0.10}Ce_{0.63}ReO_{3-\delta}$ (0≤δ≤1.0), $Li_{0.10}Ce_{0.63}GeO_{3-\delta}$ (0≤δ≤1.0), $Li_{0.10}Ce_{0.63}WO_{3-\delta}$ (0≤δ≤1.0), $Li_{0.10}Ce_{0.63}ZrO_{3-\delta}$ (0≤δ≤1.0), $Li_{0.10}Ce_{0.63}MoO_{3-\delta}$ (0≤δ≤1.0), $Li_{0.10}Ce_{0.63}NbO_{3-\delta}$ (0≤δ≤1.0), $Li_{0.10}Ce_{0.63}TaO_{3-\delta}$ (0≤δ≤1.0), $Li_{0.10}Ce_{0.63}HfO_{3-\delta}$ (0≤δ≤1.0), $Li_{0.10}Ce_{0.63}BiO_{3-\delta}$ (0≤δ≤1.0), $Li_{0.20}Ce_{0.60}TiO_{3-\delta}$ (0≤δ≤1.0), $Li_{0.20}Ce_{0.60}MnO_{3-\delta}$ (0≤δ≤1.0), $Li_{0.20}Ce_{0.60}NiO_{3-\delta}$ (0≤δ≤1.0), $Li_{0.20}Ce_{0.60}CrO_{3-\delta}$ (0≤δ≤1.0), $Li_{0.20}Ce_{0.60}CoO_{3-\delta}$ (0≤δ≤1.0), $Li_{0.20}Ce_{0.60}IrO_{3-\delta}$ (0≤δ≤1.0), $Li_{0.20}Ce_{0.60}RuO_{3-\delta}$ (0≤δ≤1.0), $Li_{0.20}Ce_{0.60}TiO_{3-\delta}$ (0≤δ≤1.0), $Li_{0.20}Ce_{0.60}FeO_{3-\delta}$ (0≤δ≤1.0), $Li_{0.20}Ce_{0.60}PdO_{3-\delta}$ (0≤δ≤1.0), $Li_{0.20}Ce_{0.60}PbO_{3-\delta}$ (0≤δ≤1.0), $Li_{0.20}Ce_{0.60}RhO_{3-\delta}$ (0≤δ≤1.0), $Li_{0.20}Ce_{0.60}SnO_{3-\delta}$ (0≤δ≤1.0), $Li_{0.20}Ce_{0.6}VO_{3-\delta}$ (0≤δ≤1.0), $Li_{0.20}Ce_{0.60}ReO_{3-\delta}$ (0≤δ≤1.0), $Li_{0.20}Ce_{0.60}GeO_{3-\delta}$ (0≤δ≤1.0), $Li_{0.20}Ce_{0.60}WO_{3-\delta}$ (0≤δ≤1.0), $Li_{0.20}Ce_{0.60}ZrO_{3-\delta}$ (0≤δ≤1.0), $Li_{0.20}Ce_{0.60}MoO_{3-\delta}$ (0≤δ≤1.0), $Li_{0.20}Ce_{0.60}NbO_{3-\delta}$ (0≤δ≤1.0), $Li_{0.20}Ce_{0.60}TaO_{3-\delta}$ (0≤δ≤1.0), $Li_{0.20}Ce_{0.60}HfO_{3-\delta}$ (0≤δ≤1.0), $Li_{0.20}Ce_{0.60}BiO_{3-\delta}$ (0≤δ≤1.0), $Li_{0.30}Ce_{0.57}TiO_{3-\delta}$ (0≤δ≤1.0), $Li_{0.30}Ce_{0.57}MnO_{3-\delta}$ (0≤δ≤1.0), $Li_{0.30}Ce_{0.57}NiO_{3-\delta}$ (0≤δ≤1.0), $Li_{0.30}Ce_{0.57}CrO_{3-\delta}$ (0≤δ≤1.0), $Li_{0.30}Ce_{0.57}CoO_{3-\delta}$ (0≤δ≤1.0), $Li_{0.30}Ce_{0.57}IrO_{3-\delta}$ (0≤δ≤1.0), $Li_{0.30}Ce_{0.57}RuO_{3-\delta}$ (0≤δ≤1.0), $L_{0.30}Ce_{0.57}TiO_{3-\delta}$ (0≤δ≤1.0), $Li_{0.30}Ce_{0.57}FeO_{3-\delta}$ (0≤δ≤1.0), $Li_{0.30}Ce_{0.57}PdO_{3-\delta}$ (0≤δ≤1.0), $Li_{0.30}Ce_{0.57}PbO_{3-\delta}$ (0≤δ≤1.0), $Li_{0.30}Ce_{0.57}RhO_{3-\delta}$ (0≤δ≤1.0), $Li_{0.30}Ce_{0.57}SnO_{3-\delta}$ (0≤δ≤1.0), $Li_{0.30}Ce_{0.57}VO_{3-\delta}$ (0≤δ≤1.0), $Li_{0.30}Ce_{0.57}ReO_{3-\delta}$ (0≤δ≤1.0), $Li_{0.30}Ce_{0.57}GeO_{3-\delta}$ (0≤δ≤1.0), $Li_{0.30}Ce_{0.57}WO_{3-\delta}$ (0≤δ≤1.0), $Li_{0.30}Ce_{0.57}ZrO_{3-\delta}$ (0≤δ≤1.0), $Li_{0.30}Ce_{0.57}MoO_{3-\delta}$ (0≤δ≤1.0), $Li_{0.30}Ce_{0.57}NbO_{3-\delta}$ (0≤δ≤1.0), $Li_{0.30}Ce_{0.57}TaO_{3-\delta}$ (0≤δ≤1.0), $Li_{0.30}Ce_{0.57}HfO_{3-\delta}$ (0≤δ≤1.0), $Li_{0.30}Ce_{0.57}BiO_{3-\delta}$ (0≤δ≤1.0), $Li_{0.40}Ce_{0.53}TiO_{3-\delta}$ (0≤δ≤1.0), $Li_{0.40}Ce_{0.53}MnO_{3-\delta}$ (0≤δ≤1.0), $Li_{0.40}Ce_{0.53}NiO_{3-\delta}$ (0≤δ≤1.0), $Li_{0.40}Ce_{0.53}CrO_{3-\delta}$ (0≤δ≤1.0), $Li_{0.40}Ce_{0.53}CoO_{3-\delta}$ (0≤δ≤1.0), $Li_{0.40}Ce_{0.53}IrO_{3-\delta}$ (0≤δ≤1.0), $Li_{0.40}Ce_{0.53}RuO_{3-\delta}$ (0≤δ≤1.0), $L_{0.40}Ce_{0.53}TiO_{3-\delta}$ (0≤δ≤1.0), $Li_{0.40}Ce_{0.53}FeO_{3-\delta}$ (0≤δ≤1.0), $Li_{0.40}Ce_{0.53}PdO_{3-\delta}$ (0≤δ≤1.0), $Li_{0.40}Ce_{0.53}PbO_{3-\delta}$ (0≤δ≤1.0), $Li_{0.40}Ce_{0.53}RhO_{3-\delta}$ (0≤δ≤1.0), $Li_{0.40}Ce_{0.53}SnO_{3-\delta}$ (0≤δ≤1.0), $Li_{0.40}Ce_{0.53}VO_{3-\delta}$ (0≤δ≤1.0), $Li_{0.40}Ce_{0.53}ReO_{3-\delta}$ (0≤δ≤1.0), $Li_{0.40}Ce_{0.53}GeO_{3-\delta}$ (0≤δ≤1.0), $Li_{0.40}Ce_{0.53}WO_{3-\delta}$ (0≤δ≤1.0), $Li_{0.40}Ce_{0.53}ZrO_{3-\delta}$ (0≤δ≤1.0), $Li_{0.40}Ce_{0.53}MoO_{3-\delta}$ (0≤δ≤1.0), $Li_{0.40}Ce_{0.53}NbO_{3-\delta}$ (0≤δ≤1.0), $Li_{0.40}Ce_{0.53}TaO_{3-\delta}$ (0≤δ≤1.0), $Li_{0.40}Ce_{0.53}HfO_{3-\delta}$ (0≤δ≤1.0), $Li_{0.40}Ce_{0.53}BiO_{3-\delta}$ (0≤δ≤1.0), $Li_{0.45}Ce_{0.52}TiO_{3-\delta}$ (0≤δ≤1.0), $Li_{0.45}Ce_{0.52}MnO_{3-\delta}$ (0≤δ≤1.0), $Li_{0.45}Ce_{0.52}NiO_{3-\delta}$ (0≤δ≤1.0), $Li_{0.45}Ce_{0.52}CrO_{3-\delta}$ (0≤δ≤1.0), $Li_{0.45}Ce_{0.52}CoO_{3-\delta}$ (0≤δ≤1.0), $Li_{0.45}Ce_{0.52}IrO_{3-\delta}$ (0≤δ≤1.0), $Li_{0.45}Ce_{0.52}RuO_{3-\delta}$ (0≤δ≤1.0), $L_{0.45}Ce_{0.52}TiO_{3-\delta}$ (0≤δ≤1.0), $Li_{0.45}Ce_{0.52}FeO_{3-\delta}$ (0≤δ≤1.0), $Li_{0.45}Ce_{0.52}PdO_{3-\delta}$ (0≤δ≤1.0), $Li_{0.45}Ce_{0.52}PbO_{3-\delta}$ (0≤δ≤1.0), $Li_{0.45}Ce_{0.52}RhO_{3-\delta}$ (0≤δ≤1.0), $Li_{0.45}Ce_{0.52}SnO_{3-\delta}$ (0≤δ≤1.0), $Li_{0.45}Ce_{0.52}VO_{3-\delta}$ (0≤δ≤1.0), $Li_{0.45}Ce_{0.52}ReO_{3-\delta}$ (0≤δ≤1.0), $Li_{0.45}Ce_{0.52}GeO_{3-\delta}$ (0≤δ≤1.0), $Li_{0.45}Ce_{0.52}WO_{3-\delta}$ (0≤δ≤1.0), $Li_{0.45}Ce_{0.52}ZrO_{3-\delta}$ (0≤δ≤1.0), $Li_{0.45}Ce_{0.52}MoO_{3-\delta}$ (0≤δ≤1.0), $Li_{0.45}Ce_{0.52}NbO_{3-\delta}$ (0≤δ≤1.0), $Li_{0.45}Ce_{0.52}TaO_{3-\delta}$ (0≤δ≤1.0), $Li_{0.45}Ce_{0.52}HfO_{3-\delta}$ (0≤δ≤1.0), $Li_{0.45}Ce_{0.52}BiO_{3-\delta}$ (0≤δ≤1.0), $Li_{0.34}Pr_{0.55}TiO_3$ (0≤δ≤1.0), $Li_{0.34}Pr_{0.55}MnO_{3-\delta}$ (0≤δ≤1.0), $L_{0.34}Pr_{0.55}NiO_{3-\delta}$ (0≤δ≤1.0), $Li_{0.34}Pr_{0.55}CrO_{3-\delta}$ (0≤δ≤1.0), $Li_{0.34}Pr_{0.55}CoO_{3-\delta}$ (0≤δ≤1.0), $Li_{0.34}Pr_{0.55}IrO_{3-\delta}$ (0≤δ≤1.0), $Li_{0.34}Pr_{0.55}RuO_{3-\delta}$ (0≤δ≤1.0), $Li_{0.34}Pr_{0.55}TiO_{3-\delta}$ (0≤δ≤1.0), $Li_{0.34}Pr_{0.55}FeO_{3-\delta}$ (0≤δ≤1.0), $Li_{0.34}Pr_{0.55}PdO_{3-\delta}$ (0≤δ≤1.0), $Li_{0.34}Pr_{0.55}PbO_{3-\delta}$ (0≤δ≤1.0), $Li_{0.34}Pr_{0.55}RhO_{3-\delta}$ (0≤δ≤1.0), $Li_{0.34}Pr_{0.55}SnO_{3-\delta}$ (0≤δ≤1.0), $L_{0.34}Pr_{0.55}VO_{3-\delta}$ (0≤δ≤1.0), $L_{0.34}Pr_{0.55}ReO_{3-\delta}$ (0≤δ≤1.0), $Li_{0.34}Pr_{0.55}GeO_{3-\delta}$ (0≤δ≤1.0), $L_{0.34}Pr_{0.55}WO_{3-\delta}$ (0≤δ≤1.0), $L_{0.34}Pr_{0.55}ZrO_{3-\delta}$ (0≤δ≤1.0), $Li_{0.34}Pr_{0.55}MoO_{3-\delta}$ (0≤δ≤1.0), $Li_{0.34}Pr_{0.55}NbO_{3-\delta}$ (0≤δ≤1.0), $Li_{0.34}Pr_{0.55}TaO_{3-\delta}$ (0≤δ≤1.0), $L_{0.34}Pr_{0.55}HfO_{3-\delta}$ (0≤δ≤1.0), $L_{0.34}Pr_{0.55}BiO_{3-\delta}$ (0≤δ≤1.0), $Li_{0.10}Pr_{0.63}TiO_{3-\delta}$ (0≤δ≤1.0), $L_{0.10}Pr_{0.63}MnO_{3-\delta}$ (0≤δ≤1.0), $Li_{0.10}Pr_{0.63}NiO_{3-\delta}$ (0≤δ≤1.0), $Li_{0.10}Pr_{0.63}CrO_{3-\delta}$ (0≤δ≤1.0), $L_{0.10}Pr_{0.63}CoO_{3-\delta}$ (0≤δ≤1.0), $Li_{0.10}Pr_{0.63}IrO_{3-\delta}$ (0≤δ≤1.0), $L_{0.10}Pr_{0.63}RuO_{3-\delta}$ (0≤δ≤1.0), $Li_{0.10}Pr_{0.63}TiO_{3-\delta}$ (0≤δ≤1.0), $Li_{0.10}Pr_{0.63}FeO_{3-\delta}$ (0≤δ≤1.0), $Li_{0.10}Pr_{0.63}PdO_{3-\delta}$ (0≤δ≤1.0), $Li_{0.10}Pr_{0.63}PbO_{3-\delta}$ (0≤δ≤1.0), $L_{0.10}Pr_{0.63}RhO_{3-\delta}$ (0≤δ≤1.0), $Li_{0.10}Pr_{0.63}SnO_{3-\delta}$ (0≤δ≤1.0), $L_{0.10}Pr_{0.63}VO_{3-\delta}$ (0≤δ≤1.0), $L_{0.10}Pr_{0.63}ReO_{3-\delta}$ (0≤δ≤1.0), $Li_{0.10}Pr_{0.3}GeO_{3-\delta}$ (0≤δ≤1.0), $L_{0.10}Pr_{0.63}WO_{3-\delta}$ (0≤δ≤1.0), $Li_{0.10}Pr_{0.63}ZrO_{3-\delta}$ (0≤δ≤1.0), $Li_{0.10}Pr_{0.63}MoO_{3-\delta}$ (0≤δ≤1.0), $Li_{0.10}Pr_{0.63}NbO_{3-\delta}$ (0≤δ≤1.0), $Li_{0.10}Pr_{0.63}TaO_{3-\delta}$ (0≤δ≤1.0), $L_{0.10}Pr_{0.3}HfO_{3-\delta}$ (0≤δ≤1.0), $L_{0.10}Pr_{0.63}BiO_{3-\delta}$ (0≤δ≤1.0), $Li_{0.20}Pr_{0.60}TiO_{3-\delta}$ (0≤δ≤1.0), $Li_{0.20}Pr_{0.60}MnO_{3-\delta}$ (0≤δ≤1.0), $Li_{0.20}Pr_{0.60}NiO_{3-\delta}$ (0≤δ≤1.0), $L_{0.20}Pr_{0.60}CrO_{3-\delta}$ (0≤δ≤1.0), $L_{0.20}Pr_{0.60}CoO_{3-\delta}$ (0≤δ≤1.0), $Li_{0.20}Pr_{0.60}IrO_{3-\delta}$ (0≤δ≤1.0), $Li_{0.20}Pr_{0.60}RuO_{3-\delta}$ (0≤δ≤1.0), $Li_{0.20}Pr_{0.60}TiO_{3-\delta}$ (0≤δ≤1.0), $Li_{0.20}Pr_{0.60}FeO_{3-\delta}$ (0≤δ≤1.0), $Li_{0.20}Pr_{0.60}PdO_{3-\delta}$ (0≤δ≤1.0), $Li_{0.20}Pr_{0.60}PbO_{3-\delta}$ (0≤δ≤1.0), $Li_{0.20}Pr_{0.60}RhO_{3-\delta}$ (0≤δ≤1.0), $Li_{0.20}Pr_{0.60}SnO_{3-\delta}$ (0≤δ≤1.0), $Li_{0.20}Pr_{0.60}VO_{3-\delta}$ (0≤δ≤1.0), $Li_{0.20}Pr_{0.60}ReO_{3-\delta}$ (0≤δ≤1.0), $Li_{0.20}Pr_{0.60}GeO_{3-\delta}$ (0≤δ≤1.0), $Li_{0.20}Pr_{0.60}WO_{3-\delta}$ (0≤δ≤1.0), $Li_{0.20}Pr_{0.60}ZrO_{3-\delta}$ (0≤δ≤1.0), $Li_{0.20}Pr_{0.60}MoO_{3-\delta}$ (0≤δ≤1.0), $Li_{0.20}Pr_{0.60}NbO_{3-\delta}$ (0≤δ≤1.0), $Li_{0.20}Pr_{0.60}TaO_{3-\delta}$ (0≤δ≤1.0), $Li_{0.20}Pr_{0.60}HfO_{3-\delta}$ (0≤δ≤1.0), $Li_{0.20}Pr_{0.60}BiO_{3-\delta}$ (0≤δ≤1.0), $Li_{0.30}Pr_{0.57}TiO_{3-\delta}$ (0≤δ≤1.0), $Li_{0.30}Pr_{0.57}MnO_{3-\delta}$ (0≤δ≤1.0), $L_{0.30}Pr_{0.57}NiO_{3-\delta}$ (0≤δ≤1.0), $L_{0.30}Pr_{0.57}CrO_{3-\delta}$ (0≤δ≤1.0), $L_{0.30}Pr_{0.57}CoO_{3-\delta}$ (0≤δ≤1.0), $Li_{0.30}Pr_{0.57}IrO_{3-\delta}$ (0≤δ≤1.0), $L_{0.30}Pr_{0.57}RuO_{3-\delta}$ (0≤δ≤1.0), $L_{0.30}Pr_{0.57}TiO_{3-\delta}$ (0≤δ≤1.0), $Li_{0.30}Pr_{0.57}FeO_{3-\delta}$ (0≤δ≤1.0), $Li_{0.30}Pr_{0.57}PdO_{3-\delta}$ (0≤δ≤1.0), $Li_{0.30}Pr_{0.57}PbO_{3-\delta}$ (0≤δ≤1.0), $Li_{0.30}Pr_{0.57}RhO_{3-\delta}$ (0≤δ≤1.0), $Li_{0.30}Pr_{0.57}SnO_{3-\delta}$ (0≤δ≤1.0), $Li_{0.30}Pr_{0.57}VO_{3-\delta}$ (0≤δ≤1.0), $Li_{0.30}Pr_{0.57}ReO_{3-\delta}$ (0≤δ≤1.0), $Li_{0.30}Pr_{0.57}GeO_{3-\delta}$ (0≤δ≤1.0), $Li_{0.30}Pr_{0.57}WO_3$ (0≤δ≤1.0), $L_{0.30}Pr_{0.57}ZrO_{3-\delta}$ (0≤δ≤1.0), $Li_{0.30}Pr_{0.57}MoO_{3-\delta}$ (0≤δ≤1.0), $Li_{0.30}Pr_{0.57}NbO_{3-\delta}$ (0≤δ≤1.0), $Li_{0.30}Pr_{0.57}TaO_{3-\delta}$ (0≤δ≤1.0), $Li_{0.30}Pr_{0.57}HfO_3$ (0≤δ≤1.0), $Li_{0.30}Pr_{0.57}BiO_{3-\delta}$ (0≤δ≤1.0), $Li_{0.40}Pr_{0.53}TiO_{3-\delta}$ (0≤δ≤1.0), $Li_{0.40}Pr_{0.53}MnO_{3-\delta}$ (0≤δ≤1.0), $Li_{0.40}Pr_{0.53}NiO_{3-\delta}$ (0≤δ≤1.0), $Li_{0.40}Pr_{0.53}CrO_{3-\delta}$ (0≤δ≤1.0), $Li_{0.40}Pr_{0.53}CoO_{3-\delta}$ (0≤δ≤1.0), $Li_{0.40}Pr_{0.53}IrO_{3-\delta}$ (0≤δ≤1.0), $Li_{0.40}Pr_{0.53}RuO_{3-\delta}$ (0≤δ≤1.0), $Li_{0.40}Pr_{0.53}TiO_{3-\delta}$ (0≤δ≤1.0), $Li_{0.40}Pr_{0.53}FeO_{3-\delta}$ (0≤δ≤1.0), $Li_{0.40}Pr_{0.53}PdO_{3-\delta}$ (0≤δ≤1.0), $Li_{0.40}Pr_{0.53}PbO_{3-\delta}$ (0≤δ≤1.0), $Li_{0.40}Pr_{0.53}RhO_{3-\delta}$ (0≤δ≤1.0), $Li_{0.40}Pr_{0.53}SnO_{3-\delta}$ (0≤δ≤1.0), $Li_{0.40}Pr_{0.53}VO_{3-\delta}$ (0≤δ≤1.0), $Li_{0.40}Pr_{0.53}ReO_{3-\delta}$ (0≤δ≤1.0), $Li_{0.40}Pr_{0.53}GeO_{3-\delta}$ (0≤δ≤1.0), $Li_{0.40}Pr_{0.53}WO_{3-\delta}$ (0≤δ≤1.0), $Li_{0.40}Pr_{0.53}ZrO_{3-\delta}$ (0≤δ≤1.0), $Li_{0.40}Pr_{0.53}MoO_{3-\delta}$ (0≤δ≤1.0), $Li_{0.40}Pr_{0.53}NbO_{3-\delta}$ (0≤δ≤1.0), $Li_{0.40}Pr_{0.53}TaO_{3-\delta}$ (0≤δ≤1.0), $Li_{0.40}Pr_{0.53}HfO_{3-\delta}$ (0≤δ≤1.0), $Li_{0.40}Pr_{0.53}BiO_{3-\delta}$ (0≤δ≤1.0), $Li_{0.45}Pr_{0.52}TiO_3$ (0≤δ≤1.0), $Li_{0.45}Pr_{0.52}MnO_{3-\delta}$ (0≤δ≤1.0), $Li_{0.45}Pr_{0.52}NiO_{3-\delta}$ (0≤δ≤1.0), $Li_{0.45}Pr_{0.52}CrO_{3-\delta}$ (0≤δ≤1.0), $Li_{0.45}Pr_{0.52}CoO_{3-\delta}$ (0≤δ≤1.0), $Li_{0.45}Pr_{0.52}IrO_{3-\delta}$ (0≤δ≤1.0), $Li_{0.45}Pr_{0.52}RuO_{3-\delta}$ (0≤δ≤1.0), $Li_{0.45}Pr_{0.52}TiO_{3-\delta}$ (0≤δ≤1.0), $Li_{0.45}Pr_{0.52}FeO_{3-\delta}$ (0≤δ≤1.0), $Li_{0.45}Pr_{0.52}PdO_{3-\delta}$ (0≤δ≤1.0), $Li_{0.45}Pr_{0.52}PbO_{3-\delta}$ (0≤δ≤1.0), $Li_{0.45}Pr_{0.52}RhO_{3-\delta}$ (0≤δ≤1.0), $Li_{0.45}Pr_{0.52}SnO_{3-\delta}$ (0≤δ≤1.0), $Li_{0.45}Pr_{0.52}VO_{3-\delta}$ (0≤δ≤1.0), $Li_{0.45}Pr_{0.52}ReO_{3-\delta}$ (0≤δ≤1.0), $Li_{0.45}Pr_{0.52}GeO_{3-\delta}$ (0≤δ≤1.0), $Li_{0.45}Pr_{0.52}WO_{3-\delta}$ (0≤δ≤1.0), $Li_{0.45}Pr_{0.52}ZrO_{3-\delta}$ (0≤δ≤1.0), $Li_{0.45}Pr_{0.52}MoO_{3-\delta}$ (0≤δ≤1.0), $Li_{0.45}Pr_{0.52}NbO_{3-\delta}$ (0≤δ≤1.0), $Li_{0.45}Pr_{0.52}TaO_{3-\delta}$ (0≤δ≤1.0), $Li_{0.45}Pr_{0.52}HfO_{3-\delta}$ (0≤δ≤1.0), $Li_{0.45}Pr_{0.52}BiO_{3-\delta}$ (0≤δ≤1.0), $Li_{0.10}Ca_{0.80}TiO_{3-\delta}$ (0≤δ≤1.0), $Li_{0.10}Ca_{0.80}MnO_{3-\delta}$ (0≤δ≤1.0), $Li_{0.10}Ca_{0.80}NiO_{3-\delta}$ (0≤δ≤1.0), $Li_{0.10}Ca_{0.80}CrO_{3-\delta}$ (0≤δ≤1.0), $Li_{0.10}Ca_{0.80}CoO_{3-\delta}$ (0≤δ≤1.0), $Li_{0.10}Ca_{0.80}IrO_{3-\delta}$ (0≤δ≤1.0), $Li_{0.10}Ca_{0.80}RuO_{3-\delta}$ (0≤δ≤1.0), $Li_{0.10}Ca_{0.80}TiO_{3-\delta}$ (0≤δ≤1.0), $Li_{0.10}Ca_{0.80}FeO_{3-\delta}$ (0≤δ≤1.0), $Li_{0.10}Ca_{0.80}PdO_{3-\delta}$ (0≤δ≤1.0), $Li_{0.10}Ca_{0.80}PbO_{3-\delta}$ (0≤δ≤1.0), $Li_{0.10}Ca_{0.80}RhO_{3-\delta}$ (0≤δ≤1.0), $Li_{0.10}Ca_{0.80}SnO_{3-\delta}$ (0≤δ≤1.0), $Li_{0.10}Ca_{0.80}VO_{3-\delta}$ (0≤δ≤1.0), $Li_{0.10}Ca_{0.80}ReO_{3-\delta}$ (0≤δ≤1.0), $Li_{0.10}Ca_{0.80}GeO_{3-\delta}$ (0≤δ≤1.0), $Li_{0.10}Ca_{0.80}WO_{3-\delta}$ (0≤δ≤1.0), $Li_{0.10}Ca_{0.80}ZrO_{3-\delta}$ (0≤δ≤1.0), $Li_{0.10}Ca_{0.80}MoO_{3-\delta}$ (0≤δ≤1.0), $Li_{0.10}Ca_{0.80}NbO_{3-\delta}$ (0≤δ≤1.0), $Li_{0.10}Ca_{0.80}TaO_{3-\delta}$ (0≤δ≤1.0), $Li_{0.10}Ca_{0.80}HfO_{3-\delta}$ (0≤δ≤1.0), $Li_{0.10}Ca_{0.80}BiO_{3-\delta}$ (0≤δ≤1.0), $Li_{0.20}Ca_{0.80}TiO_{3-\delta}$ (0≤δ≤1.0), $Li_{0.20}Ca_{0.60}MnO_{3-\delta}$ (0≤δ≤1.0), $Li_{0.20}Ca_{0.60}NiO_{3-\delta}$ (0≤δ≤1.0), $Li_{0.20}Ca_{0.80}CrO_{3-\delta}$ (0≤δ≤1.0), $Li_{0.20}Ca_{0.80}CoO_{3-\delta}$ (0≤δ≤1.0), $Li_{0.20}Ca_{0.60}IrO_{3-\delta}$ (0≤δ≤1.0), $Li_{0.20}Ca_{0.60}RuO_{3-\delta}$ (0≤δ≤1.0), $Li_{0.20}Ca_{0.60}TiO_{3-\delta}$ (0≤δ≤1.0), $Li_{0.20}Ca_{0.60}FeO_{3-\delta}$ (0≤δ≤1.0), $Li_{0.20}Ca_{0.80}PdO_{3-\delta}$ (0≤δ≤1.0), $Li_{0.20}Ca_{0.80}PbO_{3-\delta}$ (0≤δ≤1.0), $Li_{0.20}Ca_{0.60}RhO_{3-\delta}$ (0≤δ≤1.0), $Li_{0.20}Ca_{0.60}SnO_{3-\delta}$ (0≤δ≤1.0), $Li_{0.20}Ca_{0.60}VO_{3-\delta}$ (0≤δ≤1.0), $Li_{0.20}Ca_{0.60}ReO_{3-\delta}$ (0≤δ≤1.0), $Li_{0.20}Ca_{0.80}GeO_{3-\delta}$ (0≤δ≤1.0), $Li_{0.20}Ca_{0.80}WO_{3-\delta}$ (0≤δ≤1.0), $Li_{0.20}Ca_{0.80}ZrO_{3-\delta}$ (0≤δ≤1.0), $Li_{0.20}Ca_{0.60}MoO_{3-\delta}$ (0≤δ≤1.0), $Li_{0.20}Ca_{0.80}NbO_{3-\delta}$ (0≤δ≤1.0), $Li_{0.20}Ca_{0.60}TaO_{3-\delta}$ (0≤δ≤1.0), $Li_{0.20}Ca_{0.80}HfO_{3-\delta}$ (0≤δ≤1.0), $Li_{0.20}Ca_{0.60}BiO_{3-\delta}$ (0≤δ≤1.0), $Li_{0.25}Ca_{0.5}TiO_{3-\delta}$ (0≤δ≤1.0), $Li_{0.25}Ca_{0.50}MnO_{3-\delta}$ (0≤δ≤1.0), $Li_{0.25}Ca_{0.5}NiO_{3-\delta}$ (0≤δ≤1.0), $Li_{0.25}Ca_{0.50}CrO_{3-\delta}$ (0≤δ≤1.0), $Li_{0.25}Ca_{0.5}CoO_{3-\delta}$ (0≤δ≤1.0), $Li_{0.25}Ca_{0.50}IrO_{3-\delta}$ (0≤δ≤1.0), $Li_{0.25}Ca_{0.50}RuO_{3-\delta}$ (0≤δ≤1.0), $Li_{0.25}Ca_{0.50}TiO_{3-\delta}$ (0≤δ≤1.0), $Li_{0.25}Ca_{0.50}FeO_{3-\delta}$ (0≤δ≤1.0), $Li_{0.25}Ca_{0.50}PdO_{3-\delta}$ (0≤δ≤1.0), $Li_{0.25}Ca_{0.50}PbO_{3-\delta}$ (0≤δ≤1.0), $Li_{0.25}Ca_{0.50}RhO_{3-\delta}$ (0≤δ≤1.0), $Li_{0.25}Ca_{0.5}SnO_{3-\delta}$ (0≤δ≤1.0), $Li_{0.25}Ca_{0.50}VO_{3-\delta}$ (0≤δ≤1.0), $Li_{0.25}Ca_{0.5}ReO_{3-\delta}$ (0≤δ≤1.0), $Li_{0.25}Ca_{0.5}GeO_{3-\delta}$ (0≤δ≤1.0), $Li_{0.25}Ca_{0.50}WO_{3-\delta}$ (0≤δ≤1.0), $Li_{0.25}Ca_{0.5}ZrO_{3-\delta}$ (0≤δ≤1.0), $Li_{0.25}Ca_{0.5}MoO_{3-\delta}$ (0≤δ≤1.0), $Li_{0.25}Ca_{0.50}NbO_{3-\delta}$ (0≤δ≤1.0), $Li_{0.25}Ca_{0.50}TaO_{3-\delta}$ (0≤δ≤1.0), $Li_{0.25}Ca_{0.50}HfO_{3-\delta}$ (0≤δ≤1.0), $Li_{0.25}Ca_{0.50}BiO_{3-\delta}$ (0≤δ≤1.0), $Li_{0.30}Ca_{0.40}TiO_{3-\delta}$ (0≤δ≤1.0), $Li_{0.30}Ca_{0.40}MnO_{3-\delta}$ (0≤δ≤1.0), $Li_{0.30}Ca_{0.40}NiO_{3-\delta}$ (0≤δ≤1.0), $Li_{0.30}Ca_{0.40}CrO_{3-\delta}$ (0≤δ≤1.0), $Li_{0.30}Ca_{0.40}CoO_{3-\delta}$ (0≤δ≤1.0), $Li_{0.30}Ca_{0.40}IrO_{3-\delta}$ (0≤δ≤1.0), $Li_{0.30}Ca_{0.40}RuO_{3-\delta}$ (0≤δ≤1.0), $L_{0.30}Ca_{0.40}TiO_{3-\delta}$ (0≤δ≤1.0), $Li_{0.30}Ca_{0.40}FeO_{3-\delta}$ (0≤δ≤1.0), $Li_{0.30}Ca_{0.40}PdO_{3-\delta}$ (0≤δ≤1.0), $Li_{0.30}Ca_{0.40}PbO_{3-\delta}$ (0≤δ≤1.0), $Li_{0.30}Ca_{0.40}RhO_{3-\delta}$ (0≤δ≤1.0), $Li_{0.30}Ca_{0.40}SnO_{3-\delta}$ (0≤δ≤1.0), $Li_{0.30}Ca_{0.40}VO_{3-\delta}$ (0≤δ≤1.0), $Li_{0.30}Ca_{0.40}ReO_{3-\delta}$ (0≤δ≤1.0), $Li_{0.30}Ca_{0.40}GeO_{3-\delta}$ (0≤δ≤1.0), $Li_{0.30}Ca_{0.40}WO_{3-\delta}$ (0≤δ≤1.0), $Li_{0.30}Ca_{0.40}ZrO_{3-\delta}$ (0≤δ≤1.0), $Li_{0.30}Ca_{0.40}MoO_{3-\delta}$ (0≤δ≤1.0), $Li_{0.30}Ca_{0.40}NbO_{3-\delta}$ (0≤δ≤1.0), $Li_{0.30}Ca_{0.40}TaO_{3-\delta}$ (0≤δ≤1.0), $Li_{0.30}Ca_{0.40}HfO_{3-\delta}$ (0≤δ≤1.0), $Li_{0.30}Ca_{0.40}BiO_{3-\delta}$ (0≤δ≤1.0), $Li_{0.40}Ca_{0.20}TiO_{3-\delta}$ (0≤δ≤1.0), $Li_{0.40}Ca_{0.20}MnO_{3-\delta}$ (0≤δ≤1.0), $Li_{0.40}Ca_{0.20}NiO_{3-\delta}$ (0≤δ≤1.0), $Li_{0.40}Ca_{0.20}CrO_{3-\delta}$ (0≤δ≤1.0), $Li_{0.40}Ca_{0.20}CoO_{3-\delta}$ (0≤δ≤1.0), $Li_{0.40}Ca_{0.20}IrO_{3-\delta}$ (0≤δ≤1.0), $Li_{0.40}Ca_{0.20}RuO_{3-\delta}$ (0≤δ≤1.0), $L_{0.40}Ca_{0.20}TiO_{3-\delta}$ (0≤δ≤1.0), $Li_{0.40}Ca_{0.20}FeO_{3-\delta}$ (0≤δ≤1.0), $Li_{0.40}Ca_{0.20}PdO_{3-\delta}$ (0≤δ≤1.0), $Li_{0.40}Ca_{0.20}PbO_{3-\delta}$ (0≤δ≤1.0), $Li_{0.40}Ca_{0.20}RhO_{3-\delta}$ (0≤δ≤1.0), $Li_{0.40}Ca_{0.20}SnO_{3-\delta}$ (0≤δ≤1.0), $Li_{0.40}Ca_{0.20}VO_{3-\delta}$ (0≤δ≤1.0), $Li_{0.40}Ca_{0.20}ReO_{3-\delta}$ (0≤δ≤1.0), $Li_{0.40}Ca_{0.20}GeO_{3-\delta}$ (0≤δ≤1.0), $Li_{0.40}Ca_{0.20}WO_{3-\delta}$ (0≤δ≤1.0), $Li_{0.40}Ca_{0.20}ZrO_{3-\delta}$ (0≤δ≤1.0), $Li_{0.40}Ca_{0.20}MoO_{3-\delta}$ (0≤δ≤1.0), $Li_{0.40}Ca_{0.20}NbO_{3-\delta}$ (0≤δ≤1.0), $Li_{0.40}Ca_{0.20}TaO_{3-\delta}$ (0≤δ≤1.0), $Li_{0.40}Ca_{0.20}HfO_{3-\delta}$ (0≤δ≤1.0), $Li_{0.40}Ca_{0.20}BiO_{3-\delta}$ (0≤δ≤1.0), $Li_{0.10}Sr_{0.80}TiO_{3-\delta}$ (0≤δ≤1.0), $Li_{0.10}Sr_{0.80}MnO_{3-\delta}$ (0≤δ≤1.0), $Li_{0.10}Sr_{0.80}NiO_{3-\delta}$ (0≤δ≤1.0), $Li_{0.10}Sr_{0.80}CrO_{3-\delta}$ (0≤δ≤1.0), $Li_{0.10}Sr_{0.80}CoO_{3-\delta}$ (0≤δ≤1.0), $Li_{0.10}Sr_{0.80}IrO_{3-\delta}$ (0≤δ≤1.0), $Li_{0.10}Sr_{0.80}RuO_{3-\delta}$ (0≤δ≤1.0), $Li_{0.10}Sr_{0.80}TiO_3$ (0≤δ≤1.0), $Li_{0.10}Sr_{0.80}FeO_{3-\delta}$ (0≤δ≤1.0), $Li_{0.10}Sr_{0.80}PdO_{3-\delta}$ (0≤δ≤1.0), $Li_{0.10}Sr_{0.80}PbO_{3-\delta}$ (0≤δ≤1.0), $Li_{0.10}Sr_{0.80}RhO_{3-\delta}$ (0≤δ≤1.0), $Li_{0.10}Sr_{0.80}SnO_{3-\delta}$ (0≤δ≤1.0), $Li_{0.10}Sr_{0.80}VO_{3-\delta}$ (0≤δ≤1.0), $Li_{0.10}Sr_{0.80}ReO_{3-\delta}$ (0≤δ≤1.0), $Li_{0.10}Sr_{0.80}GeO_{3-\delta}$ (0≤δ≤1.0), $Li_{0.10}Sr_{0.80}WO_{3-\delta}$ (0≤δ≤1.0), $Li_{0.10}Sr_{0.80}ZrO_{3-\delta}$ (0≤δ≤1.0), $Li_{0.10}Sr_{0.80}MoO_{3-\delta}$ (0≤δ≤1.0), $Li_{0.10}Sr_{0.80}NbO_{3-\delta}$ (0≤δ≤1.0), $Li_{0.10}Sr_{0.80}TaO_{3-\delta}$ (0≤δ≤1.0), $Li_{0.10}Sr_{0.80}HfO_{3-\delta}$ (0≤δ≤1.0), $Li_{0.10}Sr_{0.80}BiO_3$ (0≤δ≤1.0), $Li_{0.20}Sr_{0.60}TiO_{3-\delta}$ (0≤δ≤1.0), $Li_{0.20}Sr_{0.60}MnO_{3-\delta}$ (0≤δ≤1.0), $Li_{0.20}Sr_{0.60}NiO_{3-\delta}$ (0≤δ≤1.0), $Li_{0.20}Sr_{0.60}CrO_{3-\delta}$ (0≤δ≤1.0), $Li_{0.20}Sr_{0.60}CoO_{3-\delta}$ (0≤δ≤1.0), $Li_{0.20}Sr_{0.60}IrO_{3-\delta}$ (0≤δ≤1.0), $Li_{0.20}Sr_{0.60}RuO_{3-\delta}$ (0≤δ≤1.0), $Li_{0.20}Sr_{0.60}TiO_{3-\delta}$ (0≤δ≤1.0), $Li_{0.20}Sr_{0.60}FeO_{3-\delta}$ (0≤δ≤1.0), $Li_{0.20}Sr_{0.60}PdO_{3-\delta}$ (0≤δ≤1.0), $Li_{0.20}Sr_{0.60}PbO_{3-\delta}$ (0≤δ≤1.0), $Li_{0.20}Sr_{0.60}RhO_{3-\delta}$ (0≤δ≤1.0), $Li_{0.20}Sr_{0.60}SnO_{3-\delta}$ (0≤δ≤1.0), $Li_{0.20}Sr_{0.60}VO_{3-\delta}$ (0≤δ≤1.0), $Li_{0.20}Sr_{0.60}ReO_{3-\delta}$ (0≤δ≤1.0), $Li_{0.20}Sr_{0.60}GeO_{3-\delta}$ (0≤δ≤1.0), $Li_{0.20}Sr_{0.60}WO_{3-\delta}$ (0≤δ≤1.0), $Li_{0.20}Sr_{0.60}ZrO_{3-\delta}$ (0≤δ≤1.0), $Li_{0.20}Sr_{0.60}MoO_{3-\delta}$ (0≤δ≤1.0), $Li_{0.20}Sr_{0.60}NbO_{3-\delta}$ (0≤δ≤1.0), $Li_{0.20}Sr_{0.60}TaO_{3-\delta}$ (0≤δ≤1.0), $Li_{0.20}Sr_{0.60}HfO_{3-\delta}$ (0≤δ≤1.0), $Li_{0.20}Sr_{0.60}BiO_{3-\delta}$ (0≤δ≤1.0), $Li_{0.25}Sr_{0.50}TiO_{3-\delta}$ (0≤δ≤1.0), $Li_{0.25}Sr_{0.5}MnO_{3-\delta}$ (0≤δ≤1.0), $Li_{0.25}Sr_{0.60}NiO_{3-\delta}$ (0≤δ≤1.0), $Li_{0.25}Sr_{0.5}CrO_{3-\delta}$ (0≤δ≤1.0), $Li_{0.25}Sr_{0.50}CoO_{3-\delta}$ (0≤δ≤1.0), $Li_{0.25}Sr_{0.50}IrO_{3-\delta}$ (0≤δ≤1.0), $Li_{0.25}Sr_{0.50}RuO_{3-\delta}$ (0≤δ≤1.0), $Li_{0.25}Sr_{0.50}TiO_3$ (0≤δ≤1.0), $Li_{0.25}Sr_{0.50}FeO_{3-\delta}$ (0≤δ≤1.0), $Li_{0.25}Sr_{0.5}PdO_{3-\delta}$ (0≤δ≤1.0), $Li_{0.25}Sr_{0.5}PbO_{3-\delta}$ (0≤δ≤1.0), $Li_{0.25}Sr_{0.50}RhO_{3-\delta}$ (0≤δ≤1.0), $Li_{0.25}Sr_{0.50}SnO_{3-\delta}$ (0≤δ≤1.0), $Li_{0.25}Sr_{0.5}VO_{3-\delta}$ (0≤δ≤1.0), $Li_{0.25}Sr_{0.50}ReO_{3-\delta}$ (0≤δ≤1.0), $Li_{0.25}Sr_{0.50}GeO_{3-\delta}$ (0≤δ≤1.0), $Li_{0.25}Sr_{0.50}WO_{3-\delta}$ (0≤δ≤1.0), $Li_{0.25}Sr_{0.50}ZrO_{3-\delta}$ ($0 \leq \delta \leq 1.0$), $Li_{0.25}Sr_{0.50}MoO_{3-\delta}$ ($0 \leq \delta \leq 1.0$), $Li_{0.25}Sr_{0.50}NbO_{3-\delta}$ ($0 \leq \delta \leq 1.0$), $Li_{0.25}Sr_{0.50}TaO_{3-\delta}$ ($0 \leq \delta \leq 1.0$), $Li_{0.25}Sr_{0.50}HfO_{3-\delta}$ ($0 \leq \delta \leq 1.0$), $Li_{0.25}Sr_{0.50}BiO_{3-\delta}$ ($0 \leq \delta \leq 1.0$),
$Li_{0.30}Sr_{0.40}TiO_{3-\delta}$ ($0 \leq \delta \leq 1.0$), $Li_{0.30}Sr_{0.40}MnO_{3-\delta}$ ($0 \leq \delta \leq 1.0$), $L_{0.30}Sr_{0.40}NiO_{3-\delta}$ ($0 \leq \delta \leq 1.0$), $Li_{0.30}Sr_{0.40}CrO_{3-\delta}$ ($0 \leq \delta \leq 1.0$), $Li_{0.30}Sr_{0.40}CoO_{3-\delta}$ ($0 \leq \delta \leq 1.0$), $Li_{0.30}Sr_{0.40}IrO_{3-\delta}$ ($0 \leq \delta \leq 1.0$), $Li_{0.30}Sr_{0.40}RuO_{3-\delta}$ ($0 \leq \delta \leq 1.0$), $Li_{0.30}Sr_{0.40}TiO_{3-\delta}$ ($0 \leq \delta \leq 1.0$), $Li_{0.30}Sr_{0.40}FeO_{3-\delta}$ ($0 \leq \delta \leq 1.0$), $Li_{0.30}Sr_{0.40}PdO_{3-\delta}$ ($0 \leq \delta \leq 1.0$), $Li_{0.30}Sr_{0.40}RhO_{3-\delta}$ ($0 \leq \delta \leq 1.0$), $Li_{0.30}Sr_{0.40}SnO_{3-\delta}$ ($0 \leq \delta \leq 1.0$), $Li_{0.30}Sr_{0.4}VO_{3-\delta}$ ($0 \leq \delta \leq 1.0$), $Li_{0.30}Sr_{0.40}ReO_{3-\delta}$ ($0 \leq \delta \leq 1.0$), $Li_{0.30}Sr_{0.4}GeO_{3-\delta}$ ($0 \leq \delta \leq 1.0$), $Li_{0.30}Sr_{0.40}WO_{3-\delta}$ ($0 \leq \delta \leq 1.0$), $Li_{0.30}Sr_{0.40}ZrO_{3-\delta}$ ($0 \leq \delta \leq 1.0$), $Li_{0.30}Sr_{0.40}MoO_{3-\delta}$ ($0 \leq \delta \leq 1.0$), $Li_{0.30}Sr_{0.40}NbO_{3-\delta}$ ($0 \leq \delta \leq 1.0$), $Li_{0.30}Sr_{0.40}TaO_{3-\delta}$ ($0 \leq \delta \leq 1.0$), $Li_{0.30}Sr_{0.40}HfO_{3-\delta}$ ($0 \leq \delta \leq 1.0$), $Li_{0.30}Sr_{0.40}BiO_{3-\delta}$ ($0 \leq \delta \leq 1.0$),
$Li_{0.40}Sr_{0.20}TiO_{3-\delta}$ ($0 \leq \delta \leq 1.0$), $Li_{0.40}Sr_{0.20}MnO_{3-\delta}$ ($0 \leq \delta \leq 1.0$), $L_{0.40}Sr_{0.20}NiO_{3-\delta}$ ($0 \leq \delta \leq 1.0$), $Li_{0.40}Sr_{0.2}CrO_{3-\delta}$ ($0 \leq \delta \leq 1.0$), $Li_{0.40}Sr_{0.20}CoO_{3-\delta}$ ($0 \leq \delta \leq 1.0$), $Li_{0.40}Sr_{0.20}IrO_{3-\delta}$ ($0 \leq \delta \leq 1.0$), $Li_{0.40}Sr_{0.20}RuO_{3-\delta}$ ($0 \leq \delta \leq 1.0$), $Li_{0.40}Sr_{0.20}TiO_{3-\delta}$ ($0 \leq \delta \leq 1.0$), $Li_{0.40}Sr_{0.20}FeO_{3-\delta}$ ($0 \leq \delta \leq 1.0$), $Li_{0.40}Sr_{0.2}PdO_{3-\delta}$ ($0 \leq \delta \leq 1.0$), $Li_{0.40}Sr_{0.2}PbO_{3-\delta}$ ($0 \leq \delta \leq 1.0$), $Li_{0.40}Sr_{0.20}RhO_{3-\delta}$ ($0 \leq \delta \leq 1.0$), $Li_{0.40}Sr_{0.20}SnO_{3-\delta}$ ($0 \leq \delta \leq 1.0$), $Li_{0.40}Sr_{0.20}VO_{3-\delta}$ ($0 \leq \delta \leq 1.0$), $Li_{0.40}Sr_{0.20}ReO_{3-\delta}$ ($0 \leq \delta \leq 1.0$), $Li_{0.40}Sr_{0.20}GeO_{3-\delta}$ ($0 \leq \delta \leq 1.0$), $Li_{0.40}Sr_{0.20}WO_{3-\delta}$ ($0 \leq \delta \leq 1.0$), $Li_{0.40}Sr_{0.20}ZrO_{3-\delta}$ ($0 \leq \delta \leq 1.0$), $Li_{0.40}Sr_{0.20}MoO_{3-\delta}$ ($0 \leq \delta \leq 1.0$), $Li_{0.40}Sr_{0.20}NbO_{3-\delta}$ ($0 \leq \delta \leq 1.0$), $Li_{0.40}Sr_{0.20}TaO_{3-\delta}$ ($0 \leq \delta \leq 1.0$), $Li_{0.40}Sr_{0.20}HfO_{3-\delta}$ ($0 \leq \delta \leq 1.0$), $Li_{0.40}Sr_{0.20}BiO_{3-\delta}$ ($0 \leq \delta \leq 1.0$),
$Li_{0.10}Ba_{0.80}TiO_{3-\delta}$ ($0 \leq \delta \leq 1.0$), $Li_{0.10}Ba_{0.80}MnO_{3-\delta}$ ($0 \leq \delta \leq 1.0$), $Li_{0.10}Ba_{0.80}NiO_{3-\delta}$ ($0 \leq \delta \leq 1.0$), $Li_{0.10}Ba_{0.80}CrO_{3-\delta}$ ($0 \leq \delta \leq 1.0$), $Li_{0.10}Ba_{0.80}CoO_{3-\delta}$ ($0 \leq \delta \leq 1.0$), $Li_{0.10}Ba_{0.80}IrO_{3-\delta}$ ($0 \leq \delta \leq 1.0$), $Li_{0.10}Ba_{0.80}RuO_{3-\delta}$ ($0 \leq \delta \leq 1.0$), $Li_{0.10}Ba_{0.80}TiO_{3-\delta}$ ($0 \leq \delta \leq 1.0$), $Li_{0.10}Ba_{0.80}FeO_{3-\delta}$ ($0 \leq \delta \leq 1.0$), $Li_{0.10}Ba_{0.80}PdO_{3-\delta}$ ($0 \leq \delta \leq 1.0$), $Li_{0.10}Ba_{0.80}PbO_{3-\delta}$ ($0 \leq \delta \leq 1.0$), $Li_{0.10}Ba_{0.80}RhO_{3-\delta}$ ($0 \leq \delta \leq 1.0$), $Li_{0.10}Ba_{0.80}SnO_{3-\delta}$ ($0 \leq \delta \leq 1.0$), $Li_{0.10}Ba_{0.80}VO_{3-\delta}$ ($0 \leq \delta \leq 1.0$), $Li_{0.10}Ba_{0.80}ReO_{3-\delta}$ ($0 \leq \delta \leq 1.0$), $Li_{0.10}Ba_{0.80}GeO_{3-\delta}$ ($0 \leq \delta \leq 1.0$), $Li_{0.10}Ba_{0.80}WO_{3-\delta}$ ($0 \leq \delta \leq 1.0$), $Li_{0.10}Ba_{0.80}ZrO_{3-\delta}$ ($0 \leq \delta \leq 1.0$), $Li_{0.10}Ba_{0.80}MoO_{3-\delta}$ ($0 \leq \delta \leq 1.0$), $Li_{0.10}Ba_{0.80}NbO_{3-\delta}$ ($0 \leq \delta \leq 1.0$), $Li_{0.10}Ba_{0.80}TaO_{3-\delta}$ ($0 \leq \delta \leq 1.0$), $Li_{0.10}Ba_{0.80}HfO_{3-\delta}$ ($0 \leq \delta \leq 1.0$), $Li_{0.10}Ba_{0.80}BiO_{3-\delta}$ ($0 \leq \delta \leq 1.0$),
$Li_{0.20}Ba_{0.60}TiO_{3-\delta}$ ($0 \leq \delta \leq 1.0$), $Li_{0.20}Ba_{0.60}MnO_{3-\delta}$ ($0 \leq \delta \leq 1.0$), $Li_{0.20}Ba_{0.60}NiO_{3-\delta}$ ($0 \leq \delta \leq 1.0$), $Li_{0.20}Ba_{0.80}CrO_{3-\delta}$ ($0 \leq \delta \leq 1.0$), $Li_{0.20}Ba_{0.80}CoO_{3-\delta}$ ($0 \leq \delta \leq 1.0$), $Li_{0.20}Ba_{0.60}IrO_{3-\delta}$ ($0 \leq \delta \leq 1.0$), $Li_{0.20}Ba_{0.60}RuO_{3-\delta}$ ($0 \leq \delta \leq 1.0$), $Li_{0.20}Ba_{0.60}TiO_{3-\delta}$ ($0 \leq \delta \leq 1.0$), $Li_{0.20}Ba_{0.60}FeO_{3-\delta}$ ($0 \leq \delta \leq 1.0$), $Li_{0.20}Ba_{0.80}PdO_{3-\delta}$ ($0 \leq \delta \leq 1.0$), $Li_{0.20}Ba_{0.60}PbO_{3-\delta}$ ($0 \leq \delta \leq 1.0$), $Li_{0.20}Ba_{0.60}RhO_{3-\delta}$ ($0 \leq \delta \leq 1.0$), $Li_{0.20}Ba_{0.60}SnO_{3-\delta}$ ($0 \leq \delta \leq 1.0$), $Li_{0.20}Ba_{0.60}VO_{3-\delta}$ ($0 \leq \delta \leq 1.0$), $Li_{0.20}Ba_{0.60}ReO_{3-\delta}$ ($0 \leq \delta \leq 1.0$), $Li_{0.20}Ba_{0.60}GeO_{3-\delta}$ ($0 \leq \delta \leq 1.0$), $Li_{0.20}Ba_{0.60}WO_{3-\delta}$ ($0 \leq \delta \leq 1.0$), $Li_{0.20}Ba_{0.60}ZrO_{3-\delta}$ ($0 \leq \delta \leq 1.0$), $Li_{0.20}Ba_{0.60}MoO_{3-\delta}$ ($0 \leq \delta \leq 1.0$), $Li_{0.20}Ba_{0.60}NbO_{3-\delta}$ ($0 \leq \delta \leq 1.0$), $Li_{0.20}Ba_{0.60}TaO_{3-\delta}$ ($0 \leq \delta \leq 1.0$), $Li_{0.20}Ba_{0.60}HfO_{3-\delta}$ ($0 \leq \delta \leq 1.0$), $Li_{0.20}Ba_{0.60}BiO_{3-\delta}$ ($0 \leq \delta \leq 1.0$),
$Li_{0.25}Ba_{0.50}TiO_{3-\delta}$ ($0 \leq \delta \leq 1.0$), $Li_{0.25}Ba_{0.50}MnO_{3-\delta}$ ($0 \leq \delta \leq 1.0$), $Li_{0.25}Ba_{0.50}NiO_{3-\delta}$ ($0 \leq \delta \leq 1.0$), $Li_{0.25}Ba_{0.50}CrO_{3-\delta}$ ($0 \leq \delta \leq 1.0$), $Li_{0.25}Ba_{0.50}CoO_{3-\delta}$ ($0 \leq \delta \leq 1.0$), $Li_{0.25}Ba_{0.50}IrO_{3-\delta}$ ($0 \leq \delta \leq 1.0$), $Li_{0.25}Ba_{0.50}RuO_{3-\delta}$ ($0 \leq \delta \leq 1.0$), $Li_{0.25}Ba_{0.50}TiO_{3-\delta}$ ($0 \leq \delta \leq 1.0$), $Li_{0.25}Ba_{0.50}FeO_{3-\delta}$ ($0 \leq \delta \leq 1.0$), $Li_{0.25}Ba_{0.50}PdO_{3-\delta}$ ($0 \leq \delta \leq 1.0$), $Li_{0.25}Ba_{0.50}PbO_{3-\delta}$ ($0 \leq \delta \leq 1.0$), $Li_{0.25}Ba_{0.50}RhO_{3-\delta}$ ($0 \leq \delta \leq 1.0$), $Li_{0.25}Ba_{0.50}SnO_{3-\delta}$ ($0 \leq \delta \leq 1.0$), $Li_{0.25}Ba_{0.50}VO_{3-\delta}$ ($0 \leq \delta \leq 1.0$), $Li_{0.25}Ba_{0.50}ReO_{3-\delta}$ ($0 \leq \delta \leq 1.0$), $Li_{0.25}Ba_{0.50}GeO_{3-\delta}$ ($0 \leq \delta \leq 1.0$), $Li_{0.25}Ba_{0.50}WO_{3-\delta}$ ($0 \leq \delta \leq 1.0$), $Li_{0.25}Ba_{0.50}ZrO_{3-\delta}$ ($0 \leq \delta \leq 1.0$), $Li_{0.25}Ba_{0.50}MoO_{3-\delta}$ ($0 \leq \delta \leq 1.0$), $Li_{0.25}Ba_{0.50}NbO_{3-\delta}$ ($0 \leq \delta \leq 1.0$), $Li_{0.25}Ba_{0.50}TaO_{3-\delta}$ ($0 \leq \delta \leq 1.0$), $Li_{0.25}Ba_{0.50}HfO_{3-\delta}$ ($0 \leq \delta \leq 1.0$), $Li_{0.25}Ba_{0.50}BiO_{3-\delta}$ ($0 \leq \delta \leq 1.0$),
$Li_{0.30}Ba_{0.40}TiO_{3-\delta}$ ($0 \leq \delta \leq 1.0$), $Li_{0.30}Ba_{0.40}MnO_{3-\delta}$ ($0 \leq \delta \leq 1.0$), $L_{0.30}Ba_{0.40}NiO_{3-\delta}$ ($0 \leq \delta \leq 1.0$), $Li_{0.30}Ba_{0.40}CrO_{3-\delta}$ ($0 \leq \delta \leq 1.0$), $Li_{0.30}Ba_{0.40}CoO_{3-\delta}$ ($0 \leq \delta \leq 1.0$), $Li_{0.30}Ba_{0.40}IrO_{3-\delta}$ ($0 \leq \delta \leq 1.0$), $Li_{0.30}Ba_{0.40}RuO_{3-\delta}$ ($0 \leq \delta \leq 1.0$), $L_{0.30}Ba_{0.40}TiO_{3-\delta}$ ($0 \leq \delta \leq 1.0$), $Li_{0.30}Ba_{0.40}FeO_{3-\delta}$ ($0 \leq \delta \leq 1.0$), $Li_{0.30}Ba_{0.40}PdO_{3-\delta}$ ($0 \leq \delta \leq 1.0$), $Li_{0.30}Ba_{0.40}PbO_{3-\delta}$ ($0 \leq \delta \leq 1.0$), $Li_{0.30}Ba_{0.40}RhO_{3-\delta}$ ($0 \leq \delta \leq 1.0$), $Li_{0.30}Ba_{0.4}SnO_{3-\delta}$ ($0 \leq \delta \leq 1.0$), $Li_{0.30}Ba_{0.40}VO_{3-\delta}$ ($0 \leq \delta \leq 1.0$), $Li_{0.30}Ba_{0.40}ReO_{3-\delta}$ ($0 \leq \delta \leq 1.0$), $Li_{0.30}Ba_{0.40}GeO_{3-\delta}$ ($0 \leq \delta \leq 1.0$), $Li_{0.30}Ba_{0.4}WO_{3-\delta}$ ($0 \leq \delta \leq 1.0$), $Li_{0.30}Ba_{0.40}ZrO_{3-\delta}$ ($0 \leq \delta \leq 1.0$), $Li_{0.30}Ba_{0.40}MoO_{3-\delta}$ ($0 \leq \delta \leq 1.0$), $Li_{0.30}Ba_{0.40}NbO_{3-\delta}$ ($0 \leq \delta \leq 1.0$), $Li_{0.30}Ba_{0.40}TaO_{3-\delta}$ ($0 \leq \delta \leq 1.0$), $Li_{0.30}Ba_{0.40}HfO_{3-\delta}$ ($0 \leq \delta \leq 1.0$), $Li_{0.30}Ba_{0.40}BiO_{3-\delta}$ ($0 \leq \delta \leq 1.0$),
$Li_{0.40}Ba_{0.20}TiO_{3-\delta}$ ($0 \leq \delta \leq 1.0$), $Li_{0.40}Ba_{0.20}MnO_{3-\delta}$ ($0 \leq \delta \leq 1.0$), $L_{0.40}Ba_{0.20}NiO_{3-\delta}$ ($0 \leq \delta \leq 1.0$), $Li_{0.40}Ba_{0.2}CrO_{3-\delta}$ ($0 \leq \delta \leq 1.0$), $Li_{0.40}Ba_{0.20}CoO_{3-\delta}$ ($0 \leq \delta \leq 1.0$), $Li_{0.40}Ba_{0.20}IrO_{3-\delta}$ ($0 \leq \delta \leq 1.0$), $Li_{0.40}Ba_{0.20}RuO_{3-\delta}$ ($0 \leq \delta \leq 1.0$), $Li_{0.40}Ba_{0.20}TiO_{3-\delta}$ ($0 \leq \delta \leq 1.0$), $Li_{0.40}Ba_{0.20}FeO_{3-\delta}$ ($0 \leq \delta \leq 1.0$), $Li_{0.40}Ba_{0.2}PdO_{3-\delta}$ ($0 \leq \delta \leq 1.0$), $Li_{0.40}Ba_{0.20}PbO_{3-\delta}$ ($0 \leq \delta \leq 1.0$), $Li_{0.40}Ba_{0.20}RhO_{3-\delta}$ ($0 \leq \delta \leq 1.0$), $Li_{0.40}Ba_{0.20}SnO_{3-\delta}$ ($0 \leq \delta \leq 1.0$), $Li_{0.40}Ba_{0.20}VO_{3-\delta}$ ($0 \leq \delta \leq 1.0$), $Li_{0.40}Ba_{0.20}ReO_{3-\delta}$ ($0 \leq \delta \leq 1.0$), $Li_{0.40}Ba_{0.20}GeO_{3-\delta}$ ($0 \leq \delta \leq 1.0$), $Li_{0.40}Ba_{0.20}WO_{3-\delta}$ ($0 \leq \delta \leq 1.0$), $Li_{0.40}Ba_{0.20}ZrO_{3-\delta}$ ($0 \leq \delta \leq 1.0$), $Li_{0.40}Ba_{0.20}MoO_{3-\delta}$ ($0 \leq \delta \leq 1.0$), $Li_{0.40}Ba_{0.20}NbO_{3-\delta}$ ($0 \leq \delta \leq 1.0$), $Li_{0.40}Ba_{0.20}TaO_{3-\delta}$ ($0 \leq \delta \leq 1.0$), $Li_{0.40}Ba_{0.20}HfO_{3-\delta}$ ($0 \leq \delta \leq 1.0$), $Li_{0.40}Ba_{0.20}BiO_{3-\delta}$ ($0 \leq \delta \leq 1.0$),
$Li_{0.25}La_{0.50}TiO_{3-\delta}$ ($0 \leq \delta \leq 1.0$), $Li_{0.25}La_{0.50}MnO_{3-\delta}$ ($0 \leq \delta \leq 1.0$), $Li_{0.25}La_{0.50}NiO_{3-\delta}$ ($0 \leq \delta \leq 1.0$), $Li_{0.25}La_{0.50}CrO_{3-\delta}$ ($0 \leq \delta \leq 1.0$), $Li_{0.25}La_{0.5}CoO_{3-\delta}$ ($0 \leq \delta \leq 1.0$), $Li_{0.25}La_{0.50}IrO_{3-\delta}$ ($0 \leq \delta \leq 1.0$), $Li_{0.25}La_{0.50}RuO_{3-\delta}$ ($0 \leq \delta \leq 1.0$), $Li_{0.25}La_{0.50}TiO_{3-\delta}$ ($0 \leq \delta \leq 1.0$), $Li_{0.25}La_{0.50}FeO_{3-\delta}$ ($0 \leq \delta \leq 1.0$), $Li_{0.25}La_{0.50}PdO_{3-\delta}$ ($0 \leq \delta \leq 1.0$), $Li_{0.25}La_{0.50}PbO_{3-\delta}$ ($0 \leq \delta \leq 1.0$), $Li_{0.25}La_{0.50}RhO_{3-\delta}$ ($0 \leq \delta \leq 1.0$), $Li_{0.25}La_{0.50}SnO_{3-\delta}$ ($0 \leq \delta \leq 1.0$), $Li_{0.25}La_{0.50}VO_{3-\delta}$ ($0 \leq \delta \leq 1.0$), $Li_{0.25}La_{0.50}ReO_{3-\delta}$ ($0 \leq \delta \leq 1.0$), $Li_{0.25}La_{0.50}GeO_{3-\delta}$ ($0 \leq \delta \leq 1.0$), $Li_{0.25}La_{0.50}WO_{3-\delta}$ ($0 \leq \delta \leq 1.0$), $Li_{0.25}La_{0.50}ZrO_{3-\delta}$ ($0 \leq \delta \leq 1.0$), $Li_{0.25}La_{0.50}MoO_{3-\delta}$ ($0 \leq \delta \leq 1.0$), $Li_{0.25}La_{0.50}NbO_{3-\delta}$ ($0 \leq \delta \leq 1.0$), $Li_{0.25}La_{0.50}TaO_{3-\delta}$ ($0 \leq \delta \leq 1.0$), $Li_{0.25}La_{0.50}HfO_{3-\delta}$ ($0 \leq \delta \leq 1.0$), $Li_{0.25}La_{0.50}BiO_{3-\delta}$ ($0 \leq \delta \leq 1.0$),
$Li_{0.05}La_{0.82}Ti_{0.70}O_{3-\delta}$ ($0 \leq \delta \leq 1.0$), $Li_{0.05}La_{0.82}Mn_{0.70}O_{3-\delta}$ ($0 \leq \delta \leq 1.0$), $Li_{0.10}La_{0.80}Mn_{0.70}O_{3-\delta}$ ($0 \leq \delta \leq 1.0$), $Li_{0.20}La_{0.77}Mn_{0.70}O_{3-\delta}$ ($0 \leq \delta \leq 1.0$), $Li_{0.05}La_{0.82}Nb_{0.70}O_{3-\delta}$ ($0 \leq \delta \leq 1.0$), $Li_{0.10}La_{0.80}Nb_{0.70}O_{3-\delta}$ ($0 \leq \delta \leq 1.0$), $Li_{0.20}La_{0.77}Nb_{0.70}O_{3-\delta}$ ($0 \leq \delta \leq 1.0$), $Li_{0.05}La_{0.82}Ta_{0.70}O_{3-\delta}$ ($0 \leq \delta \leq 1.0$), $Li_{0.10}La_{0.80}Ta_{0.70}O_{3-\delta}$ ($0 \leq \delta \leq 1.0$), $Li_{0.20}La_{0.77}Ta_{0.70}O_{3-\delta}$ ($0 \leq \delta \leq 1.0$), $Li_{0.05}La_{0.82}V_{0.70}O_{3-\delta}$ ($0 \leq \delta \leq 1.0$), $Li_{0.10}La_{0.80}V_{0.70}O_{3-\delta}$ ($0 \leq \delta \leq 1.0$), $Li_{0.20}La_{0.77}V_{0.70}O_{3-\delta}$ ($0 \leq \delta \leq 1.0$), $Li_{0.05}La_{0.82}W_{0.70}O_{3-\delta}$ ($0 \leq \delta \leq 1.0$), $Li_{0.10}La_{0.80}W_{0.70}O_{3-\delta}$ ($0 \leq \delta \leq 1.0$), $Li_{0.20}La_{0.77}W_{0.70}O_{3-\delta}$ ($0 \leq \delta \leq 1.0$), $Li_{0.05}La_{0.82}Mo_{0.70}O_{3-\delta}$ ($0 \leq \delta \leq 1.0$), $Li_{0.10}La_{0.80}Mo_{0.70}O_{3-\delta}$ ($0 \leq \delta \leq 1.0$), $Li_{0.20}La_{0.77}Mo_{0.70}O_{3-\delta}$ ($0 \leq \delta \leq 1.0$), $Li_{0.05}La_{0.82}Bi_{0.70}O_{3-\delta}$ ($0 \leq \delta \leq 1.0$), $Li_{0.10}La_{0.80}Bi_{0.70}O_{3-\delta}$ ($0 \leq \delta \leq 1.0$), $Li_{0.20}La_{0.77}Bi_{0.70}O_{3-\delta}$ ($0 \leq \delta \leq 1.0$), $Li_{0.05}La_{0.82}Cr_{0.70}O_{3-\delta}$ ($0 \leq \delta \leq 1.0$), $Li_{0.10}La_{0.80}Cr_{0.70}O_{3-\delta}$ ($0 \leq \delta \leq 1.0$), or $Li_{0.20}La_{0.77}Cr_{0.70}O_{3-\delta}$ ($0 \leq \delta \leq 1.0$).

The perovskite compound is, for example, $Li_3La_{0.55}TiO_3$, $Li_{0.34}La_{0.55}RuO_3$, $Li_{0.20}Ca_{0.6}Mn_{0.5}Ni_{0.5}O_3$, $Li_{0.34}La_{0.55}RuO_{3-\delta}$, or $Li_{0.20}Ca_{0.6}Mn_{0.5}Ni_{0.5}O_{3-\delta}$, but is not limited thereto, and any suitable compound that provides electronic conductivity and ionic conductivity at the same time may be used as a lithium-containing perovskite compound.

The perovskite compound has, for example, an electronic conductivity of about $1 \times 10^{-6}$ S/cm or more at 25° C. and an ionic conductivity of about $1 \times 10^{-7}$ S/cm or more at 25° C.

The electronic conductivity of the perovskite compound at 25° C. is, for example, about $5 \times 10^{-6}$ S/cm or more, about $1 \times 10^{-5}$ S/cm or more, about $5 \times 10^{-5}$ S/cm or more, about $1 \times 10^{-4}$ S/cm or more, about $5 \times 10^{-4}$ S/cm or more, about $1 \times 10^{-3}$ S/cm or more, about $5 \times 10^{-3}$ S/cm or more, about $1 \times 10^{-2}$ S/cm or more, about $5 \times 10^{-2}$ S/cm or more, or about $1 \times 10^{-6}$ S/cm or more. At a temperature of 25° C., the perovskite compound may have, for example, an electronic conductivity of about $1 \times 10^{-6}$ S/cm to about $1 \times 10^{1}$ S/cm, about $2 \times 10^{-6}$ S/cm to about $1 \times 10^{1}$ S/cm, about $2 \times 10^{-6}$ S/cm to about 5 S/cm, about $4 \times 10^{-6}$ S/cm to about 5 S/cm, about $4 \times 10^{-6}$ S/cm to about 1 S/cm, about $5 \times 10^{-6}$ S/cm to about 1 S/cm, about $1 \times 10^{-5}$ S/cm to about 1 S/cm, about $2 \times 10^{-5}$ S/cm to about 1 S/cm, about $4 \times 10^{-5}$ S/cm to about 1 S/cm, about $5 \times 10^{-5}$ S/cm to about 1 S/cm, about $1 \times 10^{-4}$ S/cm to about 1 S/cm, about $2 \times 10^{-4}$ S/cm to about 1 S/cm, about $2 \times 10^{-4}$ S/cm to about $5 \times 10^{-1}$ S/cm, or about $2 \times 10^{-4}$ S/cm to about $1 \times 10^{-1}$ S/cm. When the perovskite compound has an electronic conductivity in these ranges, the internal resistance of a cathode and a battery including the perovskite compound is reduced.

As a result, the cycle characteristics of a battery are improved.

The ionic conductivity of the perovskite compound at 25° C. is, for example, about $5 \times 10^{-7}$ S/cm or more, about $1 \times 10^{-6}$ S/cm or more, about $5 \times 10^{-6}$ S/cm or more, about $1 \times 10^{-5}$ S/cm or more, about $5 \times 10^{-5}$ S/cm or more, about $1 \times 10^{-4}$ S/cm or more, about $5 \times 10^{-4}$ S/cm or more, about $1 \times 10^{-3}$ S/cm or more, about $5 \times 10^{-3}$ S/cm or more, or about $1 \times 10^{-2}$ S/cm or more. At a temperature of 25° C., the perovskite compound may have, for example, an ionic conductivity of about $1 \times 10^{-7}$ S/cm to about $1 \times 10^{1}$ S/cm, about $2 \times 10^{-7}$ S/cm to about $1 \times 10^{1}$ S/cm, about $2 \times 10^{-6}$ S/cm to about 5 S/cm, about $4 \times 10^{-6}$ S/cm to about 5 S/cm, about $4 \times 10^{-6}$ S/cm to about 1 S/cm, about $5 \times 10^{-6}$ S/cm to about 1 S/cm, about $1 \times 10^{-5}$ S/cm to about 1 S/cm, about $2 \times 10^{-5}$ S/cm to about 1 S/cm, about $4 \times 10^{-5}$ S/cm to about 1 S/cm, about $5 \times 10^{-5}$ S/cm to about 1 S/cm, about $1 \times 10^{-4}$ S/cm to about 1 S/cm, about $2 \times 10^{-4}$ S/cm to about 1 S/cm, about $2 \times 10^{-4}$ S/cm to about $5 \times 10^{-1}$ S/cm, or about $2 \times 10^{-4}$ S/cm to about $1 \times 10^{-1}$ S/cm. When the perovskite compound has an ionic conductivity in these ranges, the internal resistance of a cathode and a battery including the perovskite compound is reduced. As a result, the cycle characteristics of a battery are improved.

The lithium-containing metal oxide includes, for example, a spinel compound represented by Formula 2 or Formula 3:

$$Li_{1 \pm x}M_{2 \pm y}O_{4-\delta 1} \qquad \text{Formula 2}$$

$$Li_{4 \pm a}M_{5 \pm b}O_{12-\delta 2} \qquad \text{Formula 3}$$

In Formulae 2 and 3, each M is independently at least one of a Group 2 to Group 16 element, and $0<x<1$, $0<y<1$, $0 \leq \delta 1 \leq 1$, $0<a<2$, $0.3<b<5$, and $0 \leq \delta 2 \leq 3$. In an aspect, δ1 and δ2 may represent an oxygen vacancy.

The spinel compound is a compound having a spinel crystal structure or a spinel-like crystal structure.

For example, in Formulae 2 and 3, each M may be independently at least one of Ni, Pd, Pb, Fe, Ir, Co, Rh, Mn, Cr, Ru, Re, Sn, V, Ge, W, Zr, Ti, Mo, Hf, U, Nb, Th, Ta, Bi, Li, H, Na, K, Rb, Cs, Ca, Sr, Ba, Y, La, Ce, Pr, Nd, Pm, Sm, Gd, Tb, Dy, Ho, Er, Mg, Al, Si, Sc, Zn, Ga, Rb, Ag, Cd, In, Sb, Pt, Au, or Pb, and $0<x<1$, $0<y<1$, $0 \leq \delta 1 \leq 1$, $0<a<2$, $0.3<b<5$, and $0 \leq \delta 2 \leq 3$.

The spinel compound may be represented, for example, by Formula 4:

$$Li_{4 \pm a}Ti_{5-b}M'_cO_{12-\delta} \qquad \text{Formula 4}$$

In Formula 4, M' is at least one of Cr, Mg, Ca, Sr, Sc, Y, La, Ce, Pr, Nd, Sm, Eu, Gd, Tb, Dy, Ho, Er, Tm, Yb, Lu, Zr, Hf, V, Nb, Ta, Mo, W, Mn, Tc, Re, Fe, Ru, Os, Co, Rh, Ir, Ni, Pd, Pt, Cu, Ag, Au, Zn, Cd, Hg, Al, Ga, In, Tl, Ge, Sn, Pb, Sb, Bi, Po, As, Se, or Te, and $0.3<a<2$, $0.3<b<2$, $0.3<c<2$, and $0 \leq \delta \leq 3$. For example, $0 \leq \delta \leq 2.5$, $0 \leq \delta \leq 2$, $0 \leq \delta \leq 1.5$, $0 \leq \delta \leq 1$, and $0 \leq \delta \leq 0.5$.

The spinel compound of Formula 4 has, for example, the peak intensity ratio (Ia/Ib) of a peak intensity (Ia) on a (111) crystal face at the angle of diffraction of $2\theta = 18° \pm 2.5°$ with respect to a peak intensity (Ib) at the angle of diffraction of $2\theta = 23.5° \pm 2.5°$ in an XRD spectrum of about 1 or less, about 0.9 or less, about 0.8 or less, about 0.7 or less, about 0.6 or less, about 0.5 or less, or about 0.4 or less. When the spinel compound has the foregoing peak intensity ratios, the electronic conductivity and ionic conductivity are further improved.

The spinel compound of Formula 4 further includes, for example, other phases in addition to a phase having a spinel-like crystal structure. For example, a composite conductor (the spinel compound of Formula 4) includes a phase having a spinel-like crystal structure, which belongs to a Fd-3m space group, and in addition, further includes one or more other phases distinguished from the phase having the spinel-like crystal structure that is at least one of $Li_2TiO_3$, $Gd_2Ti_2O_7$, $GdTiO_3$, $LNbO_3$, or $Nb_2O_5$. When the composite conductor has a polycrystalline structure including such a plurality of different phases, electronic conductivity and ionic conductivity are further improved.

The band gap between the valence band and the conduction band of the spinel compound of Formula 4 is, for example, about 2 eV or less, about 1.8 eV or less, about 1.6 eV or less, about 1.4 eV or less, or about 1.2 eV or less, e.g., about 0.1 eV to about 2 eV, or about 0.5 eV to about 1.8 eV. When the band bap between the valence band and the conduction band of the composite conductor is below these limits, electrons from the valence band to the conduction band easily migrate, and thus, the electronic conductivity of the spinel compound is improved.

In the spinel compound of Formula 4, Ti has, for example, one or more oxidation numbers selected from trivalent or tetravalent. For example, when Ti has a mixed valence state by which a plurality of different oxidation numbers from each other are present in the composite conductor, a new state density function is added near Fermi energy (Ef), and the band gap between the valence band and the conduction band is reduced. As a result, the electronic conductivity of the spinel compound is improved.

In the spinel compound of Formula 4, M' has, for example, a different oxidation number from at least one oxidation number of Ti. For example, when M' is additionally included, which has different oxidation number from Ti in the composite conductor, a new state density function is added near Fermi energy (Ef), and the band gap between the valence band and the conduction band is reduced. As a result, the electronic conductivity of the spinel compound is even further improved.

When the oxygen vacancy is included in the spinel compound of Formula 4, improved ionic conductivity may be provided. Further, when the composite conductor includes the oxygen vacancy, the position of the state density function is shifted to near Fermi energy (Ef), and the band gap between the valence band and the conduction band is reduced. As a result, the electronic conductivity of the spinel compound is improved.

The spinel compound includes, for example, at least one of $Li_{4\pm x}Ti_{5-y}Mg_zO_{12-\delta}$ ($0.4<x\leq1$, $0.4<y\leq1$, $0.4<z\leq1$, $0<\delta\leq3$), $Li_{4\pm x}Ti_{5-y}Ca_zO_{12-\delta}$ ($0.4<x\leq1$, $0.4<y\leq1$, $0.4<z\leq1$, $0<\delta\leq3$), $Li_{4\pm x}Ti_{5-y}Sr_zO_{12-\delta}$ ($0.4<x\leq1$, $0.4<y\leq1$, $0.4<z\leq1$, $0<\delta\leq3$), $Li_{4\pm x}Ti_{5-x}Sc_zO_{12-\delta}$ ($0.4<x\leq1$, $0.4<y\leq1$, $0.4<z\leq1$, $0<\delta\leq3$), $Li_{4\pm x}Ti_{5-x}Y_zO_{12-\delta}$ ($0.4<x\leq1$, $0.4<y\leq1$, $0.4<z\leq1$, $0<\delta\leq3$), $Li_{4\pm x}Ti_{5-y}La_zO_{12-\delta}$ ($0.4<x\leq1$, $0.4<y\leq1$, $0.4<z\leq1$, $0<\delta\leq3$), $Li_{4\pm x}Ti_{5-y}Ce_zO_{12-\delta}$ ($0.4<x\leq1$, $0.4<y\leq1$, $0.4<z\leq1$, $0<\delta\leq3$), $Li_{4\pm x}Ti_{5-x}Pr_zO_{12-\delta}$ ($0.4<x\leq1$, $0.4<y\leq1$, $0.4<z\leq1$, $0<\delta\leq3$), $Li_{4\pm x}Ti_{5-y}Nd_zO_{12-\delta}$ ($0.4<x\leq1$, $0.4<y\leq1$, $0.4<z\leq1$, $0<\delta\leq3$), $Li_{4\pm x}Ti_{5-x}Sm_zO_{12-\delta}$ ($0.4<x\leq1$, $0.4<y\leq1$, $0.4<z\leq1$, $0<\delta\leq3$), $Li_{4\pm x}Ti_{5-y}Eu_zO_{12-\delta}$ ($0.4<x\leq1$, $0.4<y\leq1$, $0.4<z\leq1$, $0<\delta\leq3$), $Li_{4\pm x}Ti_{5-y}Gd_zO_{12-\delta}$ ($0.4<x\leq1$, $0.4<y\leq1$, $0.4<z\leq1$, $0<\delta\leq3$), $Li_{4\pm x}Ti_{5-y}Tb_zO_{12-\delta}$ ($0.4<x\leq1$, $0.4<y\leq1$, $0.4<z\leq1$, $0<\delta\leq3$), $Li_{4\pm x}Ti_{5-y}Dy_zO_{12-\delta}$ ($0.4<x\leq1$, $0.4<y\leq1$, $0.4<z\leq1$, $0<\delta\leq3$), $Li_{4\pm x}Ti_{5-x}Ho_zO_{12-\delta}$ ($0.4<x\leq1$, $0.4<y\leq1$, $0.4<z\leq1$, $0<\delta\leq3$), $Li_{4\pm x}Ti_{5-y}Er_zO_{12-\delta}$ ($0.4<x\leq1$, $0.4<y\leq1$, $0.4<z\leq1$, $0<\delta\leq3$), $Li_{4\pm x}Ti_{5-y}TmO_{12-\delta}$ ($0.4<x\leq1$, $0.4<y\leq1$, $0.4<z\leq1$, $0<\delta\leq3$), $Li_{4\pm x}Ti_{5-x}Yb_zO_{12-\delta}$ ($0.4<x\leq1$, $0.4<y\leq1$, $0.4<z\leq1$, $0<\delta\leq3$), $Li_{4\pm x}Ti_{5-y}Lu_zO_{12-\delta}$ ($0.4<x\leq1$, $0.4<y\leq1$, $0.4<z\leq1$, $0<\delta\leq3$), $Li_{4\pm x}Ti_{5-y}Zr_zO_{12-\delta}$ ($0.4<x\leq1$, $0.4<y\leq1$, $0.4<z\leq1$, $0<\delta\leq3$), $Li_{4\pm x}Ti_{5-x}Hf_zO_{12-\delta}$ ($0.4<x\leq1$, $0.4<y\leq1$, $0.4<z\leq1$, $0<\delta\leq3$), $Li_{4\pm x}Ti_{5-y}V_zO_{12-\delta}$ ($0.4<x\leq1$, $0.4<y\leq1$, $0.4<z\leq1$, $0<\delta\leq3$), $Li_{4\pm x}Ti_{5-x}Nb_zO_{12-\delta}$ ($0.4<x\leq1$, $0.4<y\leq1$, $0.4<z\leq1$, $0<\delta\leq3$), $Li_{4\pm x}Ti_{5-y}Ta_zO_{12-\delta}$ ($0.4<x\leq1$, $0.4<y\leq1$, $0.4<z\leq1$, $0<\delta\leq3$), $Li_{4\pm x}Ti_{5-x}Mo_zO_{12-\delta}$ ($0.4<x\leq1$, $0.4<y\leq1$, $0.4<z\leq1$, $0<\delta\leq3$), $Li_{4\pm x}Ti_{5-y}W_zO_{12-\delta}$ ($0.4<x\leq1$, $0.4<y\leq1$, $0.4<z\leq1$, $0<\delta\leq3$), $Li_{4\pm x}Ti_{5-y}Mn_zO_{12-\delta}$ ($0.4<x\leq1$, $0.4<y\leq1$, $0.4<z\leq1$, $0<\delta\leq3$), $Li_{4\pm x}Ti_{5-y}Tc_zO_{12-\delta}$ ($0.4<x\leq1$, $0.4<y\leq1$, $0.4<z\leq1$, $0<\delta\leq3$), $Li_{4\pm x}Ti_{5-y}Re_zO_{12-\delta}$ ($0.4<x\leq1$, $0.4<y\leq1$, $0.4<z\leq1$, $0<\delta\leq3$), $Li_{4\pm x}Ti_{5-y}Fe_zO_{12-\delta}$ ($0.4<x\leq1$, $0.4<y\leq1$, $0.4<z\leq1$, $0<\delta\leq3$), $Li_{4\pm x}Ti_{5-y}Ru_zO_{12-\delta}$ ($0.4<x\leq1$, $0.4<y\leq1$, $0.4<z\leq1$, $0<\delta\leq3$), $Li_{4\pm x}Ti_{5-y}Os_zO_{12-\delta}$ ($0.4<x\leq1$, $0.4<y\leq1$, $0.4<z\leq1$, $0<\delta\leq3$), $Li_{4\pm x}Ti_{5-y}Co_zO_{12-\delta}$ ($0.4<x\leq1$, $0.4<y\leq1$, $0.4<z\leq1$, $0<\delta\leq3$), $Li_{4\pm x}Ti_{5-y}Rh_zO_{12-\delta}$ ($0.4<x\leq1$, $0.4<y\leq1$, $0.4<z\leq1$, $0<\delta\leq3$), $Li_{4\pm x}Ti_{5-y}Ir_zO_{12-\delta}$ ($0.4<x\leq1$, $0.4<y\leq1$, $0.4<z\leq1$, $0<\delta\leq3$), $Li_{4\pm x}Ti_{5-x}Ni_zO_{12-\delta}$ ($0.4<x\leq1$, $0.4<y\leq1$, $0.4<z\leq1$, $0<\delta\leq3$), $Li_{4+x}Ti_{5-y}Pd_zO_{12-\delta}$ ($0.4<x\leq1$, $0.4<y\leq1$, $0.4<z\leq1$, $0<\delta\leq3$), $Li_{4\pm x}Ti_{5-y}Pt_zO_{12-\delta}$ ($0.4<x\leq1$, $0.4<y\leq1$, $0.4<z\leq1$, $0<\delta\leq3$), $Li_{4\pm x}Ti_{5-y}Cu_zO_{12-\delta}$ ($0.4<x\leq1$, $0.4<y\leq1$, $0.4<z\leq1$, $0<<3$), $Li_{4\pm x}Ti_{5-x}Ag_zO_{12-\delta}$ ($0.4<x\leq1$, $0.4<y\leq1$, $0.4<z\leq1$, $0<\delta\leq3$), $Li_{4\pm x}Ti_{5-y}Au_zO_{12-\delta}$ ($0.4<x\leq1$, $0.4<y\leq1$, $0.4<z\leq1$, $0<\delta\leq3$), $Li_{4\pm x}Ti_{5-y}Zn_zO_{12-\delta}$ ($0.4<x\leq1$, $0.4<y\leq1$, $0.4<z\leq1$, $0<\delta\leq3$), $Li_{4\pm x}Ti_{5-y}Cd_zO_{12-\delta}$ ($0.4<x\leq1$, $0.4<y\leq1$, $0.4<z\leq1$, $0<\delta\leq3$), $Li_{4\pm x}Ti_{5-y}Hg_zO_{12-\delta}$ ($0.4<x\leq1$, $0.4<y\leq1$, $0.4<z\leq1$, $0<\delta\leq3$), $Li_{4\pm x}Ti_{5-y}Al_zO_{12-\delta}$ ($0.4<x\leq1$, $0.4<y\leq1$, $0.4<z\leq1$, $0<\delta\leq3$), $Li_{4\pm x}Ti_{5-y}Ga_zO_{12-\delta}$ ($0.4<x\leq1$, $0.4<y\leq1$, $0.4<z\leq1$, $0<\delta\leq3$), $Li_{4\pm x}Ti_{5-y}In_zO_{12-\delta}$ ($0.4<x\leq1$, $0.4<y\leq1$, $0.4<z\leq1$, $0<\delta\leq3$), $Li_{4\pm x}Ti_{5-y}Tl_zO_{12-\delta}$ ($0.4<x\leq1$, $0.4<y\leq1$, $0.4<z\leq1$, $0<\delta\leq3$), $Li_{4\pm x}Ti_{5-y}Ge_zO_{12-\delta}$ ($0.4<x\leq1$, $0.4<y\leq1$, $0.4<z\leq1$, $0<\delta\leq3$), $Li_{4\pm x}Ti_{5-y}Sn_zO_{12-\delta}$ ($0.4<x\leq1$, $0.4<y\leq1$, $0.4<z\leq1$, $0<\delta\leq3$), $Li_{4\pm x}Ti_{5-y}Pb_zO_{12-\delta}$ ($0.4<x\leq1$, $0.4<y\leq1$, $0.4<z\leq1$, $0<<3$), $Li_{4\pm x}Ti_{5-y}Sb_zO_{12-\delta}$ ($0.4<x\leq1$, $0.4<y\leq1$, $0.4<z\leq1$, $0<\delta\leq3$), $Li_{4\pm x}Ti_{5-x}Bi_zO_{12-\delta}$ ($0.4<x\leq1$, $0.4<y\leq1$, $0.4<z\leq1$, $0<\delta\leq3$), $Li_{4\pm x}Ti_{5-x}Po_zO_{12-\delta}$ ($0.4<x\leq1$, $0.4<y\leq1$, $0.4<z\leq1$, $0<\delta\leq3$), $Li_{4\pm x}Ti_{5-y}As_zO_{12-\delta}$ ($0.4<x\leq1$, $0.4<y\leq1$, $0.4<z\leq1$, $0<\delta\leq3$), $Li_{4\pm x}Ti_{5-y}Se_zO_{12-\delta}$ ($0.4<x\leq1$, $0.4<y\leq1$, $0.4<z\leq1$, $0<\delta\leq3$), or $Li_{4\pm x}Ti_{5-y}Te_zO_{12-\delta}$ ($0.4<x\leq1$, $0.4<y\leq1$, $0.4<z\leq1$, $0<\delta\leq3$).

The spinel compound is, for example, $LiMn_2O_4$, $LiTiNbO_4$, $Li_4Ti_5O_{12}$, $Li_4MnO_{12}$, or $Li_{4.5}Ti_{4.5}Gd_{0.5}O_{12}$, but is not limited thereto, and any suitable compound including lithium, used as the spinel compound and providing electronic conductivity and ionic conductivity at the same time may be used.

The spinel compound has, for example, electronic conductivity at 25° C. of about $1\times10^{-6}$ S/cm or more and ionic conductivity of about $1\times10^{-7}$ S/cm or more.

The electronic conductivity of the spinel compound at 25° C. is, for example, about $5\times10^{-6}$ S/cm or more, about $1\times10^{-5}$ S/cm or more, about $5\times10^{-5}$ S/cm or more, about $1\times10^{-4}$ S/cm or more, about $5\times10^{-4}$ S/cm or more, about $1\times10^{-3}$ S/cm or more, about $5\times10^{-3}$ S/cm or more, about $1\times10^{-2}$ S/cm or more, about $5\times10^{-2}$ S/cm or more, or about $1\times10^{-1}$ S/cm or more. At a temperature of 25° C., the spinel compound may have, for example, an electronic conductivity of about $1\times10^{-6}$ S/cm to about $1\times10$ S/cm, about $2\times10^{-6}$ S/cm to about $1\times10$ S/cm, about $2\times10^{-6}$ S/cm to about 5 S/cm, about $4\times10^{-6}$ S/cm to about 5 S/cm, about $4\times10^{-6}$ S/cm to about 1 S/cm, about $5\times10^{-6}$ S/cm to about 1 S/cm, about $1\times10^{-5}$ S/cm to about 1 S/cm, about $2\times10^{-5}$ S/cm to about 1 S/cm, about $4\times10^{-5}$ S/cm to about 1 S/cm, about $5\times10^{-5}$ S/cm to about 1 S/cm, about $1\times10^{-4}$ S/cm to about 1 S/cm, about $2\times10^{-4}$ S/cm to about 1 S/cm, about $2\times10^{-4}$ S/cm to about $5\times10^{-1}$ S/cm, or about $2\times10^{-4}$ S/cm to about $1\times10^{-1}$ S/cm. When the spinel compound has an electronic conductivity in these ranges, the internal resistance of a cathode and a battery including the spinel compound is reduced. As a result, the cycle characteristics of the battery are improved.

The ionic conductivity of the spinel compound at 25° C. may be, for example, about $5\times10^{-7}$ S/cm or more, about $1\times10^{-6}$ S/cm or more, about $5\times10^{-6}$ S/cm or more, about $1\times10^{-5}$ S/cm or more, about $5\times10^{-5}$ S/cm or more, about $1\times10^{-4}$ S/cm or more, about $5\times10^{-4}$ S/cm or more, about $1\times10^{-3}$ S/cm or more, about $5\times10^{-3}$ S/cm or more, or about $1\times10^{-2}$ S/cm or more. At a temperature of 25° C., the spinel compound may have, for example, an ionic conductivity of about $1\times10^{-7}$ S/cm to about $1\times10^{1}$ S/cm, about $2\times10^{-7}$ S/cm to about $1\times10^{1}$ S/cm, about $2\times10^{-6}$ S/cm to about 5 S/cm, about $4\times10^{-6}$ S/cm to about 5 S/cm, about $4\times10^{-6}$ S/cm to about 1 S/cm, about $5\times10^{-6}$ S/cm to about 1 S/cm, about $1\times10^{-5}$ S/cm to about 1 S/cm, about $2\times10^{-5}$ S/cm to about 1 S/cm, about $4\times10^{-5}$ S/cm to about 1 S/cm, about $5\times10^{-5}$ S/cm to about 1 S/cm, about $1\times10^{-4}$ S/cm to about 1 S/cm, about $2\times10^{-4}$ S/cm to about 1 S/cm, about $2\times10^{-4}$ S/cm to about $5\times10^{-1}$ S/cm, or about $2\times10^{-4}$ S/cm to about $1\times10^{-1}$ S/cm. When the spinel compound has an ionic conductivity in these ranges, the internal resistance of a cathode and a battery including the spinel compound is reduced. As a result, the cycle characteristics of the battery are improved.

In addition, the lithium-containing metal oxide may include at least one of a layered compound, a garnet compound, a NASICON compound, a LISICON compound, a phosphate compound, a tavorite compound, a triplite compound, an anti-perovskite compound, a silicate compound, or a borate compound. When the lithium-containing metal oxide includes a compound having such a crystal structure, the decomposition of a cathode due to radicals involved in an electrochemical reaction is suppressed.

The lithium-containing metal oxide may include, for example, a layered compound represented by Formula 5:

$$Li_{1+x}M_{1+y}O_{2\pm\delta}$$ Formula 5

In Formula 5, M in Formula 5 is at least one of a Group 2 to a Group 16 element, and $0<x\leq 0.5$, $0<y\leq 1$, and $0\leq\delta\leq 1$.

The layered compound is a compound having a layered crystal structure.

The layered compound is, for example, a compound represented by at least one of $Li_aA_{1-b}B'_bD_2$ (where, $0.90\leq a\leq 1.8$, and $0\leq b\leq 0.5$); $Li_aE_{1-b}B'_bO_{2-c}D_c$ (where, $0.90\leq a\leq 1.8$, $0\leq b\leq 0.5$, and $0\leq c\leq 0.05$); $LiE_{2-b}B'_bO_{4-c}D_c$ (where, $0\leq b\leq 0.5$, and $0\leq c\leq 0.05$); $Li_aNi_{1-b-c}Co_bB'D_\alpha$ (where, $0.90\leq a\leq 1.8$, $0\leq b\leq 0.5$, $0\leq c\leq 0.05$, and $0<\alpha\leq 2$); $Li_aN_{1-b-c}Co_bB'_cO_{2-\alpha}F'_\alpha$ (where, $0.90\leq a\leq 1.8$, $0\leq b\leq 0.5$, $0\leq c\leq 0.05$, and $0<\alpha<2$); $Li_aN_{1-b-c}Co_bB_cO_{2-\alpha}F'_2$ (where, $0.90\leq a\leq 1.8$, $0\leq b\leq 0.5$, $0\leq c\leq 0.05$, and $0<\alpha<2$); $Li_aNi_{1-b-c}Mn_bB'_cD_\alpha$ (where, $0.90\leq a\leq 1.8$, $0\leq b\leq 0.5$, $0\leq c\leq 0.05$, and $0<\alpha\leq 2$); $Li_aNi_{1-c}Mn_bB'_cO_{2-\alpha}F'_\alpha$ (where, $0.90\leq a\leq 1.8$, $0\leq b\leq 0.5$, $0\leq c\leq 0.05$, and $0<\alpha<2$); $Li_aNi_{1-b-c}Mn_bB'O_{2-\alpha}F'_2$ (where, $0.90\leq a\leq 1.8$, $0\leq b\leq 0.5$, $0\leq c\leq 0.05$, and $0<\alpha<2$); $Li_aNi_bE_cG_dO_2$ (where, $0.90\leq a\leq 1.8$, $0\leq b\leq 0.9$, $0\leq c\leq 0.5$, and $0.001\leq d\leq 0.1$); $Li_aNi_bCo_cMn_dGeO_2$ (where, $0.90<a<1.8$, $0\leq b\leq 0.9$, $0\leq c\leq 0.5$, $0\leq d\leq 0.5$, and $0.001\leq e\leq 0.1$); $Li_aNiG_bO_2$ (where, $0.90\leq a\leq 1.8$, and $0.001\leq b\leq 0.1$); $Li_aCoG_bO_2$ (where, $0.90\leq a\leq 1.8$, and $0.001\leq b\leq 0.1$); and $Li_aMnG_bO_2$ (where, $0.90\leq a\leq 1.8$, and $0.001\leq b\leq 0.1$).

A is at least one of Ni, Co, or Mn; B' is at least one of Al, Ni, Co, Mn, Cr, Fe, Mg, Sr, V, or a rare earth element; D is at least one of O, F, S, or P; E is at least one of Co, or Mn; F' is at least one of F, S, or P; G is at least one of Al, Cr, Mn, Fe, Mg, La, Ce, Sr, or V.

The layered compound is, for example, $LNiO_2$, $LiCoO_2$, $LiMnO_2$, $LNi_{1-x}Mn_xO_2$ ($0<x\leq 1$), $LiNi_{1-x-y}Co_xMn_yO_2$ ($0<x\leq 0.5$, $0<y\leq 0.5$), $LNi_{0.8}Co_{0.1}Mn_{0.1}O_2$, or $LiNi_{1-x-y}Co_xAl_yO_2$ ($0<x\leq 0.5$, $0<y\leq 0.5$), but is not limited thereto, and any suitable compound used as a lithium-containing layered compound may be used.

The lithium-containing metal compound may include, for example, a NASICON compound represented by Formula 6:

$$Li_{1+x}A_xM_{2-x}(XO_4)_3$$ Formula 6

In Formula 6, each A and M in Formula 6 are each independently at least one of a Group 2 to a Group 16 element, X is As, P, Mo, or S, and $0<x<1.0$.

The NASICON compound is a compound having a NASICON crystal structure, e.g., a compound isostructural with NASICON.

The NASICON compound is, for example, $Li_{1.3}Al_{0.3}Ti_{1.7}(PO_4)_3$, $Li_{1.3}Al_{0.3}Ge_{1.7}(PO_4)_3$, or $Li_{1.3}Al_{0.3}Zr_{1.7}(PO_4)_3$, but is not limited thereto, and any suitable lithium-containing NASICON compounds may be used.

The lithium-containing metal oxide may include, for example, a LISICON compound represented by Formula 7:

$$Li_{8-c}A_aB'_bO_4$$ Formula 7

In Formula 7, each A and B' in Formula 7 are each independently at least one of a Group 2 to a Group 16 element, $c=ma+nb$, wherein m is an oxidation number of A, n is an oxidation number of B', and $0<a\leq 1$, and $0\leq b\leq 1$.

The LISICON compound is a compound having a LISICON crystal structure or a LISICON-like crystal structure.

The LISICON compound is, for example, $Li_4SiO_4$, $Li_{3.75}Si_{0.75}P_{0.25}O_4$, $Li_{14}Zn(GeO_4)_4$ $Li_{3.4}V_{0.6}Ge_{0.4}O_4$, or $Li_{3.5}V_{0.5}Ti_{0.5}O_4$, but is not limited thereto, and any suitable lithium-containing LISICON compound may be used.

The lithium-containing metal oxide may include, for example, a garnet compound represented by Formula 8:

$$Li_xA_3B'_2O_{12}$$ Formula 8

In Formula 8, each A and B' in Formula 8 are independently at least one of a Group 2 to Group 16 elements, and $3.0\leq x\leq 7.0$.

The garnet compound is a compound having a garnet crystal structure or a garnet-like crystal structure.

The garnet compound is, for example, $Li_3Tb_3Te_2O_{12}$, $Li_{4.22}Al_{0.26}La_3Zr_2WO_{12}$, $Li_5La_3Nb_2O_{12}$, $Li_6BaLa_2Ta_2O_{12}$, or $Li_7La_3Zr_2O_{12}$, but is not limited thereto, and any suitable lithium-containing garnet compound may be used.

The lithium-containing metal oxide may include, for example, a phosphate compound represented by Formula 9 or Formula 10:

$$Li_{1+x}MPO_4$$ Formula 9

$$Li_2MP_2O_7$$ Formula 10

In Formulae 9 and 10, each M of Formulae 9 and 10 is independently at least one of a Group 2 to a Group 16 elements, and $0\leq x\leq 1.0$.

The compound represented by Formula 9 is an olivine compound. The olivine compound is a compound having an olivine crystal structure or an olivine-like crystal structure.

The phosphate compound is, for example, $LiFePO_4$, $LiMnPO_4$, $LiCoPO_4$, $LiNiPO_4$, $Li_2MnP_2O_7$, or $Li_2FeP_2O_7$, but is not limited thereto, and any suitable lithium-containing phosphate compound may be used.

The lithium-containing metal oxide may include, for example, a tavorite compound or a triplite compound represented by Formula 11:

$$Li_{1+x}M(TiO_4)X'$$ Formula 11

In Formula 11, M in Formula 11 is at least one of a Group 2 to a Group 16 element, T is P or S, X is F, O, or OH, and $0\leq x\leq 1.0$.

The tavorite compound is a compound having a tavorite crystal structure or a tavorite-like crystal structure. The triplite compound is a compound having a triplite crystal structure or a triplite-like crystal structure.

The tavorite compound or triplite compound is, for example, $LiVO(PO_4)$, $LiV(P_4)F$, $LiFe(S_4)F$, or $Li_2Fe(PO_4)F$, but is not limited thereto, and any suitable lithium-containing tavorite compound or triplite compound may be used. The tavorite compound and the triplite compound have the same composition but different crystal structures.

The lithium-containing metal oxide may include, for example, an anti-perovskite compound represented by Formula 12:

$$Li_xM_yOA$$ Formula 12

In Formula 12, M in Formula 12 is at least one of a Group 2 to a Group 16 element, D is F, C, Br, I, S, Se, or Te, and $2.0\leq x\leq 3.0$, and $0\leq y\leq 1.0$.

The anti-perovskite compound has a perovskite crystal structure or a perovskite-like crystal structure, but is a compound in which the positions of a cation and an anion are switched into opposite positions from the perovskite compound.

The anti-perovskite compound is, for example, $Li_3OCl$, $Li_2OHBr$, $Li_2(OH)_{0.9}F_{0.1}Cl$, or $L_3OCl_{0.5}Br_{0.5}$, but is not limited thereto, and any suitable compound used as a lithium-containing anti-perovskite compound may be used.

The lithium-containing metal oxide may include, for example, at least one of a silicate compound represented by Formula 13:

 Formula 13

In Formula 13, M in Formula 13 is at least one of a Group 2 to a Group 16 element, and $0 \leq x \leq 1.0$.

The silicate compound may be a crystalline compound including a $SiO_4^{4-}$ anion.

The silicate compound is, for example, $Li_2MnSiO_4$, or $Li_2FeSiO_4$, but is not limited thereto, and any suitable lithium-containing silicate compound may be used.

The lithium-containing metal oxide may include, for example, at least one borate compound represented by Formula 14:

 Formula 14

In Formula 14, M in Formula 14 is at least one of a Group 2 to a Group 16 element, and $0 \leq x \leq 1.0$.

The borate compound is a crystalline compound including a $BO_3^{3-}$ anion.

The borate compound is, for example, $LiFeBO_3$ or $LiCoBO_3$, but is not limited thereto, and any suitable lithium-containing borate compound may be used.

The ionic conductivity at 25° C. of the layered compound represented by Formula 5, the NASICON compound represented by Formula 6, the LISICON compound represented by Formula 7, the garnet compound represented by Formula 8, the phosphate compound represented by at least one of Formula 9 or Formula 10, the tavorite compound or triplite compound represented by Formula 11, the anti-perovskite compound represented by Formula 12, the silicate compound represented by Formula 13, or the borate compound represented by Formula 14 is, for example, about $1 \times 10^{-6}$ S/cm or more, about $5 \times 10^{-6}$ S/cm or more, about $1 \times 10^{-5}$ S/cm or more, about $5 \times 10^{-5}$ S/cm or more, about $1 \times 10^{-4}$ S/cm or more, about $5 \times 10^{-4}$ S/cm or more, about $1 \times 10^{-3}$ S/cm or more, about $5 \times 10^{-3}$ S/cm or more, about $1 \times 10^{-2}$ S/cm or more, about $5 \times 10^{-2}$ S/cm or more, or about $1 \times 10^{-1}$ S/cm or more. The ionic conductivity may be in a range of about $1 \times 10^{-6}$ S/cm to about $1 \times 10^{1}$ S/cm, about $2 \times 10^{-6}$ S/cm to about $1 \times 10^{1}$ S/cm, about $2 \times 10^{-6}$ S/cm to about 5 S/cm, about $4 \times 10^{-6}$ S/cm to about 5 S/cm, about $4 \times 10^{-6}$ S/cm to about 1 S/cm, about $5 \times 10^{-6}$ S/cm to about 1 S/cm, about $1 \times 10^{-5}$ S/cm to about 1 S/cm, about $2 \times 10^{-5}$ S/cm to about 1 S/cm, about $4 \times 10^{-5}$ S/cm to about 1 S/cm, about $5 \times 10^{-5}$ S/cm to about 1 S/cm, about $1 \times 10^{-4}$ S/cm to about 1 S/cm, about $2 \times 10^{-4}$ S/cm to about 1 S/cm, about $2 \times 10^{-4}$ S/cm to about $5 \times 10^{-1}$ S/cm, or about $2 \times 10^{-4}$ S/cm to about $1 \times 10^{-1}$ S/cm. When the compounds of Formulae 5 to 14 have an ionic conductivity in these ranges, the internal resistance of a cathode and a lithium-air battery, including the compounds of Formulae 5 to 14 is reduced.

The porous film may include other electronic conductors in addition to the lithium-containing metal oxide. When an additional electronic conductor is included, the electronic conductivity of the porous film is increased.

The porous film may include, for example, an electronic conductor represented by Formula 15 or Formula 16:

 Formula 15

In Formula 15, Each A and B' in Formula 15 are independently at least one of a Group 2 to a Group 16 element, and $0.8 \leq x \leq 1.2$, $0.8 \leq y \leq 1.2$, and $0 \leq \delta \leq 1.5$.

 Formula 16

In Formula 16, M in Formula 16 is at least one of a Group 2 to a Group 16 element, and $0.6 \leq x \leq 1.0$, $0 \leq y \leq 0.4$, and $0 \leq \delta \leq 0.5$.

For example, in Formula 15, A is at least one of Sr, Ba, or La, and B' is at least one of Zr, Ce, Sc, Y, In, or Yb.

For example, in Formula 16, M in Formula 16 is at least one of Sc, Y, Zr, In, La, Pr, Sm, Gd, or Yb.

The porous film may include, for example, an electronic conductor such as $LaRuO_3$.

The lithium-containing metal oxide included in the porous film is, for example, electrochemically stable with respect to a lithium metal in a voltage range of about 2.0 volts (V) to about 4.0 V. Accordingly, the porous film may be used for a long time in a battery of which operation voltage with respect to a lithium metal is about 2.0 V to about 4.0 V. A lithium-air battery according to an embodiment includes the aforementioned cathode; an anode including lithium; and an electrolyte disposed between the cathode and the anode.

When the lithium-air battery employs a cathode in the form of a porous film having the porosity of about 50% or more and the RMS roughness (Rq) of the surface of about 1 μm or less, and including the lithium-containing metal oxide, the structural stability of the lithium-air battery is improved, the deterioration thereof is suppressed, and the cycle characteristics thereof are improved.

The lithium-air battery includes a cathode. The cathode is an air electrode. The cathode is positioned, for example, on a cathode current collector.

The cathode employs a porous film including the lithium-containing metal oxide. The amount of the lithium-containing metal oxide based on 100 parts by weight of the cathode is, for example, about 1 part by weight to about 100 parts by weight, about 10 parts by weight to about 99 parts by weight, about 50 parts by weight to about 98 parts by weight, about 60 parts by weight to about 97 parts by weight, about 70 parts by weight to about 96 parts by weight, about 80 parts by weight to about 95 parts by weight, or about 90 parts by weight to about 95 parts by weight. The cathode is, for example, substantially composed of a porous film. Also, the porous film is, for example, substantially composed of a lithium-containing metal oxide. Because the cathode is substantially composed of the porous film including a lithium-containing metal oxide, the structure of the cathode is simplified, and the preparation thereof is simplified. The cathode is permeable to a gas, for example, oxygen or air. Accordingly, the cathode is distinguished from the cathode of the prior art, which is substantially impermeable to a gas such as oxygen or air, and conducts only ions. When the cathode is porous and/or gas-permeable, oxygen and/or air are easily diffused into the cathode, and lithium ions and/or electrons easily move through the lithium-containing metal oxide, which is included in the cathode, and thus, an electrochemical reaction with oxygen, lithium ions, and electrons is readily carried out in the cathode.

The cathode may include, for example, other suitable cathode materials in addition to the porous film including the lithium-containing metal oxide.

The cathode further includes, for example, a conductive material. Such a conductive material is, for example, porous. When the conductive material is porous, the air penetration is facilitated. The conductive material may use any suitable materials having porosity and/or conductivity, and the conductive material is, for example, a metallic material. The metallic material is, for example, a metal fiber, a metal mesh, or a metal powder. The metal powder is, for example, copper, silver, nickel, or aluminum. The conductive material is, for example, an organic conductive material. The organic conductive material is, for example, a polyphenylene derivative or a polythiophene derivative. The conductive material is used, for example, alone or as a mixture. The cathode includes a composite conductor as the conductive material, and the cathode may further include the aforementioned conductive materials in addition to the composite conductor.

The cathode is prepared by, for example, mixing a conductive material, an oxygen oxidizing/reducing catalyst and a binder, adding a suitable solvent to prepare a cathode slurry, and applying the slurry on the surface of a base and drying the slurry, or pressing and molding on a base to increase electrode density. The base is, for example, a cathode current collector, a separator, or a solid electrolyte film. The cathode current collector is, for example, a gas diffusion layer. The conductive material includes a composite conductor, and the oxygen oxidizing/reducing catalyst and the binder may be omitted from the cathode.

The lithium-air battery includes an anode. The anode includes lithium.

The anode is, for example, a lithium metal thin film or a lithium-based alloy thin film. The lithium-based alloy is, for example, an alloy of aluminum, tin, magnesium, indium, calcium, titanium, or vanadium, with lithium.

The lithium-air battery includes an electrolyte layer disposed between a cathode and an anode.

The thickness of the electrolyte layer may be, for example, about 1 μm to about 1000 μm, about 1 μm to about 500 μm, about 1 μm to about 300 μm, about 1 to about 200 μm, about 1 μm to about 100 μm, about 1 μm to about 50 μm, about 1 μm to about 40 μm, about 1 μm to about 30 μm, about 1 μm to about 20 μm, or about 1 μm to about 10 μm.

The electrolyte layer includes at least one of a solid electrolyte, a gel electrolyte, or a liquid electrolyte. The solid electrolyte, the gel electrolyte and the liquid electrolyte are not limited, and any suitable electrolyte may be used.

The solid electrolyte includes at least one of a solid electrolyte including an ionically conductive inorganic material, a solid electrolyte including a polymeric ionic liquid (PIL) and a lithium salt, a solid electrolyte including an ionically conductive polymer and a lithium salt, or a solid electrolyte including an electronically conductive polymer, but is not limited thereto, and any suitable solid electrolyte may be used.

The ionically conductive inorganic material includes at least one of a glass or amorphous metal ion conductor, a ceramic activated metal ion conductor, or a glass ceramic activated metal ion conductor, but is not limited thereto, and any suitable ionically conductive inorganic material may be used. The ionically conductive inorganic material is, for example, an ionically conductive inorganic particle or the molded article thereof into a sheet type.

The ionically conductive inorganic material is, for example, at least one of $BaTiO_3$, $Pb(Zr_aTi_{1-a})O_3$ (PZT) ($0 \leq a \leq 1$), $Pb_{1-x}La_xZr_{1-y}Ti_yO_3$ (PLZT) ($0 \leq x < 1$, $0 \leq y < 1$), $Pb(Mg_{1/3}Nb_{2/3})_3$—$PbTiO_3$ (PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, SiC, lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $Li_{1+x+y}(Al_aGa_{1-a})_x(Ti_bGe_{1-b})_{2-x}Si_yP_{3-y}O_{12}$ ($0 \leq x \leq 1$, $0 \leq y \leq 1$, $0 \leq a \leq 1$, $0 \leq b \leq 1$), lithium lanthanum titanate ($Li_xLa_yTiO_3$, $0<x \leq 2$, $0<y \leq 3$), lithium germanium thiophosphate ($Li_xGe_yP_z$, $0<x<4$, $0<y<1$, $0<z<1$, $0<w<5$), lithium nitride ($Li_xN_y$, $0<x<4$, $0<y<2$), $SiS_2$ ($Li_xSi_yS_z$, $0<x<3$, $0<y<2$, $0<z<4$) series glass, $P_2S_5$ ($Li_xP_yS_z$, $0<x<3$, $0<y<3$, $0<z<7$) series glass, $Li_2O$, LiF, LiOH, $Li_2CO_3$, $LiAlO_2$, $Li_2O$—$Al_2O_3$—$SiO_2$—$P_2O_5$—$TiO_2$—$GeO_2$-based ceramics, or garnet-based ceramics ($Li_3+La_3M_2O_{12}$ ($0 \leq x \leq 4$, M=Te, Nb, Zr)).

The PIL includes, for example, a repeating unit including i) at least one of an ammonium-based cation, a pyrrolidinium-based cation, a pyridinium-based cation, a pyrimidinium-based cation, an imidazolium-based cation, a piperidinium-based cation, a pyrazolium-based cation, an oxazolium-based cation, a pyridazinium-based cation, a phosphonium-based cation, a sulfonium-based cation, or a triazolium-based cation, and ii) at least one anion of $BF_4^-$, $PF^-$, $AsF^-$, $SbF^-$, $AlCl_4^-$, $HSO_4^-$, $ClO_4^-$, $CH_3SO_3^-$, $CF_3CO_2^-$, $(CF_3SO_2)_2N^-$, $Cl^-$, $Br^-$, $I^-$, $SO_4^-$, $CF_3SO_3^-$, $(C_2F_5SO_2)_2N^-$, $(C_2F_5SO_2)(CF_3SO_2)N$—, $NO_3$, $Al_2Cl_7^-$, $CH_3COO^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_5P^-$, $SF_5CF_2SO_3$—, $SFCHFCF_2SO_3$—, $CF_3CF_2(CF_3)_2CO^-$, $(CF_3SO_2)_2CH^-$, $(SF_5)_3C^-$, or $(O(CF_3)_2C_2(CF_3)_2O)_2PO^-$. The PIL is, for example, poly(diallyldimethylammonium)trifluoromethylsulfonylimide (TFSI), poly(1-allyl-3-methylimidazolium bis(trifluoromethanesulfonyl)imide), or poly(N-methyl-N-propylpiperidinium bis(trifluoromethanesulfonyl)imide).

The ionically conductive polymer includes, for example, at least one of ionically conductive repeating units selected from an ether-based monomer, an acrylic monomer, a methacrylic monomer, or a siloxane-based monomer.

The ionically conductive polymer includes, for example, polyethylene oxide (PEO), polyvinyl alcohol (PVA), polyvinyl pyrrolidone (PVP), polyvinyl sulfone, polypropylene oxide (PPO), polymethyl methacrylate, polyethyl methacrylate, polydimethylsiloxane, polyacrylic acid, polymethacrylic acid, polymethyl acrylate, polyethyl acrylate, poly2-ethylhexyl acrylate, polybutyl methacrylate, poly2-ethylhexyl methacrylate, polydecyl acrylate, polyethylene vinyl acetate, a phosphoric acid ester polymer, polyester sulfide, polyvinylidene fluoride (PVdF), or Li-substituted Nafion, but is not limited thereto, and any suitable ionically conductive polymer may be used.

The electronically conductive polymer is, for example, a polyphenylene derivative or a polythiophene derivative, but is not limited thereto, and any suitable electronically conductive polymer may be used.

The gel electrolyte is obtained by, for example, additionally adding a solvent having a low molecular weight to a solid electrolyte positioned between a cathode and an anode. The gel electrolyte is, for example, a gel electrolyte obtained by additionally adding a solvent, which is an organic compound having a low molecular weight, and an oligomer, to a polymer.

The liquid electrolyte includes a solvent and a lithium salt.

The solvent includes at least one of an organic solvent, an ionic liquid, or an oligomer, but is not limited thereto, and any suitable material may be used as long as it is liquid at room temperature (25° C.) and used as a solvent.

The organic solvent includes, for example, at least one of an ether-based solvent, a carbonate-based solvent, an ester-based solvent, or a ketone-based solvent. The organic solvent includes, for example, at least one of propylene carbonate, ethylene carbonate, fluoroethylene carbonate, vinyl ethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyltetrahydrofuran, γ-butyrolactone, dioxolane, 4-methyl dioxolane, dimethylacetamide, dimethylsulfoxide, dioxane, 1,2-dimethoxyethane, sulfolane, dichloroethane, chlorobenzene, nitrobenzene, succinonitrile, diethylene glycol dimethyl ether (DE-GDME), tetraethylene glycol dimethyl ether (TEGDME), polyethylene glycol dimethyl ether (PEGDME, Mn=~500), dimethyl ether, diethyl ether, dibutyl ether, or dimethoxyethane, but is not limited thereto, and any suitable liquid organic solvent that is a solvent at room temperature may be used.

The ionic liquid (IL) includes, for example, i) at least one of an ammonium-based cation, a pyrrolidinium-based cation, a pyridinium-based cation, a pyrimidinium-based cation, an imidazolium-based cation, a piperidinium-based cation, a pyrazolium-based cation, an oxazolium-based cation, a pyridazinium-based cation, a phosphonium-based cation, a sulfonium-based cation, or a triazolium-based cation, and ii) at least one anion of $BF_4^-$, $PF^-$, $AsF^-$, $SbF^-$, $AlCl_4^-$, $HSO_4^-$, $ClO_4^-$, $CH_3SO_3^-$, $CF_3CO_2^-$, $(CF_3SO_2)_2N^-$, $Cl^-$, $Br^-$, $I^-$, $SO_4^-$, $CF_3SO_3^-$, $(C_2F_5SO_2)_2N^-$, $(C_2F_5SO_2)(CF_3SO_2)N$—, $NO_3$, $Al_2Cl^-$, $CH_3COO^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_5P^-$, $SF_5CF_2SO_3^-$, $SFCHFCF_2SO_3$—, $CF_3CF_2(CF_3)_2CO^-$, $(CF_3SO_2)_2CH^-$, $(SF_5)_3C^-$, or $(O(CF_3)_2C_2(CF_3)_2O)_2PO^-$.

The lithium salt includes at least one of LiTFSI(LiN($SO_2CF_3)_2$), $LiPF_6$, $LiBF_4$, $LiAsF_6$, $LiClO_4$, $LiNO_3$, lithium bis(oxalato) borate (LiBOB), $LiN(SO_2C_2F_5)_2$, $LiC(SO_2CF_3)_3$, $LiN(SO_3CF_3)_2$, $LiC_4F_9SO_3$, $LiAlCl_4$, or lithium trifluoromethanesulfonate (LiTfO, $LiCF_3SO_3$), but is not limited thereto, and any suitable lithium salt may be used. The concentration of the lithium salt is, for example, about 0.01 M to about 5.0 M.

The lithium-air battery further includes, for example, a separator between the cathode and the anode. The separator is not limited as long as it has a composition enduring the range of use of a lithium-air battery. The separator includes, for example, a polymer non-woven fabric such as a non-woven fabric of a polypropylene material, a non-woven fabric of a polyphenylene sulfide material, a porous film of an olefin-based resin such as polyethylene and polypropylene, or a glass fiber, and may include two or more thereof in combination.

The electrolyte layer has, for example, a structure in which a separator is impregnated with a solid polymer electrolyte, or a structure in which a separator is impregnated with a liquid electrolyte. The electrolyte layer in which a separator is impregnated with a solid polymer electrolyte is prepared by, for example, disposing solid polymer electrolyte films on one side or both sides of the separator, and then rolling them at the same time. The electrolyte layer in which a separator is impregnated with a liquid electrolyte is prepared by injecting a liquid electrolyte including a lithium salt into the separator.

The lithium-air battery is completed by disposing an anode at one side in a case, disposing an electrolyte layer on the anode, disposing a cathode on the electrolyte layer, positioning a porous cathode current collector on the cathode, disposing a pressing member on the porous cathode current collector so as to transfer air to an air electrode, and pressing the pressing member for fixing a cell. The case may be divided into an upper part making contact with a cathode and a lower part making contact with an anode, and an insulating resin may be disposed between the upper part and the lower part to electrically insulate the cathode and the anode.

The lithium-air battery may be used in all kinds of primary batteries and secondary batteries. The shape of the lithium-air battery is not specifically limited, but is, for example, a coin type, a button type, a sheet type, a stack type, a cylinder type, a flat type, or a cone type. The lithium-air battery may be a large-size battery that is used in electric vehicles.

Figure 8:
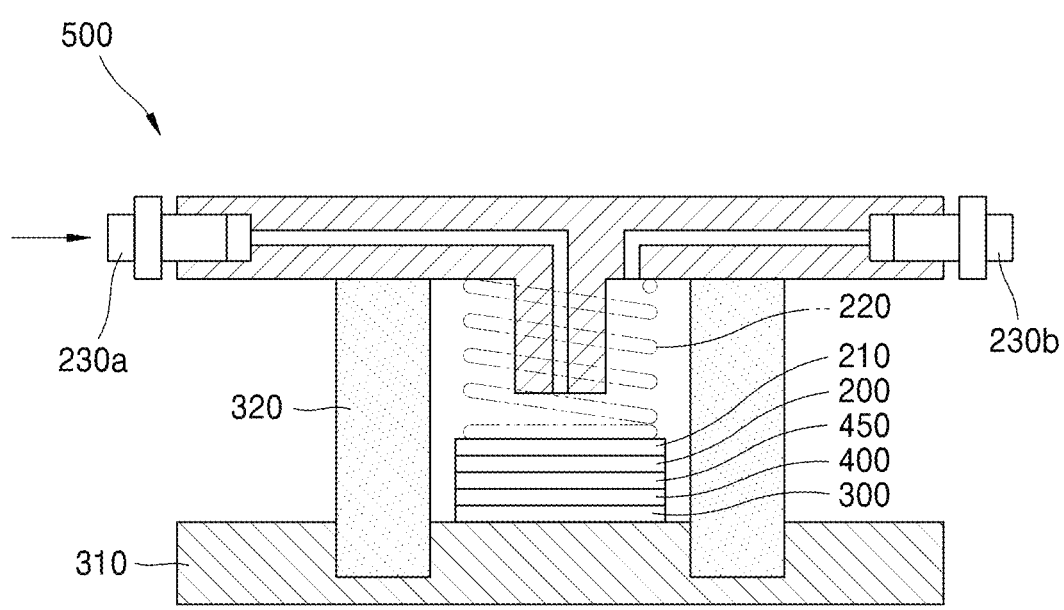
FIG. 8 is a schematic diagram showing the structure of an embodiment of a lithium-air battery.

An embodiment of the lithium-air battery is schematically shown in FIG. 8. A lithium-air battery 500 includes a first electrolyte layer 400 disposed between a cathode 200 using oxygen as an active material adjacent to a first current collector 210 and an anode 300 containing lithium, adjacent to a second current collector 310. The first electrolyte layer 400 is a separator impregnated with a liquid electrolyte. A second electrolyte layer 450 is disposed between the cathode 200 and the first electrolyte layer 400. The second electrolyte layer 450 is a lithium ion conductive solid electrolyte film. The first current collector 210 is porous and may play the role of a gas diffusion layer which is capable of diffusing air. Alternatively, a gas diffusing layer may be additionally disposed between the first current collector 210 and the cathode 200. A pressing member 220 is disposed on the first current collector 210, for transferring air to the cathode. A case 320 of an insulating resin material is disposed between the cathode 200 and the anode 300 to electrically separate the cathode 200 and the anode 300. Air is supplied through an air inlet 230a and discharged through an air outlet 230b. The lithium-air battery 500 may be contained in a stainless steel container.

The "air" of the lithium-air battery is not limited to air, and may include a combination of gases including oxygen, or a pure oxygen gas. The broad definition of the term "air" is applied to all uses, for example, air batteries or air electrodes.

The method of preparing a cathode according to an embodiment includes preparing a composition including a metal oxide and a binder; applying the composition onto a base and drying the composition to prepare a coating layer; pressing the coating layer to prepare a sheet; and heat-treating the sheet in an oxidizing atmosphere at a temperature of about 450° C. to about 800° C. The metal oxide may include, for example, a lithium-containing metal oxide.

The composition may include, for example, the lithium-containing metal oxide, a binder, a dispersant, a plasticizer, and a solvent. The type and amount of the binder, the dispersant, or the plasticizer are not specifically limited, and all used for forming a green sheet including ceramics in this technical field may be used. Based on 100 parts by weight of the lithium-containing metal oxide, for example, about 5 parts by weight to about 20 parts by weight of the binder, about 1 part by weight to about 10 parts by weight of the dispersant, and about 1 part by weight to about 10 parts by weight of the plasticizer may be included. The composition may further include a solvent. The amount of the solvent may be, for example, about 1 part by weight to about 500 parts by weight, based on 100 parts by weight of the solid content, of the lithium-containing metal oxide, the binder, the dispersant, and the plasticizer.

The binder may use, for example, polyvinyl butyral, polyvinylidene fluoride, polyvinyl alcohol, carboxymethyl cellulose (CMC), starch, hydroxypropyl cellulose, regenerated cellulose, polyvinyl pyrrolidone, polytetrafluoroethylene, ethylene-propylene-diene terpolymer (EPDM), sulfonated EPDM, styrene butylene rubber, or fluorine rubber.

The solvent may use alcohols such as ethanol, or NMP. The amount of the solvent is suitably controlled in order to dissolve or disperse each component constituting the composition.

The composition may further include organic particles having a size of about 1 μm or more.

The size (average particle diameter) of the organic particles is an important factor affecting the size of large-diameter pores in the cathode and is, for example, about 1 μm to about 100 μm, for example, about 2 μm to about 50 μm, for example, about 3 μm to about 30 μm, for example, about 4 μm to about 20 μm, for example, about 5 μm to about 10 μm, for example, about 6 μm to about 8 μm. The organic particle is a microsphere having monomodal particle diameter distribution. The monomodal particle diameter distribution, when analyzed using a dynamic light scattering (DLS, Nicomp 380), may be defined within a standard deviation of less than about 40%, for example, about 10% or less, for example, about 1% to about less than about 40%, for example, about 3% to about 10%. The organic particle may have a spherical shape, a rod shape, an elliptical shape, or a radial shape. In case of the spherical shape, the organic particles may be, for example, microspheres having an average particle diameter of about 1 μm or more. In case where the size of the particle is less than about 1 μm, the discharge product content is reduced, and the charge and discharge efficiency and life characteristics of a lithium-air battery employing such cathode may be deteriorated.

The organic particle may be a polymer and may include, for example, at least one of i) polystyrene, a copolymer containing a styrene repeating unit, a copolymer containing a repeating unit having a crosslinkable functional group, or ii) a crosslinked polymer. The particle may be a polymer containing a styrene-based repeating unit. As described, the polymer having a styrene-based repeating unit has hydrophobicity, and does not adversely affect a lithium metal electrode and has little electrolyte wettability, and thus, may minimize the reactivity of the lithium metal electrode and the electrolyte.

The at least one of i) polystyrene, a copolymer containing a styrene repeating unit, a copolymer containing a repeating unit having a crosslinkable functional group, or ii) a crosslinked polymer, may be at least one of polystyrene, a copolymer of poly(styrene-divinylbenzene), a copolymer of poly(methyl methacrylate-divinylbenzene), a copolymer of poly(ethyl methacrylate-divinylbenzene), a copolymer of poly(pentyl methacrylate-divinylbenzene), a copolymer of poly(butyl methacrylate-divinylbenzene), a copolymer of poly(propyl methacrylate-divinylbenzene), a copolymer of poly(styrene-ethylene-butylene ethylene-butylene), a copolymer of poly(styrene-methyl methacrylate), a copolymer of poly(styrene-acrylonitrile), a copolymer of poly(styrene-vinylpyridine), a copolymer of poly(acrylonitrile-butadiene-styrene), a copolymer of poly(acrylonitrile-ethylene-propylene-styrene), a copolymer of poly(methyl methacrylate-acrylonitrile-butadiene-styrene), a copolymer of poly(methacrylate-butadiene-styrene), a copolymer of poly(styrene-acrylonitrile) and a copolymer of poly(acrylonitrile-styrene-acrylate), or a crosslinked polymer.

The poly(styrene-divinylbenzene) copolymer is represented by Formula 17:

Formula 17

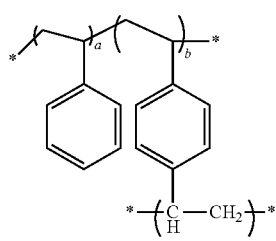

In Formula 17, a and b are mole fractions and are about 0.01 to about 0.99, respectively, and the sum of a and b is 1. In Formula 17, a is, for example, about 0.95 to about 0.99, or about 0.98 to about 0.99, and b is, for example, about 0.01 to about 0.05, or about 0.01 to about 0.02.

The poly(styrene-divinylbenzene) copolymer is represented by Formula 18:

Formula 18

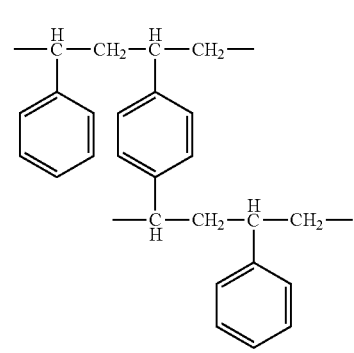

The poly(acrylonitrile-butadiene-styrene) copolymer is represented by Formula 19:

Formula 19

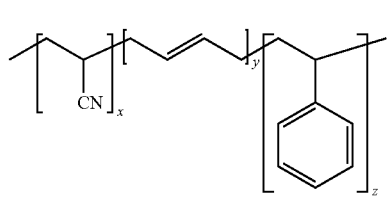

In Formula 19, x, y and z are each independently mole fractions from about 0.01 to about 0.99, and the sum of x, "y" and z is 1.

In Formula 19, x is about 0.1 to about 0.35, y is about 0.05 to about 0.55, and z is about 0.2 to about 0.7. For example, x is about 0.15 to about 0.35, y is about 0.05 to about 0.3, and z is about 0.4 to about 0.6.

The polymerization degree of the poly(styrene-divinylbenzene) copolymer and poly(acrylonitrile-butadiene-styrene) copolymer is a number of about 2 to about 5,000, for example, about 5 to about 1,000.

The poly(styrene-divinylbenzene) copolymer and poly(acrylonitrile-butadiene-styrene) copolymer may be, for example, block copolymers.

The amount of an organic particle in the composition is about 1 part by weight to about 60 parts by weight, about 5 parts by weight to about 60 parts by weight, or about 20 parts by weight to about 60 parts by weight, based on 100 parts by weight of the mixed conductor (metal oxide). The amount of the binder is about 5 parts by weight to about 50 parts by weight, for example, about 10 parts by weight to about 40 parts by weight, based on 100 parts by weight of the mixed conductor (metal oxide). If the amounts of the organic particles and the binder are within these ranges, a cathode having excellent capacity, electronic conductivity and ionic conductivity, and excellent physical properties may be prepared.

A coating layer may be prepared by applying the composition onto a base such as a releasing film using a doctor-blade to a thickness of about 1 μm to about 1000 μm and then, drying the composition.

The operation of preparing the sheet by pressing the coating layer may include stacking a plurality of the coating layer to prepare a stacked body, and pressing the stacked body to prepare a sheet. For example, a plurality of coating layers disposed on releasing films are prepared, and the coating layers are stacked to face each other and pressed to prepare a green sheet. The pressing may be performed by hot-press with a constant pressure for about 1 minute to about 30 minutes under a pressure of about 100 psi to about 500 psi.

The heat-treating of the sheet thus prepared is performed in a temperature range capable of decomposing organic particles to form pores, for example, at about 450° C. to about 800° C., for example, at about 450° C. to about 750° C., for example, at about 450° C. to about 700° C. If the composition contains the binder, the binder may also be removed during heating. The heating time is changed according to the heating temperature, but is, for example, about 0.5 hours to about 20 hours, about 1 hour to about 10 hours, or about 1 hour to about 3 hours. By the heat treatment, organic materials such as the binder in the green sheet are stably decomposed and removed, and a stable and firm porous film is prepared. A temperature elevation rate to the heat-treating temperature during the heat treatment may be, for example, 5 degrees per minute, and cooling may be natural cooling. By performing the heat treatment in such temperature and time ranges, a cathode having excellent capacity properties may be prepared, and by using this cathode, a lithium-air battery having improved charge and discharge efficiency and life characteristics may be formed.

Figure 7A:
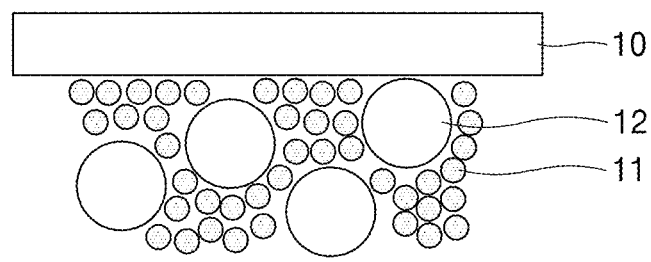
FIGS. 7A to 7C are schematic diagrams showing a cathode in the form of a porous film, prepared according to the method used in Example 1.
Figure 7A:
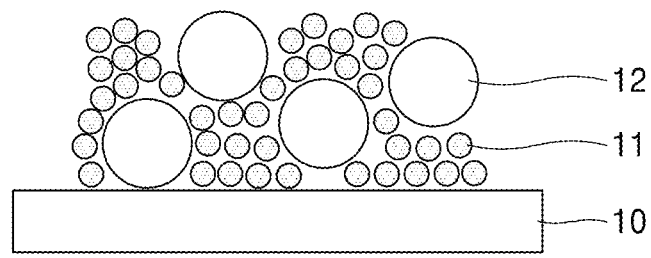
Figure 7B:
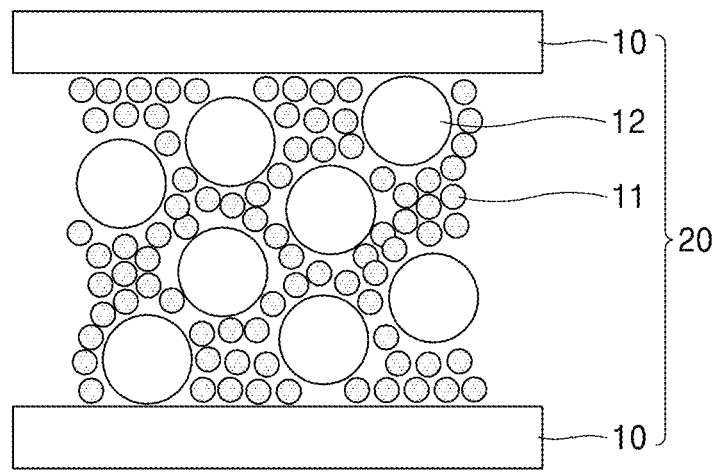
Figure 7C:
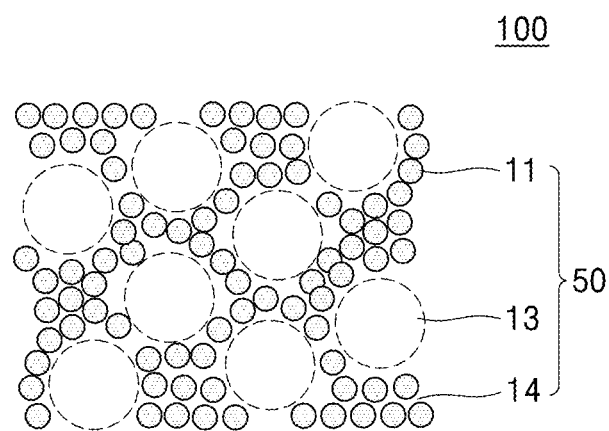

Referring to FIGS. 7A to 7C, a method of preparing a cathode will be described.

A composition including a lithium-containing metal oxide 11 and organic particles 12 is applied onto a base 10 such as a releasing film using a doctor-blade, and then dried to prepare a coating layer. Then, a plurality of coating layers are positioned to face each other and pressed to prepare a sheet 20. The sheet 20 is heat-treated to remove the organic particles 12 and to form a porous film 50 including large-diameter pores 13 and small-diameter pores 14. The porous film 50 is used as a cathode 100.

The disclosure will be explained in more detail referring to examples and comparative examples hereinafter. However, the examples are for illustrating the disclosure, and the scope of the disclosure is not limited thereto.

EXAMPLES

Preparation of Lithium-Containing Metal Oxide

Preparation Example 1: Preparation of a Spinel Material of $Li_{4.5}Ti_{4.5}Nb_{0.5}O_{12-\delta}$ A lithium precursor, $Li_2CO_3$, a titanium precursor, $TiO_2$, and a Nb precursor, $Nb_2O_5$ were mixed in a stoichiometric ratio, and then ground and mixed using a ball mill including ethanol and zirconia balls in 280 rpm for 4 hours to prepare a mixture. The mixture thus obtained was dried at 90° C. for 6 hours, and first heat-treatment was performed in an air atmosphere at 700° C. for 5 hours. The resultant product of the first heat treatment was ground using a ball mill and then, pressed under an isostatic pressure to prepare a pellet. A second heat treatment was performed with respect to the pellet thus prepared in a reducing atmosphere at 950° C. for 24 hours to prepare a composite conductor. The reducing atmosphere was an atmosphere with 5% of hydrogen and 95% of argon. The composition of the lithium-containing metal oxide thus prepared was $Li_{4.5}Ti_{4.5}Nb_{0.5}O_{12-\delta}$ ($0<\delta<3$).

Preparation Example 2: Preparation of a Spinel Material of $Li_{3.5}Ti_{4.0}Nb_{1.0}O_{12-\delta}$ A composite conductor was prepared by the same method as in Preparation Example 1 except for the stoichiometric ratio of the lithium precursor, the titanium precursor and the Nb precursor was changed.

The composition of the lithium-containing metal oxide thus prepared was $Li_{3.5}Ti_{4.0}Nb_{1.0}O_{12-\delta}$ ($0<\delta<3$).

Preparation Example 3: Preparation of a Spinel Material of $Li_{3.5}Ti_{4.0}Ta_{1.0}O_{12-\delta}$ A composite conductor was prepared by the same method as in Preparation Example 1 except for using a Ta precursor, $Ta_2O_5$, instead of the Nb precursor and the stoichiometric ratio of the lithium precursor, the titanium precursor and the Ta precursor was changed.

The composition of the lithium-containing metal oxide thus prepared was $Li_{3.5}Ti_{4.0}Ta_{1.0}O_{12-\delta}$ ($0<\delta<3$).

Preparation Example 4: Preparation of a Spinel Material of $Li_{4.5}Ti_{4.5}Gd_{0.5}O_{12-\delta}$ A composite conductor was prepared by the same method as in Preparation Example 1 except for using a Gd precursor, $Gd_2O_3$, instead of the Nb precursor.

The composition of the lithium-containing metal oxide thus prepared was $Li_{4.5}Ti_{4.5}Gd_{0.5}O_{12-\delta}$ ($0<\delta<3$).

Preparation Example 5: Preparation of a Spinel Material of $Li_{5.0}Ti_{4.0}Gd_{1.0}O_{12-\delta}$ A composite conductor was prepared by the same method as in Preparation Example 1 except for using a Gd precursor, $Gd_2O_3$, instead of the Nb precursor and the stoichiometric ratio of the lithium precursor, the titanium precursor and the Gd precursor was changed.

The composition of the lithium-containing metal oxide thus prepared was $Li_{5.0}Ti_{4.0}Gd_{1.0}O_{12-\delta}$ ($0<\delta<3$).

Preparation Example 6: Preparation of a Spinel Material of $Li_{4.5}Ti_{4.5}In_{0.5}O_{12-\delta}$ A composite conductor was prepared by the same method as in Preparation Example 1 except for using an In precursor, $In_2O_3$, instead of the Nb precursor.

The composition of the lithium-containing metal oxide thus prepared was $Li_{4.5}Ti_{4.5}In_{0.5}O_{12-\delta}$ ($0<\delta<3$).

Preparation Example 7: Preparation of a Spinel Material of $Li_{5.0}Ti_{4.0}In_{1.0}O_{12-\delta}$ A composite conductor was prepared by the same method as in Preparation Example 1 except for using an In precursor, $In_2O_3$, instead of the Nb precursor and the stoichiometric ratio of the lithium precursor, the titanium precursor and the In precursor was changed.

The composition of the lithium-containing metal oxide thus prepared was $Li_{5.0}Ti_{4.0}In_{1.0}O_{12-\delta}$ ($0<\delta<3$).

Preparation Example 8: Preparation of a Spinel Material of $Li_4Ti_5O_{12-\delta}$ A commercially purchased $Li_4Ti_5O_{12}$ was used as supplied.

Preparation Example 9: Preparation of a Perovskite Material of $Li_{0.34}La_{0.55}TiO_3$ $Li_2CO_3$, $La_2O_3$, and $TiO_2$ powders were added to ethanol according to the composition ratio of $Li_{0.34}La_{0.55}TiO_3$ and mixed. The amount of the ethanol was about 4 parts by weight based on 100 parts by weight of the total weight of the $Li_2CO_3$, $La_2O_3$, and $TiO_2$ powders.

The mixture was put in a ball-milling apparatus and ground and mixed for 4 hours. The resultant mixture was dried and heated in a temperature elevation rate of about 5° C./min to 800° C., and then, a first heat-treatment was performed at the same temperature under an air atmosphere for 4 hours.

The powder thus obtained by the first heat-treatment was ground to prepare a powder having a primary particle size of about 0.3 μm. The powder thus prepared was pressurized to form a cylindrical pellet having a diameter of about 1.3 cm, a height of about 0.5 cm, and a weight of about 0.3 g. A second heat-treatment was performed with respect to the pellet thus formed under an air atmosphere at a temperature of 1,100° C. for about 24 hours to obtain a target material. The temperature elevation rate for elevating the temperature to 1,100° C. for the second heat-treatment was about 5° C./min. The composition of the lithium-containing metal oxide thus prepared was $Li_{0.34}La_{0.55}TiO_3$.

Preparation Example 10: Preparation of a Perovskite Material of $Li_{0.34}La_{0.55}RuO_3$ A target material was obtained by performing the same procedure in Preparation Example 9 except for using $RuO_2$ instead of $TiO_2$ and performing the second heat-treatment at 1,200° C.

The composition of the lithium-containing metal oxide thus prepared was $Li_{0.34}La_{0.55}RuO_3$.

Preparation Example 11: Preparation of a Perovskite Material of $Li_{0.34}La_{0.55}MnO_3$ A target material was obtained by performing the same procedure in Preparation Example 9 except for using $MnO_2$ instead of $TiO_2$ and performing the second heat-treatment at 1,200° C.

The composition of the lithium-containing metal oxide thus prepared was $Li_{0.34}La_{0.55}MnO_3$.

Preparation Example 12: Preparation of a Perovskite Material of $Li_{0.34}La_{0.55}NiO_{3-\delta}$ A target material was obtained by performing the same procedure in Preparation Example 9 except for using $Ni(OH)_2$ instead of $TiO_2$ and performing the second heat-treatment at 1,200° C.

The composition of the lithium-containing metal oxide thus prepared was $Li_{0.34}La_{0.55}NiO_3$.

Preparation Example 13: Preparation of a Perovskite Material of $Li_{0.34}La_{0.55}CrO_{3-\delta}$ A target material was obtained by performing the same procedure in Preparation Example 9 except for using $Cr_2O_3$ instead of $TiO_2$ and performing the second heat-treatment at 1,200° C.

The composition of the lithium-containing metal oxide thus prepared was $Li_{0.34}La_{0.55}CrO_3$.

Preparation Example 14: Preparation of a Perovskite Material of $Li_{0.34}La_{0.55}IrO_3$ A target material was obtained by performing the same procedure in Preparation Example 9 except for using $IrO_2$ instead of $TiO_2$ and performing the second heat-treatment at 1,200° C.

The composition of the lithium-containing metal oxide thus prepared was $Li_{0.34}La_{0.55}IrO_3$.

Preparation Example 15: Preparation of a Perovskite Material of $Li_{0.34}La_{0.55}CoO_3$ A target material was obtained by performing the same procedure in Preparation Example 9 except for using $Co_2O_3$ instead of $TiO_2$ and performing the second heat-treatment at 1,200° C.

The composition of the lithium-containing metal oxide thus prepared was $Li_{0.34}La_{0.55}Co_3$.

Preparation of Cathode

Example 1

$Li_{0.34}La_{0.55}RuO_3$ (hereinafter, LLRuO) prepared according to Preparation Example 10 was ground in a ball mill, and a powder having a primary particle size of about 300 nm was obtained.

500 mg of the LLRuO powder thus obtained, 150 mg of a polyvinyl butyral resin (Butvar B79: Eastman Co.) as a binder, 150 mg of a poly(styrene-b-divinylbenzene) copolymer microsphere (hereinafter, will be referred to as "PS MS") (average particle diameter: about 3 μm) (EPRUI Co.), and ethanol (Samchun Chemical Co.) as a solvent were mixed to prepare a slurry. In the block copolymer, the mixing weight ratio of a polystyrene block and a polydivinylbenzene block was about 80:20 (4:1).

The slurry thus obtained was applied onto a PET releasing film to a thickness of 200 μm using a doctor-blade, and dried in the air to prepare a partially dried coating layer.

The coating layer thus prepared was cut on the PET releasing film to a size of 7×7 cm², and two coating layers cut to the size were stacked to face each other and laminated at 100° C. for 15 minutes at 250 psi through hot-press.

Then, the PET releasing films were removed to obtain a green sheet. The green sheet thus obtained was dried at 25° C. and heat-treated in an air atmosphere at 450° C. for 1 hour to prepare a cathode including a lithium-containing metal oxide and large-diameter pores in the form of a porous film.

The weight per unit area (loading level) of the cathode as a porous film was about 4.5 mg/cm² to about 6.5 mg/cm², and the thickness thereof was about 25 μm to about 45 μm.

The amount of the PS MS was 30 parts by weight based on 100 parts by weight of the LLRuO, and the amount of the polyvinyl butyral resin binder was 30 parts by weight based on 100 parts by weight of the LLRuO.

The relative volume ratio of the LLRuO, the binder and the PS MS, used for preparing the porous film was 21.3:41.2:37.5.

Figure 3A:
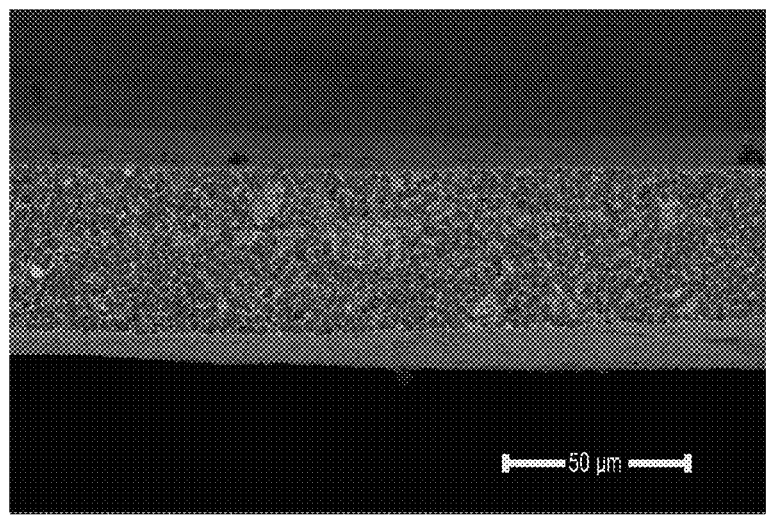
FIG. 3A is a scanning electron microscope image of a cross-section of a dried green sheet prior to heat-treating, prepared in Example 1.
Figure 3B:
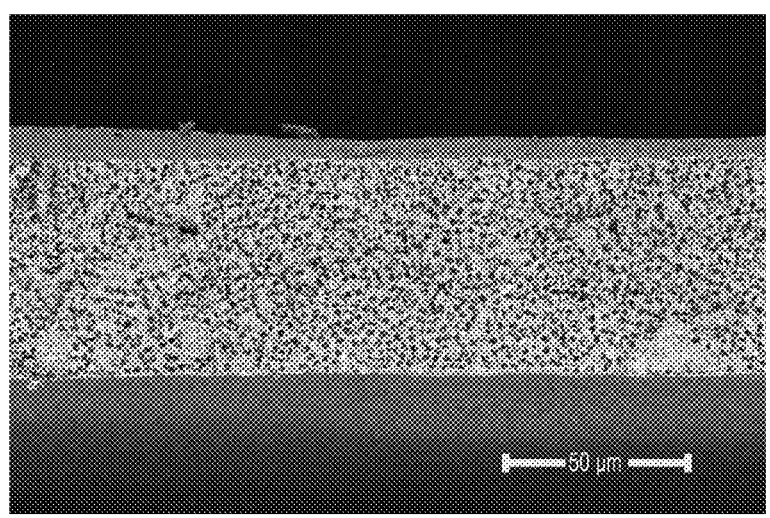
FIG. 3B is a scanning electron microscope image of a cross-section of a cathode after heat-treating, prepared in Example 1.

The scanning electron microscope images of the cross-section of the dried green sheet before heat-treating and the cross-section of the cathode having a porous film thus prepared are shown in FIGS. 3A and 3B, respectively.

FIG. 3A is a scanning electron microscope image of the cross-section of the dried green sheet prior to heat-treating. FIG. 3A shows that PS MS particles were dispersed in a LLRuO matrix.

FIG. 3B is a scanning electron microscope image of the cross-section of the cathode in the form of a porous film after heat-treating. FIG. 3B shows that a film including LLRuO included a plurality of large-diameter pores.

Though not clearly shown in FIG. 3B, it was confirmed that a plurality of small-diameter pores were present in an enlarged image (not shown).

The large-diameter pores were formed by the thermal decomposition of the PS MS particles, and the small-diameter pores were formed by the thermal decomposition of the binder.

It was confirmed that the porous film included large-diameter pores having a size of about 3 μm and small-diameter pores having a size of about 1 μm or less.

The porosity of the porous film was obtained by measuring the area of the porous film using an optical microscope, measuring the thickness of the porous film using a SEM, and calculating the volume of the porous film.

The porosity of the porous film was calculated using the volume thus calculated and the weight of the porous film. The porosity is a volume percent occupied by all pores including the large-diameter pores and small-diameter pores among the total volume of the porous film.

The amount of the large-diameter pores included in the porous film was confirmed from the relative volume of the PS MS among the LLRuO, the binder and the PS MS, used for preparing the porous film of Example 1.

The amount of the large-diameter pores is the volume percent occupied by the large-diameter pores with respect to the total volume of the large-diameter pores, the small-diameter pores and the LLRuO. That is, the percent of the large-diameter pores is the percent volume occupied by the large-diameter pores among the total volume of the porous film.

The size of the large-diameter pores was about 3 um. The amount of the large-diameter pores was about 37.5 vol %. The porosity of the porous film was about 71.5%.

Example 2

A cathode having a porous shape was prepared by performing the same method as in Example 1 except for changing the amount of the PS MS to 300 mg.

The amount of the PS MS was 60 parts by weight based on 100 parts by weight of the LLRuO, and the amount of the polyvinyl butyral resin binder was 30 parts by weight, based on 100 parts by weight of the LLRuO.

The size of the large-diameter pores was about 3 um. The amount of the large-diameter pores was about 54.5 vol %. The porosity of the porous film was about 84%.

Example 3

A cathode was prepared by performing the same method as in Example 1 except for changing the average particle diameter of the PS MS to about 8 μm.

The amount of the PS MS was 30 parts by weight based on 100 parts by weight of the LLRuO, and the amount of the polyvinyl butyral resin binder was 30 parts by weight based on 100 parts by weight of the LLRuO.

The size of the large-diameter pores was about 8 um. The amount of the large-diameter pores was about 37.5 vol %. The porosity of the porous film was about 71.5%.

Example 4

A cathode was prepared by performing the same method as in Example 1 except for changing the amount of the binder to 100 mg.

The amount of the PS MS was 30 parts by weight based on 100 parts by weight of the LLRuO, and the amount of the polyvinyl butyral resin binder was 20 parts by weight based on 100 parts by weight of the LLRuO.

The size of the large-diameter pores was about 3 um. The amount of the large-diameter pores was about 43 vol %. The porosity of the porous film was about 75%.

Reference Example 1

A slurry was prepared by the same method as in Example 1.

The slurry thus prepared was disposed onto a PET releasing film using a doctor-blade and dried for 12 hours in the air to prepare a coating layer.

The coating layer thus prepared was heated at 450° C. for 1 hour to prepare a cathode in the form of a porous film.

Manufacture of Lithium-Air Battery

Example 5: Manufacture of Lithium-Air Battery (Cathode/LATP/Electrolyte/Li Anode)

A separator (Celgard 3501) was disposed on a lithium metal foil anode.

0.2 ml of an electrolyte in which 1 M of lithium bis (trifluoromethanesulfonyl)imide (LiTFSI) was dissolved in propylene carbonate (PC), was injected into the separator to prepare an anode intermediate layer.

An LATP solid electrolyte film (thickness of 250 um, Ohara Corp., Japan) was disposed on the separator to prepare a lower structure composed of anode/anode intermediate layer/solid electrolyte layer.

The lower structure was covered with a pouch coated with aluminum on polyolefin. A window having a certain size was disposed on the pouch to expose the LATP solid electrolyte out of the pouch.

The cathode prepared in Example 1 was disposed on the LATP solid electrolyte exposed out of the pouch. Then, a gas diffusion layer (GDL, SGL Co., 25BC) was disposed on the top of the cathode, a nickel mesh was positioned on the gas diffusion layer, and a pressing member for delivering air to the cathode was pressed to fix a cell, thereby preparing a lithium-air battery.

Examples 6 to 8

Lithium-air batteries were prepared by the same method as in Example 5 except for using the cathodes prepared in Examples 2 to 4 instead of the cathode prepared in Example 1.

Reference Example 2

A lithium-air battery was prepared by the same method as in Example 5 except for using the cathode prepared in Reference Example 1 instead of the cathode prepared in Example 1.

Evaluation Example 1: Evaluation of Surface Roughness

The roughness of the surfaces of the cathode including the porous films prepared in Example 1 and Reference Example 1 was evaluated using an AFM.

Figure 2:
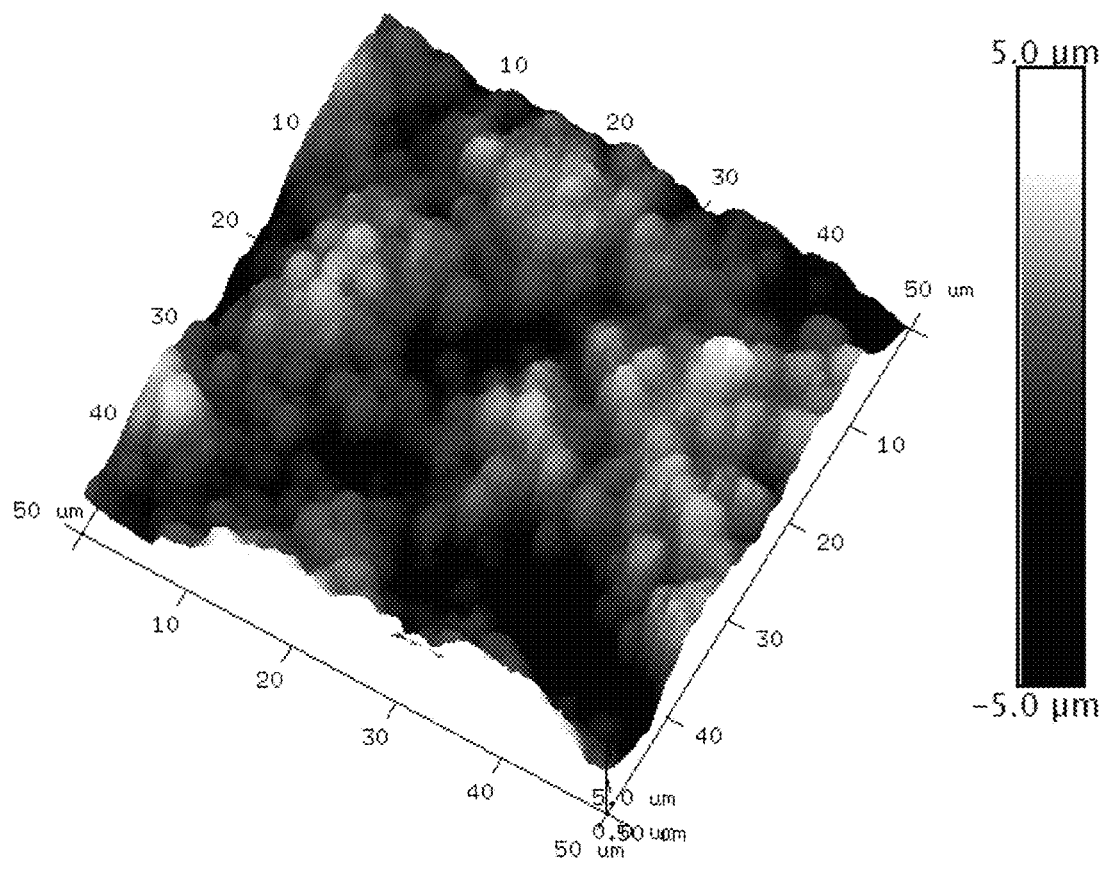
FIG. 2 is an AFM image of a surface of a cathode prepared in Reference Example 1.

The evaluation results are shown in FIGS. 1 and 2, and Table 1.

FIG. 1 is an AFM image of the surface of a porous film planarized by a hot-press, as prepared in Example 1.

FIG. 2 is an AFM image of the surface of a porous film not pressurized, as prepared in Reference Example 1.

In Table 1, $R_q$ is the RMS roughness ($R_q$) of the surface of a porous film.

In Table 1, $R_a$ is the mean roughness ($R_a$) of the surface of a porous film.

In Table 1, $R_{max}$ is the maximum roughness depth ($R_{max}$) of the surface of a porous film.

$R_q$, $R_a$ and $R_{max}$ were measured from AFM images.

TABLE 1

|  | $R_q$ [um] | $R_a$ [um] | $R_{max}$ [um] |
| --- | --- | --- | --- |
| Reference Example 1 | 1.482 | 1.126 | 12.634 |
| Example 1 | 0.275 | 0.212 | 2.303 |

As shown in Table 1, the surface of the porous film prepared in Reference

Example 1 has a $R_q$ value of greater than 1.0 um, a $R_{max}$ value of greater than 10 um, and an $R_a$ value of greater than 1.0 um.

The surface of the porous film prepared in Example 1 has reduced surface roughness compared to Reference Example 1.

Evaluation Example 2: Evaluation of Charge and Discharge Characteristics of Lithium-Air Battery Charge and discharge were performed in an oxygen atmosphere at 40° C., 1 atm, and a relative humidity of 100% after removing $CO_2$ with calcium hydroxide ($Ca(OH)_2$).

The charge and discharge cycle including discharge with a constant current of 0.06 mA/cm² to 2.0 V (vs. Li), charge with the same current to 4.5 V, and then, charge with a constant voltage until the current decreased to 0.006 mA/cm² at 4.5 V was performed once for the lithium-air batteries prepared in Example 5 and Reference Example 2 (chemical conversion step).

Then, the lithium-air battery was discharged with a constant current of 0.6 mA/cm² to 2.0 V (vs. Li), charged with the same current to 4.5 V, and then charged with a constant voltage until the current decreased to 0.06 mA/cm² at 4.5 V, and this charge and discharge cycle was performed.

The life characteristics were evaluated by the cycle number providing a cut-off discharge capacity, corresponding to 80% of a discharge capacity of 3 mAh/cm², at 2.0 V (vs. Li) or higher voltage.

Figure 4:
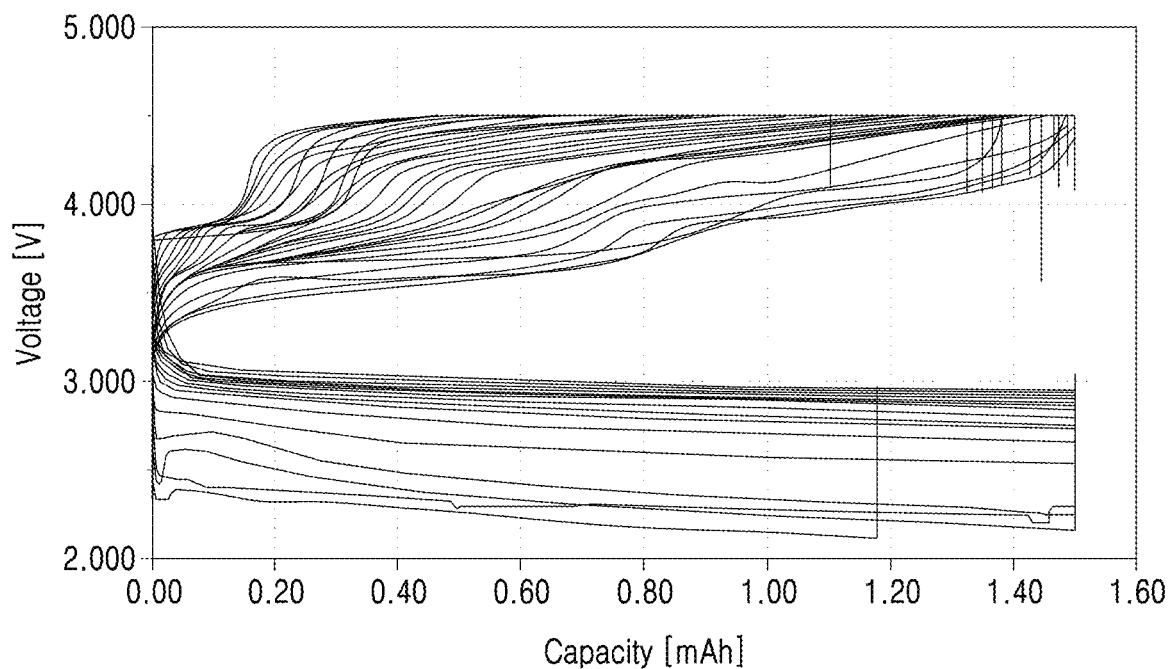
FIG. 4 is a graph of voltage (V) versus capacity (milliampere hours (mAh)) that illustrates a charge and discharge profile of a lithium-air battery prepared in Example 5.
Figure 5:
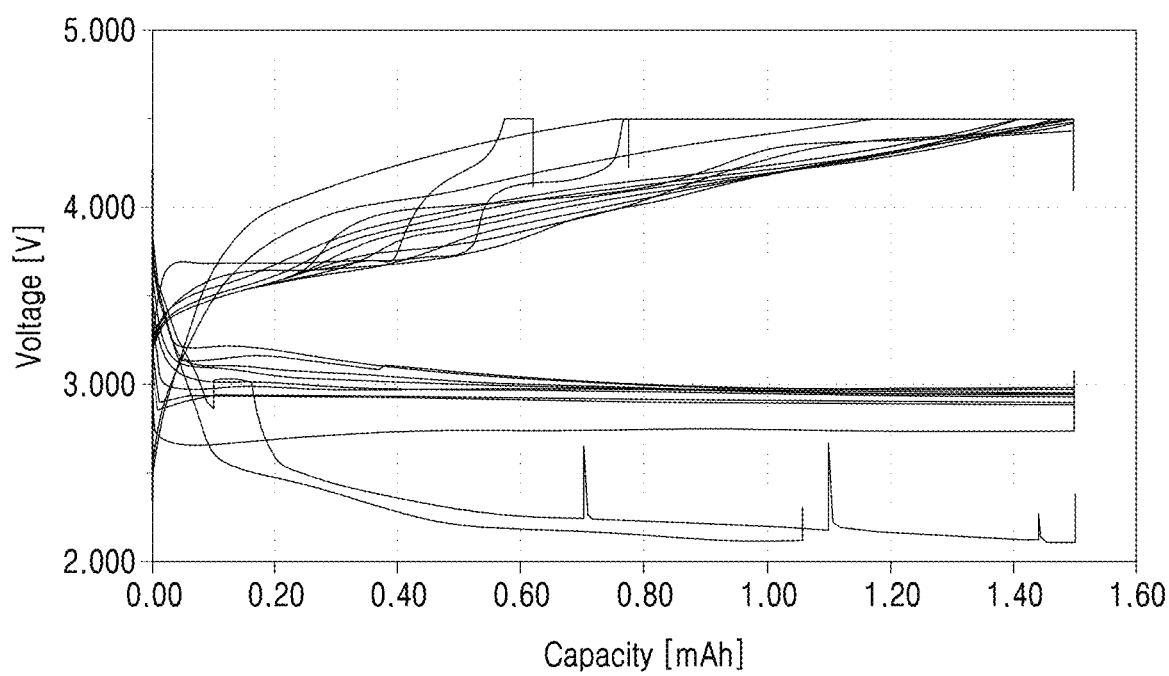
FIG. 5 is a graph of voltage (V) versus capacity (mAh) that illustrates a charge and discharge profile of a lithium-air battery prepared in Reference Example 2.

As shown in FIG. 4, the lithium-air battery formed in Example 5 has a life of 34 cycles. As shown in FIG. 5, the lithium-air battery formed in Reference Example 2 has a life of 10 cycles.

Accordingly, the lithium-air battery of Example 5, having low surface roughness showed markedly improved cycle characteristics when compared with the lithium-air battery of Reference Example 2, which had high surface roughness.

Figure 6:
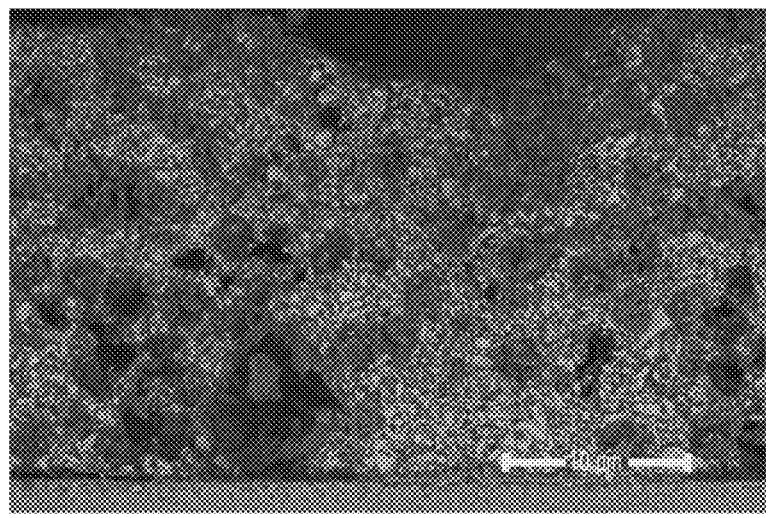
FIG. 6 is a scanning electron microscope image of a cross-section of a cathode after one discharge cycle of a lithium-air battery prepared in Example 5.

As shown in FIG. 6, it was confirmed that discharge products were uniformly formed in the porous film and at the surface of the porous film of a cathode after discharge at the first cycle of the lithium-air battery formed in Example 5.

Without wishing to be bound by theory, it is understood that the improved life characteristics of the lithium-air battery of Example 5 are obtainable because the surface roughness of the cathode was decreased, and thus, more uniform contact of a current collector with a cathode was possible, and thus, internal resistance was reduced.

Furthermore, when the nonuniform production of discharge products in the cathode and between the cathode and the current collector in the lithium-air battery of Example 5 was suppressed, the production of electrically insulated discharge products from the current collector was prevented, and the reversibility of an electrode reaction was improved.

According to an aspect, by including a porous film including a metal oxide, the chemical stability of a cathode and a lithium-air battery is improved, and by employing a cathode including a porous film suppressing the irregular production of discharge products, the cycle characteristics of a lithium-air battery are improved.

It should be understood that embodiments described herein should be considered in a descriptive sense only and not for purposes of limitation. Descriptions of features, aspects, or advantages within each embodiment should be considered as available for other similar features, aspects, or advantages in other embodiments. While one or more embodiments have been described with reference to the figures, it will be understood by those of ordinary skill in the art that various changes in form and details may be made therein without departing from the spirit and scope as defined by the following claims.

What is claimed is:

1. A cathode configured to use oxygen as a cathode active material, the cathode comprising:
a porous film,
wherein the porous film comprises a metal oxide, and
wherein a surface of the porous film has a root mean square roughness of about 0.01 micrometer to about 1 micrometer, and a porosity of the porous film is about 50 volume percent to about 99 volume percent, based on a total volume of the porous film.

2. The cathode of claim 1, wherein a mean roughness of the surface of the porous film is about 0.01 micrometer to about 1 micrometer.

3. The cathode of claim 1, wherein a maximum roughness depth of the surface of the porous film is about 0.1 micrometer to about 10 micrometers.

4. The cathode of claim 1, wherein the metal oxide is a lithium-containing metal oxide.

5. The cathode of claim 4, wherein an average particle diameter of the lithium-containing metal oxide is about 10 nanometers to about 500 nanometers.

6. The cathode of claim 4, wherein the lithium-containing metal oxide is a crystalline lithium ion conductor, and wherein the lithium-containing metal oxide has an ionic conductivity of about $1.0 \times 10^{-7}$ siemens per centimeter or more at 25° C.

7. The cathode of claim 4, wherein the lithium-containing metal oxide is a crystalline electronic conductor, and wherein the lithium-containing metal oxide has an electronic conductivity of about $1.0 \times 10^{-6}$ siemens per centimeter or more.

8. The cathode of claim 4, wherein the lithium-containing metal oxide is a mixed conductor, and wherein the lithium-containing metal oxide has an electronic conductivity of about $1 \times 10^{-6}$ siemens per centimeter or more at 25° C. and an ionic conductivity of about $1 \times 10^{-7}$ siemens per centimeter or more at 25° C.

9. The cathode of claim 4, wherein the lithium-containing metal oxide comprises at least one of a perovskite compound or a spinel compound.

10. The cathode of claim 4, wherein the lithium-containing metal oxide comprises a perovskite compound represented by Formula 1:

$$Li_xA_yG_zO_{3-\delta} \quad \text{Formula 1}$$

wherein, in Formula 1,
each A and G are independently at least one of a Group 2 to a Group 16 element, and
$0<x<1$, $0<y<1$, $0<x+y\leq1$, $0<z\leq1.5$, and $0\leq\delta\leq1.5$.

11. The cathode of claim 10, wherein A is at least one of H, Na, K, Rb, Cs, Ca, Sr, Ba, Y, La, Ce, Pr, Nd, Pm, Sm, Gd, Tb, Dy, Ho, or Er,
G is at least one of Ti, Pd, Pb, Fe, Ir, Co, Rh, Mn, Ni, Cr, Ru, Re, Sn, V, Ge, W, Zr, Mo, Hf, U, Nb, Th, Ta, Bi, Ca, Sr, Ba, Y, La, Ce, Pr, Nd, Pm, Sm, Gd, Tb, Dy, Ho, Er, Mg, Al, Si, Sc, Zn, Ga, Rb, Ag, Cd, In, Sb, Pt, Au, or Pb, and
$0.2<x\leq0.7$, $0<y\leq0.7$, $0<x+y<1$, $0<z\leq1.2$, and $0\leq\delta\leq1.2$.

12. The cathode of claim 10, wherein A is at least one of La, Ce, Pr, Gd, Ca, Sr, or Ba,
G is at least one of Ti, Mn, Ni, Ru, Cr, Co, Ir, Fe, Pd, Pb, Rh, Sn, V, Re, Ge, W, Zr, Mo, Nb, Ta, Hf, or Bi, and
$0.2<x\leq0.5$, $0.4<y\leq0.7$, $0<x+y<1$, $0.8<z\leq1.2$, and $0\leq\delta\leq1$.

13. The cathode of claim 10, wherein the perovskite compound has an electronic conductivity of about $1\times10^{-6}$ siemens per centimeter or more at 25° C., and an ionic conductivity of about $2\times10^{-7}$ siemens per centimeter or more at 25° C.

14. The cathode of claim 4, wherein the lithium-containing metal oxide comprises a spinel compound represented by at least one of Formula 2 or Formula 3:

$$Li_{1+x}M_{2+y}O_{4-\delta1} \quad \text{Formula 2}$$

$$Li_{4+a}M_{5\pm b}O_{12-\delta2} \quad \text{Formula 3}$$

wherein, in Formulae 2 and 3,
each M is independently at least one of a Group 2 to Group 16 element, and
$0<x<1$, $0<y<1$, $0\leq\delta1\leq1$, $0<a<2$, $0.3<b<5$, and $0\leq\delta2\leq3$.

15. The cathode of claim 14, wherein
each M is independently at least one of Ni, Pd, Pb, Fe, Ir, Co, Rh, Mn, Cr, Ru, Re, Sn, V, Ge, W, Zr, Ti, Mo, Hf, U, Nb, Th, Ta, Bi, Ca, Sr, Ba, Y, La, Ce, Pr, Nd, Pm, Sm, Gd, Tb, Dy, Ho, Er, Mg, Al, Si, Sc, Zn, Ga, Rb, Ag, Cd, In, Sb, Pt, Au, or Pb, and
$0<x<1$, $0<y<1$, $0\leq\delta1\leq1$, $0<a<2$, $0.3<b<5$, and $0\leq\delta2\leq3$.

16. The cathode of claim 14, wherein the spinel compound is represented by Formula 4:

$$Li_{4\pm a}Ti_{5-b}M'_cO_{12-\delta} \quad \text{Formula 4}$$

wherein, in Formula 4,
M' is at least one of Cr, Mg, Ca, Sr, Sc, Y, La, Ce, Pr, Nd, Sm, Eu, Gd, Tb, Dy, Ho, Er, Tm, Yb, Lu, Zr, Hf, V, Nb, Ta, Mo, W, Mn, Tc, Re, Fe, Ru, Os, Co, Rh, Ir, Ni, Pd, Pt, Cu, Ag, Au, Zn, Cd, Hg, Al, Ga, In, Tl, Ge, Sn, Pb, Sb, Bi, Po, As, Se, or Te, and
$0.3<a<2$, $0.3<b<2$, $0.3<c<2$, and $0\leq\delta\leq3$.

17. The cathode of claim 14, wherein the spinel compound has an electronic conductivity of about $1\times10^{-6}$ siemens per centimeter or more at 25° C. and an ionic conductivity of about $1\times10^{-7}$ siemens per centimeter or more at 25° C.

18. The cathode of claim 4, wherein the lithium-containing metal compound comprises at least one of a layered compound, a garnet compound, a NASICON compound, a LISICON compound, a phosphate compound, a tavorite compound, a triplite compound, an anti-perovskite compound, a silicate compound, or a borate compound.

19. The cathode of claim 4, wherein the lithium-containing metal oxide comprises at least one of a layered compound represented by Formula 5, a NASICON compound represented by Formula 6, a LISICON compound represented by Formula 7, a garnet compound represented by Formula 8, a phosphate compound represented by Formula 9, a phosphate compound represented by Formula 10, a tavorite compound represented by Formula 11, a triplite compound represented by Formula 11, an anti-perovskite compound represented by Formula 12, a silicate compound represented by Formula 13, or a borate compound represented by Formula 14:

$$Li_{1+x}M_{1+y}O_{2\pm\delta} \quad \text{Formula 5}$$

wherein, in Formula 5,
M in Formula 5 is at least one of a Group 2 to Group 16 elements, and
$0<x<0.5$, $0<y<1$, and $0\leq\delta\leq1$, $$Li_{1+x}A_xM_{2-x}(XO_4)_3 \quad \text{Formula 6}$$

wherein, in Formula 6,
each A and M in Formula 6 are each independently at least one of a Group 2 to a Group 16 element,
X is As, P, Mo, or S, and $0<x<1$, $$Li_{8-c}A_aB'_bO_4 \quad \text{Formula 7}$$

wherein, in Formula 7,
each A and B' in Formula 7 are each independently at least one of a Group 2 to a Group 16 element,
c=ma+nb, wherein m is an oxidation number of A, n is an oxidation number of B, and $0<a\leq1$, and $0\leq b\leq1$, $$Li_xA_3B'_2O_{12} \quad \text{Formula 8}$$

wherein, in Formula 8,
each A and B' in Formula 8 are each independently at least one of a Group 2 to a Group 16 element, and
$3\leq x\leq7$, $$Li_{1+x}MPO_4 \quad \text{Formula 9}$$

$$Li_2MP_2O_7 \quad \text{Formula 10}$$

wherein, Formulae 9 and 10,
each M in Formulae 9 and 10 is at least one of a Group 2 to a Group 16 element, and $0\leq x\leq1$, $$Li_{1+x}M(TiO_4)X' \quad \text{Formula 11}$$

wherein, in Formula 11,
M in Formula 11 is at least one of a Group 2 to a Group 16 element,
T is P or S,
X' is F, O, or OH, and $0\leq x\leq1.0$, $$Li_xM_yOA \quad \text{Formula 12}$$

wherein, in Formula 12,
M in Formula 12 is at least one of a Group 2 to a Group 16 element,
A in Formula 12 is F, Cl, Br, I, S, Se, or Te, and $2\leq x\leq3$ and $0\leq y\leq1$, $$Li_{2\pm x}MSiO_4 \quad \text{Formula 13}$$

wherein, in Formula 13, M is at least one of a Group 2 to a Group 16 element, and $0\leq x\leq1$, $$Li_{1\pm x}MBO_3 \quad \text{Formula 14}$$

wherein, in Formula 14,
M in Formula 14 is at least one of a Group 2 to a Group 16 element, and 0≤x≤1.

20. The cathode of claim 19, wherein the lithium-containing metal oxide has an ionic conductivity of about 1×10$^{-6}$ siemens per centimeter or more at 25° C.

21. The cathode of claim 4, wherein the lithium-containing metal oxide is electrochemically stable at a voltage of about 2 volts to about 4 volts, with respect to lithium metal.

22. The cathode of claim 1, wherein the porous film comprises a large-diameter pore, and a size of the large-diameter pore is about 1 micrometer or more.

23. The cathode of claim 22, wherein an amount of the large-diameter pore is about 30 volume percent or more, based on a total volume of the porous film.

24. The cathode of claim 1, wherein an amount of a lithium-containing metal oxide included in the porous film is about 50 weight percent or more, based on a total weight of the porous film.

25. The cathode of claim 1, wherein the porous film further comprises an electronic conductor represented by at least one of Formula 15 or Formula 16:

$$A_xB'_yO_{3\pm\delta} \quad \text{Formula 15}$$

wherein, in Formula 15,
each A and B' in Formula 15 are each independently at least one of a Group 2 to a Group 16 element, and 0.8≤x≤1.2, 0.8≤y≤1.2, and 0≤δ≤1.5, $$Ce_xM_yO_{3\pm\delta} \quad \text{Formula 16}$$

wherein, in Formula 16,
M in Formula 16 is at least one of a Group 2 to a Group 16 element, and
0.6≤x≤1.0, 0≤y≤0.4, and 0≤δ≤0.5.

26. The cathode of claim 25, wherein
A is at least one of Sr, Ba, or La,
B' is at least one of Zr, Ce, Sc, Y, In, or Yb, and
M is at least one of Sc, Y, Zr, In, La, Pr, Sm, Gd, or Yb.

27. A lithium-air battery comprising:
the cathode according to claim 1;
an anode comprising lithium; and
an electrolyte disposed between the cathode and the anode.

28. The lithium-air battery of claim 27, wherein the electrolyte is a solid electrolyte.

29. A cathode configured to use oxygen as a cathode active material, the cathode comprising:
a porous film,
wherein the porous film comprises a metal oxide, wherein the metal oxide is a lithium containing metal oxide represented by Formula 1, $$Li_xA_yG_zO_{3-\delta} \quad \text{Formula 1}$$

wherein, in Formula 1,
each A and G are independently at least one of a Group 2 to a Group 16 element,
0<x<1, 0<y<1, 0<x+y≤1, 0<z≤1.5, and 0≤δ≤1.5, and
wherein a surface of the porous film has a root mean square roughness of about 0.01 micrometer to about 1 μm micrometer.

* * * * *